(12) United States Patent  
Jung et al.

(10) Patent No.: US 12,114,001 B2  
(45) Date of Patent: Oct. 8, 2024

(54) METHOD AND DEVICE FOR PROCESSING VIDEO SIGNAL BY USING ADAPTIVE COLOR SPACE TRANSFORM

(71) Applicant: WILUS INSTITUTE OF STANDARDS AND TECHNOLOGY INC., Seongnam-si (KR)

(72) Inventors: Jaehong Jung, Seoul (KR); Juhyung Son, Uiwang-si (KR); Dongcheol Kim, Suwon-si (KR); Geonjung Ko, Seoul (KR); Jinsam Kwak, Uiwang-si (KR)

(73) Assignee: WILLUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 133 days.

(21) Appl. No.: 17/750,300

(22) Filed: May 21, 2022

(65) Prior Publication Data

US 2022/0303567 A1    Sep. 22, 2022

Related U.S. Application Data

(63) Continuation of application No. PCT/KR2020/016968, filed on Nov. 26, 2020.

(30) Foreign Application Priority Data

Nov. 26, 2019  (KR) .................. 10-2019-0153835  
Dec. 4, 2019   (KR) .................. 10-2019-0160096  
Dec. 27, 2019  (KR) .................. 10-2019-0177150

(51) Int. Cl.  
*H01L 29/94*   (2006.01)  
*H04N 19/176*  (2014.01)  
(Continued)

(52) U.S. Cl.  
CPC .......... *H04N 19/46* (2014.11); *H04N 19/176* (2014.11); *H04N 19/186* (2014.11); *H04N 19/70* (2014.11); *H04N 19/96* (2014.11)

(58) Field of Classification Search  
CPC .... H04N 19/46; H04N 19/176; H04N 19/186; H04N 19/70; H04N 19/96; H04N 19/157;  
(Continued)

(56) References Cited

U.S. PATENT DOCUMENTS

2008/0123977 A1* 5/2008 Moriya .................. H04N 19/61  
                                                375/E7.149  
2009/0123066 A1* 5/2009 Moriya ................ H04N 19/174  
                                                382/166  
(Continued)

FOREIGN PATENT DOCUMENTS

CN    106105205 A    11/2016  
CN    110402580 A    11/2019  
(Continued)

OTHER PUBLICATIONS

"Examination report under sections 12 & 13 of the Patents Act, 1970 and the Patents Rules, 2003" for IN Application No. 202227027692 from Intellectual Property India, Dated Nov. 30, 2022.  
(Continued)

*Primary Examiner* — Joseph Suh

(57) ABSTRACT

A method for processing a video signal, the method comprising: acquiring a transform skip active flag indicating whether a transform skip flag can exist in a transform unit syntax, the transform skip flag indicating whether a transform skip is applied to a transform block included in a current block; acquiring a palette active flag indicating whether a palette mode is applied; when the transform skip active flag indicates existence of the transform skip flag in the transform unit syntax or the palette active flag indicates application of the palette mode, acquiring information  
(Continued)

related to a minimum quantization parameter which is allowed in a transform skip mode; acquiring the minimum quantization parameter on the basis of the information related to the minimum quantization parameter; correcting a quantization parameter on the basis of the acquired minimum quantization parameter; and reconstructing the current block on the basis of the corrected quantization parameter.

16 Claims, 22 Drawing Sheets

(51) Int. Cl.
  *H04N 19/186* (2014.01)
  *H04N 19/46* (2014.01)
  *H04N 19/70* (2014.01)
  *H04N 19/96* (2014.01)
(58) Field of Classification Search
  CPC ........ H04N 19/124; H04N 9/67; H04N 19/61; H04N 19/119; H04N 19/137; H04N 19/18; H04N 19/625
  See application file for complete search history.

(56) References Cited

U.S. PATENT DOCUMENTS

| | | | |
|---|---|---|---|
| 2013/0077696 A1 | 3/2013 | Zhou | |
| 2015/0373327 A1 | 12/2015 | Zhang et al. | |
| 2017/0295370 A1* | 10/2017 | Xu | H04N 19/523 |
| 2017/0318293 A1 | 11/2017 | Chono | |
| 2019/0349587 A1 | 11/2019 | Jang et al. | |

FOREIGN PATENT DOCUMENTS

| | | |
|---|---|---|
| JP | 2016103804 A | 6/2016 |
| KR | 10-2017-0013274 A | 2/2017 |
| WO | 2015012600 A1 | 1/2015 |
| WO | 2019148977 A1 | 8/2019 |

OTHER PUBLICATIONS

Extended European search report(EESR) for for EP 20 89 3625 (Application No. 20893625.2-1208). Dated Jan. 3, 2023.
Kim (Wilusgroup) D et al: "AHG9: Cleanups on redundant signalling in HLS", 17. JVET Meeting; Jan. 1, 2020-Jan. 17, 2020; Brussels; (The Joint Video Exploration Team of ISO/IEC JTC1/SC29/WG11 and ITU-T SG.16), No. JVET-Q0374; m51969 Dec. 31, 2019 (Dec. 31, 2019), XP030223355, Retrieved from the Internet: URL: http://phenix.int-evry.fr/jvet/doc_end_user/documents/17_Brussels/wg11/JVET-Q0374-v1.zip JVET-Q0374-v1.docx [retrieved on Dec. 31, 2019].
"Support of adaptive color transform for 444 video coding in VVC". Document: JVET-P0517 by Xiaoyu Xiu, Yi-Wen Chen, Tsung-Chuan Ma, Hong-Jheng Jhu, Xianglin Wang. Joint Video Experts Team (JVET) of ITU-T SG 16 WP 3 and ISO/IEC JTC 1/SC 29/WG 11. 16th Meeting: Geneva, CH, Oct. 1-11, 2019.
"Versatile Video Coding (Draft 8)". Document: JVET-Q2001-v5 by Benjamin Bross, Jianle Chen, Shan Liu, Ye-Kui Wang. Joint Video Experts Team (JVET) of ITU-T SG 16 WP 3 and ISO/IEC JTC 1/SC 29/WG 11. 17th Meeting: Brussels, BE, Jan. 7-17, 2020.
Notification of first office action from China National Intellectual Property Administration; Application No. 202080081442.7; Applicant: Wilus Institute of Standards and Technology Inc.; Issue Date: Jul. 6, 2023.
International Search Report of International application No. PCT/KR2020/016968. Dated Mar. 9, 2021.
Written Opinion of International application No. PCT/KR2020/016968. Dated Mar. 9, 2021.
Bross, Benjamin et al. Versatile Video Coding (Draft 7). Joint Video Experts Team (JVET) of ITU-T SG 16 WP 3 and ISO/IEC JTC 1/SC 29/WG 11. JVET-P2001-vE. 16th Meeting: Geneva. CH. pp. 1-464. Nov. 14, 2019. [Retrieved on Feb. 24, 2021]. Retrieved from: <https://jvet-experts.org/>. See pp. 38-39. 78. 98. 103-104. 149. 159-1 63. 296-298 and 320.
Examination report No. 1 for standard patent Application No. 2020391549 from IP Australia dated Feb. 7, 2023.
Notification of first office action from European Patent Office; Application No. 20893625.2-1208; Applicant: Wilus Institute of Standards and Technology Inc.; Issue Date: Sep. 14, 2023.
Office Action for EP Application No. 20893625.2-1208 from European Patent Office dated Jan. 22, 2024.
Notice of Allowance for Chinese Application No. 202080081442.7 from China National Intellectual Property Administration dated Jan. 31, 2024.
Notice of acceptance for patent application for Australian Application No. 2020391549 from Australian Government IP Australia dated Feb. 13, 2024.
Hearing notice for Application No. 202227027692 from India Intellectual Property dated Jul. 18, 2024.
Notice of Allowance for Application No. 20893625.2-1207 from European Patent Office dated Jul. 8, 2024.

* cited by examiner

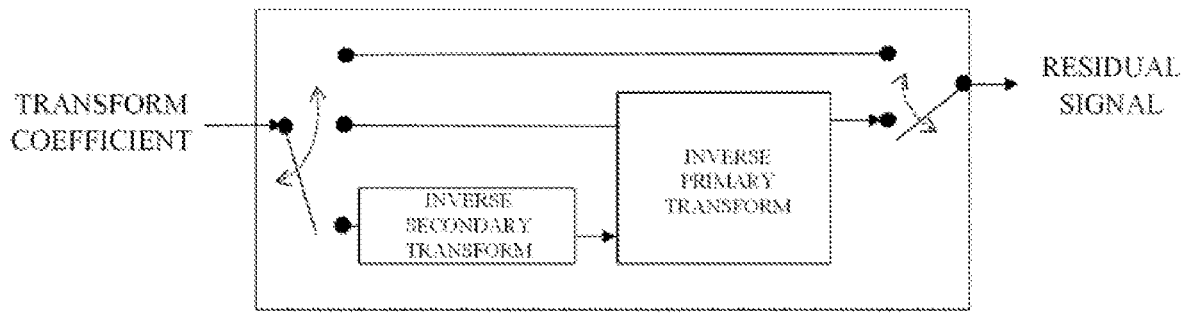

*Fig. 8*

| Transform Type | Basis function $T_i(j)$, $i,j=0, 1,..., N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, <br> where $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

(b)

| Transform Set | Transform Candidates |
|---|---|
| 0 | DST-VII, DCT-VIII |
| 1 | DST-VII, DST-I |
| 2 | DST-VII, DCT-V |

(c)

| Transform Set | Transform Candidates |
|---|---|
| 0 | DCT-VIII, DST-VII |

*Fig. 12*

(a)
| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |
| Intra Mode | 18 | 19 | 20 | 21 | 22 | 23 | 24 | 25 | 26 | 27 | 28 | 29 | 30 | 31 | 32 | 33 | 34 | |
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 0 | 1 | 0 | 1 | 0 | 1 | 0 | 1 | 0 | 1 | 0 | |
| Intra Mode | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |
| Intra Mode | 53 | 54 | 55 | 56 | 57 | 58 | 59 | 60 | 61 | 62 | 63 | 64 | 65 | 66 | | | | |
| V | 2 | 2 | 1 | 0 | 1 | 0 | 1 | 0 | 1 | 0 | 1 | 0 | 1 | 0 | | | | |
| H | 0 | 0 | 1 | 0 | 1 | 0 | 1 | 0 | 1 | 0 | 1 | 0 | 1 | 0 | | | | |
(b)
| Transform Set | Transform Candidates |
|---|---|
| 0 | DST-VII, DCT-VIII |
| 1 | DST-VII, DST-I |
| 2 | DST-VII, DCT-V |
(c)
| Transform Set | Transform Candidates |
|---|---|
| 0 | DCT-VIII, DST-VII |
Fig. 13
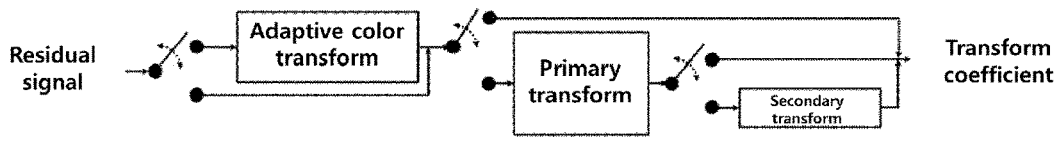
Fig. 14
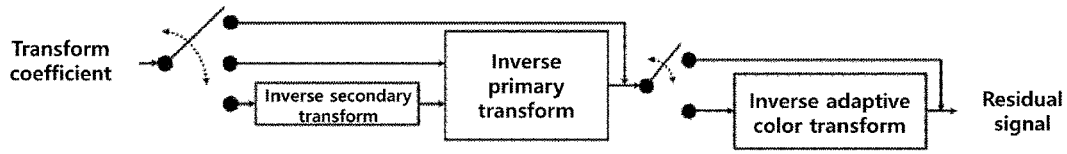
Fig. 15

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)x(nTbH) array d of scaled transform coefficients with elements d[ x ][ y ].

The quantization parameter qP and the variable qpActOffset are derived as follows:

- If cIdx is equal to 0, the following applies:

qP = $Qp'_Y$ qpActOffset = −5

- Otherwise, if TuCResMode[ xTbY ][ yTbY ] is equal to 2, the following applies:

qP = $Qp'_{CbCr}$ qpActOffset = −5

- Otherwise, if cIdx is equal to 1, the following applies:

qP = $Qp'_{Cb}$ qpActOffset = −5

- Otherwise (cIdx is equal to 2), the following applies:

qP = $Qp'_{Cr}$ qpActOffset = −3

The quantization parameter qP is modified and the variables rectNonTsFlag, and bdShift are derived as follows:

- If transform_skip_flag[ xTbY ][ yTbY ][ cIdx ] is equal to 0, the following applies:

qP = Max( 0, qP + ( cu_act_enabled_flag[ xTbY ][ yTbY ] ? qpActOffset : 0 ) )

rectNonTsFlag = ( ( ( Log2( nTbW ) + Log2( nTbH ) ) & 1 ) == 1 ) ? 1 : 0 bdShift = BitDepth + rectNonTsFlag +

( ( Log2( nTbW ) + Log2( nTbH ) ) / 2 ) − 5 + pic_dep_quant_enabled_flag

- Otherwise, if transform_skip_flag[ xTbY ][ yTbY ][ cIdx ] is equal to 1, the following applies:

qP = Max( 0, Max( QpPrimeTsMin, qP ) + ( cu_act_enabled_flag[ xTbY ][ yTbY ] ? qpActOffset : 0 ) )

rectNonTsFlag = 0 bdShift = 10

The variable bdOffset is derived as follows:

bdOffset = ( 1 << bdShift ) >> 1

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

*Fig. 16*

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)x(nTbH) array d of scaled transform coefficients with elements d[ x ][ y ].

The quantization parameter qP and the variable qpActOffset are derived as follows:

- If cIdx is equal to 0, the following applies:

qP = $Qp'_Y$ qpActOffset = −5

- Otherwise, if TuCResMode[ xTbY ][ yTbY ] is equal to 2, the following applies:

qP = $Qp'_{CbCr}$ qpActOffset = −5

- Otherwise, if cIdx is equal to 1, the following applies:

qP = $Qp'_{Cb}$ qpActOffset = −5

- Otherwise (cIdx is equal to 2), the following applies:

qP = $Qp'_{Cr}$ qpActOffset = −3

The quantization parameter qP is modified and the variables rectNonTsFlag, and bdShift are derived as follows:

- If transform_skip_flag[ xTbY ][ yTbY ][ cIdx ] is equal to 0, the following applies:

qP = Max( 0, qP + ( cu_act_enabled_flag[ xTbY ][ yTbY ] ? qpActOffset : 0 ) )

rectNonTsFlag = ( ( ( Log2( nTbW ) + Log2( nTbH ) ) & 1 ) = = 1 ) ? 1 : 0 bdShift = BitDepth + rectNonTsFlag +

( ( Log2( nTbW ) + Log2( nTbH ) ) / 2 ) − 5 + pic_dep_quant_enabled_flag

- Otherwise, if transform_skip_flag[ xTbY ][ yTbY ][ cIdx ] is equal to 1, the following applies:

qP = Max( QpPrimeTsMin, qP + ( cu_act_enabled_flag[ xTbY ][ yTbY ] ? qpActOffset : 0 ) )

rectNonTsFlag = 0 bdShift = 10

The variable bdOffset is derived as follows:

bdOffset = ( 1 << bdShift ) >> 1

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

*Fig. 17*

Scaling process for transform coefficients

Inputs to this process are:
- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)x(nTbH) array d of scaled transform coefficients with elements d[ x ][ y ].

The quantization parameter qP and the variable qpActOffset are derived as follows:
- If cIdx is equal to 0, the following applies:

$qP = Qp'_Y$ qpActOffset = -5

- Otherwise, if TuCResMode[ xTbY ][ yTbY ] is equal to 2, the following applies:

$qP = Qp'_{CbCr}$ qpActOffset = -5

- Otherwise, if cIdx is equal to 1, the following applies:

$qP = Qp'_{Cb}$ qpActOffset = -5

- Otherwise (cIdx is equal to 2), the following applies:

$qP = Qp'_{Cr}$ qpActOffset = -3

The quantization parameter qP is modified and the variables rectNonTsFlag, and bdShift are derived as follows:
- If transform_skip_flag[ xTbY ][ yTbY ][ cIdx ] is equal to 0, the following applies:

qP = Max( QpBdOffset, qP + ( cu_act_enabled_flag[ xTbY ][ yTbY ] ? qpActOffset : 0 ) )

rectNonTsFlag = ( ( ( Log2( nTbW ) + Log2( nTbH ) ) & 1 ) == 1 ) ? 1 : 0 bdShift = BitDepth + rectNonTsFlag +

( ( Log2( nTbW ) + Log2( nTbH ) ) / 2 ) − 5 + pic_dep_quant_enabled_flag

- Otherwise, if transform_skip_flag[ xTbY ][ yTbY ][ cIdx ] is equal to 1, the following applies:

qP = Max( QpBdOffset, Max( QpPrimeTsMin, qP ) + ( cu_act_enabled_flag[ xTbY ][ yTbY ] ? qpActOffset : 0 ) )

rectNonTsFlag = 0 bdShift = 10

The variable bdOffset is derived as follows:

bdOffset = ( 1 << bdShift ) >> 1

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

*Fig. 18*

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)x(nTbH) array d of scaled transform coefficients with elements d[ x ][ y ].

The quantization parameter qP and the variable qpActOffset are derived as follows:

- If cIdx is equal to 0, the following applies:

$qP = Qp'_Y$ qpActOffset = -5

- Otherwise, if TuCResMode[ xTbY ][ yTbY ] is equal to 2, the following applies:

$qP = Qp'_{CbCr}$ qpActOffset = -5

- Otherwise, if cIdx is equal to 1, the following applies:

$qP = Qp'_{Cb}$ qpActOffset = -5

- Otherwise (cIdx is equal to 2), the following applies:

$qP = Qp'_{Cr}$ qpActOffset = -3

The quantization parameter qP is modified and the variables rectNonTsFlag, and bdShift are derived as follows:

- If transform_skip_flag[ xTbY ][ yTbY ][ cIdx ] is equal to 0, the following applies:

qP = Max( QpBdOffset, qP + ( cu_act_enabled_flag[ xTbY ][ yTbY ] ? qpActOffset : 0 ) )

rectNonTsFlag = ( ( ( Log2( nTbW ) + Log2( nTbH ) ) & 1 ) == 1 ) ? 1 : 0 bdShift = BitDepth + rectNonTsFlag +

( ( Log2( nTbW ) + Log2( nTbH ) ) / 2 ) − 5 + pic_dep_quant_enabled_flag

- Otherwise, if transform_skip_flag[ xTbY ][ yTbY ][ cIdx ] is equal to 1, the following applies:

qP = Max(QpPrimeTsMin, qP + ( cu_act_enabled_flag[ xTbY ][ yTbY ] ? qpActOffset : 0 ) )

rectNonTsFlag = 0 bdShift = 10

The variable bdOffset is derived as follows:

bdOffset = ( 1 << bdShift ) >> 1

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

*Fig. 19*

Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)x(nTbH) array d of scaled transform coefficients with elements d[ x ][ y ].

The quantization parameter qP and the variable qpActOffset are derived as follows:

- If cIdx is equal to 0, the following applies:

qP = $Qp'_Y$ qpActOffset = -5

- Otherwise, if TuCResMode[ xTbY ][ yTbY ] is equal to 2, the following applies:

qP = $Qp'_{CbCr}$ qpActOffset = -5

- Otherwise, if cIdx is equal to 1, the following applies:

qP = $Qp'_{Cb}$ qpActOffset = -5

- Otherwise (cIdx is equal to 2), the following applies:

qP = $Qp'_{Cr}$ qpActOffset = -3

The quantization parameter qP is modified and the variables rectNonTsFlag, and bdShift are derived as follows:

- If transform_skip_flag[ xTbY ][ yTbY ][ cIdx ] is equal to 0, the following applies:

qP = Max(0, qP + ( cu_act_enabled_flag[ xTbY ][ yTbY ] ? qpActOffset : 0 ) )

rectNonTsFlag = ( ( ( Log2( nTbW ) + Log2( nTbH ) ) & 1 ) = = 1 ) ? 1 : 0 bdShift = BitDepth + rectNonTsFlag +

( ( Log2( nTbW ) + Log2( nTbH ) ) / 2 ) - 5 + pic_dep_quant_enabled_flag

- Otherwise, if transform_skip_flag[ xTbY ][ yTbY ][ cIdx ] is equal to 1, the following applies:

- If cu_act_enabled_flag[ xTbY ][ yTbY ] is equal to 1, the following applies:

qP = Max( 0, qP + qpActOffset )

- Otherwise (cu_act_enabled_flag[ xTbY ][ yTbY ] is equal to 0), the following applies:

qP = Max(QpPrimeTsMin, qP )

rectNonTsFlag = 0 bdShift = 10

The variable bdOffset is derived as follows:

bdOffset = ( 1 << bdShift ) >> 1

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

| seq_parameter_set_rbsp( ) { | Descriptor |
|---|---|
| ... | |
| chroma_format_idc | u(2) |
| if( chroma_format_idc == 3 ) | |
|    separate_colour_plane_flag | u(1) |
| ... | |
| bit_depth_minus8 | ue(v) |
| min_qp_prime_ts_minus4 | ue(v) |
| ... | |
| sps_transform_skip_enabled_flag | u(1) |
| ... | |
| if( chroma_format_idc == 3 ) { | |
|    sps_act_enabled_flag | u(1) |
|    sps_palette_enabled_flag | u(1) |
| } | |
| ... | |
| } | |

(b)

| seq_parameter_set_rbsp( ) { | Descriptor |
|---|---|
| ... | |
| chroma_format_idc | u(2) |
| if( chroma_format_idc == 3 ) | |
|    separate_colour_plane_flag | u(1) |
| ... | |
| bit_depth_minus8 | ue(v) |
| ... | |
| sps_transform_skip_enabled_flag | u(1) |
| ... | |
| if( chroma_format_idc == 3 ) { | |
|    sps_act_enabled_flag | u(1) |
|    sps_palette_enabled_flag | u(1) |
| } | |
| if( sps_transform_skip_enabled_flag \|\| sps_palette_enabled_flag ) | |
|    min_qp_prime_ts_minus4 | ue(v) |
| ... | |
| } | |

*Fig. 21*

| | Descriptor |
|---|---|
| transform_tree( x0, y0, tbWidth, tbHeight , treeType, chType ) { | |
|   InferTuCbfLuma = 1 | |
|   if( IntraSubPartitionsSplitType = = ISP_NO_SPLIT && !cu_sbt_flag ) { | |
|     if( tbWidth > MaxTbSizeY \|\| tbHeight > MaxTbSizeY ) { | |
|       verSplitFirst = ( tbWidth > MaxTbSizeY && tbWidth > tbHeight ) ? 1 : 0 | |
|       trafoWidth = verSplitFirst ? (tbWidth / 2) : tbWidth | |
|       trafoHeight = !verSplitFirst ? (tbHeight / 2) : tbHeight | |
|       transform_tree( x0, y0, trafoWidth, trafoHeight, chType ) | |
|       if( verSplitFirst ) | |
|         transform_tree( x0 + trafoWidth, y0, trafoWidth, trafoHeight, treeType, chType ) | |
|       else | |
|         transform_tree( x0, y0 + trafoHeight, trafoWidth, trafoHeight, treeType, chType ) | |
|     } else { | |
|       transform_unit( x0, y0, tbWidth, tbHeight, treeType, 0, chType ) | |
|     } | |
|   } else if( cu_sbt_flag ) { | |
|     if( !cu_sbt_horizontal_flag ) { | |
|       trafoWidth = tbWidth * SbtNumFourthsTb0 / 4 | |
|       transform_unit( x0, y0, trafoWidth, tbHeight, treeType , 0, 0 ) | |
|       transform_unit( x0 + trafoWidth, y0, tbWidth − trafoWidth, tbHeight, treeType, 1, 0 ) | |
|     } else { | |
|       trafoHeight = tbHeight * SbtNumFourthsTb0 / 4 | |
|       transform_unit( x0, y0, tbWidth, trafoHeight, treeType , 0, 0 ) | |
|       transform_unit( x0, y0 + trafoHeight, tbWidth, tbHeight − trafoHeight, treeType, 1, 0 ) | |
|     } | |
|   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ) | |
|       transform_unit( x0, y0 + trafoHeight * partIdx, tbWidth, trafoHeight, treeType, partIdx, 0 ) | |
|   } else if( IntraSubPartitionsSplitType = = ISP_VER_SPLIT ) { | |
|     trafoWidth = tbWidth / NumIntraSubPartitions | |
|     for( partIdx = 0; partIdx < NumIntraSubPartitions; partIdx++ ) | |
|       transform_unit( x0 + trafoWidth * partIdx, y0, trafoWidth, tbHeight, treeType, partIdx, 0 ) | |
|   } | |
| } | |

*Fig. 24*

| | Descriptor |
|---|---|
| transform_unit( x0, y0, tbWidth, tbHeight, treeType, subTuIndex, chType ) { | |
|   if( IntraSubPartitionsSplitType != ISP_NO_SPLIT &&<br>    treeType == SINGLE_TREE && subTuIndex == NumIntraSubPartitions − 1 ) { | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && ChromaArrayType != 0 &&<br>    ( IntraSubPartitionsSplitType == ISP_NO_SPLIT \|\|<br>    ( IntraSubPartitionsSplitType != ISP_NO_SPLIT &&<br>      subTuIndex == NumIntraSubPartitions − 1 ) ) | |
|   if( ( treeType == SINGLE_TREE \|\| treeType == DUAL_TREE_CHROMA ) &&<br>     ChromaArrayType != 0 ) { | |
|     if( ( IntraSubPartitionsSplitType == ISP_NO_SPLIT && !( cu_sbt_flag &&<br>      ( ( subTuIndex == 0 && cu_sbt_pos_flag ) \|\|<br>      ( subTuIndex == 1 && !cu_sbt_pos_flag ) ) ) ) \|\|<br>     ( IntraSubPartitionsSplitType != ISP_NO_SPLIT &&<br>      ( subTuIndex == NumIntraSubPartitions − 1 ) ) ) { | |
|       tu_cbf_cb[ xC ][ yC ] | ae(v) |
|       tu_cbf_cr[ xC ][ yC ] | ae(v) |
|     } | |
|   } | |
|   if( treeType == SINGLE_TREE \|\| treeType == DUAL_TREE_LUMA ) { | |
|     if( ( IntraSubPartitionsSplitType == ISP_NO_SPLIT && !( cu_sbt_flag &&<br>      ( ( subTuIndex == 0 && cu_sbt_pos_flag ) \|\|<br>      ( subTuIndex == 1 && !cu_sbt_pos_flag ) ) ) &&<br>      ( CuPredMode[ chType ][ x0 ][ y0 ] == MODE_INTRA \|\|<br>      ( chromaAvailable && ( tu_cbf_cb[ xC ][ yC ] \|\| tu_cbf_cr[ xC ][ yC ] ) ) \|\|<br>      CbWidth[ chType ][ x0 ][ y0 ] > MaxTbSizeY \|\|<br>      CbHeight[ chType ][ x0 ][ y0 ] > MaxTbSizeY ) ) \|\|<br>     ( IntraSubPartitionsSplitType != ISP_NO_SPLIT &&<br>      ( subTuIndex < NumIntraSubPartitions − 1 \|\| !InferTuCbfLuma ) ) ) | |
|       tu_cbf_luma[ x0 ][ y0 ] | ae(v) |
|     if(IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   ... | |
| } | |

*Fig. 25*

| | Descriptor |
|---|---|
| transform_unit( x0, y0, tbWidth, tbHeight, treeType, subTuIndex, chType ) { | |
|   if( IntraSubPartitionsSplitType != ISP_NO_SPLIT &&<br>    treeType == SINGLE_TREE && subTuIndex == NumIntraSubPartitions − 1 ) { | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && ChromaArrayType != 0 &&<br>    ( IntraSubPartitionsSplitType == ISP_NO_SPLIT ||<br>    ( IntraSubPartitionsSplitType != ISP_NO_SPLIT &&<br>    subTuIndex == NumIntraSubPartitions − 1 ) ) | |
|   if( ( treeType == SINGLE_TREE || treeType == DUAL_TREE_CHROMA ) &&<br>    ChromaArrayType != 0 ) { | |
|     if( ( IntraSubPartitionsSplitType == ISP_NO_SPLIT && !( cu_sbt_flag &&<br>      ( ( subTuIndex == 0 && cu_sbt_pos_flag ) ||<br>      ( subTuIndex == 1 && !cu_sbt_pos_flag ) ) ) ) ||<br>    ( IntraSubPartitionsSplitType != ISP_NO_SPLIT &&<br>      ( subTuIndex == NumIntraSubPartitions − 1 ) ) ) { | |
|       tu_cbf_cb[ xC ][ yC ] | ae(v) |
|       tu_cbf_cr[ xC ][ yC ] | ae(v) |
|     } | |
|   } | |
|   if( treeType == SINGLE_TREE || treeType == DUAL_TREE_LUMA ) { | |
|     if( ( IntraSubPartitionsSplitType == ISP_NO_SPLIT && !( cu_sbt_flag &&<br>      ( ( subTuIndex == 0 && cu_sbt_pos_flag ) ||<br>      ( subTuIndex == 1 && !cu_sbt_pos_flag ) ) ) &&<br>      ( ( CuPredMode[ chType ][ x0 ][ y0 ] == MODE_INTRA && !cu_act_enabled_flag[ x0 ][ y0 ] ) ||<br>      ( chromaAvailable && ( tu_cbf_cb[ xC ][ yC ] || tu_cbf_cr[ xC ][ yC ] ) ) ||<br>      CbWidth[ chType ][ x0 ][ y0 ] > MaxTbSizeY ||<br>      CbHeight[ chType ][ x0 ][ y0 ] > MaxTbSizeY ) ) ||<br>    ( IntraSubPartitionsSplitType != ISP_NO_SPLIT &&<br>      ( subTuIndex < NumIntraSubPartitions − 1 || !InferTuCbfLuma ) ) ) | |
|       tu_cbf_luma[ x0 ][ y0 ] | ae(v) |
|     if(IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   ... | |
| } | |

*Fig. 26*

METHOD AND DEVICE FOR PROCESSING VIDEO SIGNAL BY USING ADAPTIVE COLOR SPACE TRANSFORM

CROSS-REFERENCE TO RELATED APPLICATIONS

This application is a continuation of pending PCT International Application No. PCT/KR2020/016968, which was filed on Nov. 26, 2020, and which claims priority to Korean Patent Application No. 10-2019-0153835 filed with the Korean Intellectual Property Office on Nov. 26, 2019, Korean Patent Application No. 10-2019-0160096 filed with the Korean Intellectual Property Office on Dec. 4, 2019, Korean Patent Application No. 10-2019-0177150 filed with the Korean Intellectual Property Office on Dec. 27, 2019. The disclosures of the above patent applications are incorporated herein by reference in their entirety.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

It is an aspect of the present disclosure to improve video signal coding efficiency.

Solution to Problem

A method for decoding a video signal according to an embodiment of the present disclosure includes obtaining, from a bitstream, a transform skip activation flag indicating whether a transform skip flag indicating whether a transform skip is applied to a transform block included in a current block is present in a transform unit syntax, obtaining, from the bitstream, a palette activation flag indicating whether a palette mode is applied, when the transform skip activation flag indicates that the transform skip flag exists in the transform unit syntax, or when the palette activation flag indicates application of the palette mode, obtaining, from the bitstream, information related to a minimum quantization parameter allowed in a transform skip mode, obtaining the minimum quantization parameter, based on the information related to the minimum quantization parameter, correcting a quantization parameter, based on the obtained minimum quantization parameter, and reconstructing the current block, based on the corrected quantization parameter, wherein, when the transform skip flag indicates that a transform skip is applied to a transform block of the current block, a transform is not applied to the transform block.

The method for decoding the video signal according to an embodiment of the present disclosure includes obtaining the transform skip flag from the bitstream, when the transform skip flag indicates that a transform skip is not applied to the transform block, obtaining a corrected quantization parameter based on a quantization parameter offset, when the corrected quantization parameter is smaller than 0, clipping the corrected quantization parameter to be 0, and reconstructing the current block, based on the corrected quantization parameter.

The method for decoding the video signal according to an embodiment of the present disclosure includes obtaining the transform skip flag from the bitstream, when the transform skip flag indicates that a transform skip is applied to the transform block, obtaining a corrected quantization parameter based on a quantization parameter offset, when the corrected quantization parameter is smaller than the minimum quantization parameter, clipping the corrected quantization parameter to be the minimum quantization parameter, and reconstructing the current block, based on the corrected quantization parameter.

The method for decoding the video signal according to an embodiment of the present disclosure includes obtaining, from the bitstream, a color space transform activation flag indicating whether a color space transform is applied to the current block, and determining the quantization parameter offset, based on the color space transform activation flag and a color component of the transform block.

In the method for decoding the video signal according to an embodiment of the present disclosure, the determining of the quantization parameter offset includes, when the color space transform activation flag indicates that a color space transform is not applied to the current block, determining the quantization parameter offset to be 0, and when the color space transform activation flag indicates that a color space transform is applied to the current block, determining the quantization parameter offset to be a predetermined offset for each color component of the transform block.

In the method for decoding the video signal according to an embodiment of the present disclosure, the transform skip activation flag, the palette activation flag, and the minimum quantization parameter-related information are obtained from at least one bitstream among a sequence parameter set (SPS), a picture parameter set (PPS), a picture header, or a slice header.

The method for decoding the video signal according to an embodiment of the present disclosure includes obtaining, from the bitstream, a second transform coefficient flag indicating whether one or more transform coefficients other than 0 exist in a second channel transform block included in a second channel block corresponding to the current block, obtaining, from the bitstream, a third transform coefficient flag indicating whether one or more transform coefficients other than 0 exist in a third channel transform block included in a third channel block corresponding to the current block, and when information indicating a type of a currently processed tree is DUAL_TREE_LUMA or SINGLE_TREE, a prediction method of the current block is an intra prediction, and an intra sub-partition mode is not applied to the current block, obtaining a first transform coefficient flag from the bitstream, based on whether a color space transform activation flag indicates that a color space transform is not applied to the current block, the first transform coefficient flag indicating whether one or more transform coefficients other than 0 exist in a first channel transform block included in the current block, wherein the SINGLE_TREE indicates that a single tree is used in partitioning an upper area including the current block, and the DUAL_TREE_LUMA indicates that a dual tree is used in partitioning an upper area including the current block, and a component included in the current block is a first channel component.

In the method for decoding the video signal according to an embodiment of the present disclosure, the obtaining of the first transform coefficient flag from the bitstream includes, when the color space transform activation flag indicates that a color space transform is not applied to the current block, obtaining the first transform coefficient flag from the bitstream.

In the method for decoding the video signal according to an embodiment of the present disclosure, the obtaining of the first transform coefficient flag from the bitstream includes, when one of multiple conditions is satisfied and the color space transform activation flag indicates that a color space transform is applied to the current block, obtaining the first transform coefficient flag from the bitstream, and the multiple conditions include a condition that a second channel block and a third channel block corresponding to the current block exist, and the second transform coefficient flag indicates that one or more transform coefficients other than 0 exist in the second channel transform block, a condition that a second channel block and a third channel block corresponding to the current block exist, and the third transform coefficient flag indicates that one or more transform coefficients other than 0 exist in the third channel transform block, a condition that a width of the current block is greater than a maximum number of luma transform samples, and a condition that a height of the current block is greater than a maximum number of luma transform samples.

The method for decoding the video signal according to an embodiment of the present disclosure further includes, when the first transform coefficient flag is not obtained from the bitstream, configuring the first transform coefficient flag to indicate that one or more transform coefficients other than 0 exist in the first channel transform block.

A device for decoding a video signal according to an embodiment of the present disclosure includes a processor and a memory, wherein, based on an instruction stored in the memory, the processor obtains, from a bitstream, a transform skip activation flag indicating whether a transform skip flag indicating whether a transform skip is applied to a transform block included in a current block is present in a transform unit syntax, obtains, from the bitstream, a palette activation flag indicating whether a palette mode is applied, when the transform skip activation flag indicates that the transform skip flag exists in the transform unit syntax, or when the palette activation flag indicates application of the palette mode, obtains, from the bitstream, information related to a minimum quantization parameter allowed in a transform skip mode, obtains the minimum quantization parameter, based on the information related to the minimum quantization parameter, corrects a quantization parameter, based on the obtained minimum quantization parameter, and reconstructs the current block, based on the corrected quantization parameter, and when the transform skip flag indicates that a transform skip is applied to a transform block of the current block, a transform is not applied to the transform block.

Based on an instruction stored in the memory, the processor of the device for decoding the video signal according to an embodiment of the present disclosure obtains the transform skip flag from the bitstream, when the transform skip flag indicates that a transform skip is not applied to the transform block, obtains a corrected quantization parameter based on a quantization parameter offset, when the corrected quantization parameter is smaller than 0, clips the corrected quantization parameter to be 0, and reconstructs the current block, based on the corrected quantization parameter.

Based on an instruction stored in the memory, the processor of the device for decoding the video signal according to an embodiment of the present disclosure obtains the transform skip flag from the bitstream, when the transform skip flag indicates that a transform skip is applied to the transform block, obtains a corrected quantization parameter based on a quantization parameter offset, when the corrected quantization parameter is smaller than the minimum quantization parameter, clips the corrected quantization parameter to be the minimum quantization parameter, and reconstructs the current block, based on the corrected quantization parameter.

Based on an instruction stored in the memory, the processor of the device for decoding the video signal according to an embodiment of the present disclosure obtains, from the bitstream, a color space transform activation flag indicating whether a color space transform is applied to the current block, and determines the quantization parameter offset, based on the color space transform activation flag and a color component of the transform block.

Based on an instruction stored in the memory, the processor of the device for decoding the video signal according to an embodiment of the present disclosure determines the quantization parameter offset to be 0 when the color space transform activation flag indicates that a color space transform is not applied to the current block, and determines the quantization parameter offset to be a predetermined offset for each color component of the transform block when the color space transform activation flag indicates that a color space transform is applied to the current block.

The transform skip activation flag, the palette activation flag, and the minimum quantization parameter-related information of the device for decoding the video signal according to an embodiment of the present disclosure are obtained from at least one bitstream among a sequence parameter set (SPS), a picture parameter set (PPS), a picture header, or a slice header.

Based on an instruction stored in the memory, the processor of the device for decoding the video signal according to an embodiment of the present disclosure obtains, from the bitstream, a second transform coefficient flag indicating whether one or more transform coefficients other than 0 exist in a second channel transform block included in a second channel block corresponding to the current block, obtains, from the bitstream, a third transform coefficient flag indicating whether one or more transform coefficients other than 0 exist in a third channel transform block included in a third channel block corresponding to the current block, and when information indicating a type of a currently processed tree is DUAL_TREE_LUMA or SINGLE_TREE, a prediction method of the current block is an intra prediction, and an intra sub-partition mode is not applied to the current block, obtains a first transform coefficient flag from the bitstream, based on whether a color space transform activation flag indicates that a color space transform is not applied to the current block, the first transform coefficient flag indicating whether one or more transform coefficients other than 0 exist in a first channel transform block included in the current block, and the SINGLE_TREE indicates that a single tree is used in partitioning an upper area including the current block, and the DUAL_TREE_LUMA indicates that a dual tree is used in partitioning an upper area including the current block, and a component included in the current block is a first channel component.

Based on an instruction stored in the memory, the processor of the device for decoding the video signal according to an embodiment of the present disclosure obtains the first transform coefficient flag from the bitstream when the color space transform activation flag indicates that a color space transform is not applied to the current block.

Based on an instruction stored in the memory, the processor of the device for decoding the video signal according to an embodiment of the present disclosure obtains the first transform coefficient flag from the bitstream when one of multiple conditions is satisfied and the color space transform activation flag indicates that a color space transform is applied to the current block, and the multiple conditions include a condition that a second channel block and a third channel block corresponding to the current block exist, and the second transform coefficient flag indicates that one or more transform coefficients other than 0 exist in the second channel transform block, a condition that a second channel block and a third channel block corresponding to the current block exist, and the third transform coefficient flag indicates that one or more transform coefficients other than 0 exist in the third channel transform block, a condition that a width of the current block is greater than a maximum number of luma transform samples, and a condition that a height of the current block is greater than a maximum number of luma transform samples.

Based on an instruction stored in the memory, the processor of the device for decoding the video signal according to an embodiment of the present disclosure configures, when the first transform coefficient flag is not obtained from the bitstream, the first transform coefficient flag to indicate that one or more transform coefficients other than 0 exist in the first channel transform block.

A method for encoding a video signal according to an embodiment of the present disclosure includes generating a transform skip activation flag indicating whether a transform skip flag indicating whether a transform skip is applied to a transform block included in a current block is present in a transform unit syntax, generating a palette activation flag indicating whether a palette mode is applied, when the transform skip activation flag indicates that the transform skip flag exists in the transform unit syntax, or when the palette activation flag indicates application of the palette mode, generating information related to a minimum quantization parameter allowed in a transform skip mode, based on the minimum quantization parameter, and generating a bitstream, based on the transform skip activation flag, the palette activation flag, and the minimum quantization parameter-related information, wherein, when the transform skip flag indicates that a transform skip is applied to a transform block of the current block, a transform is not applied to the transform block.

A device for encoding a video signal according to an embodiment of the present disclosure includes a processor and a memory, wherein, based on an instruction stored in the memory, the processor generates a transform skip activation flag indicating whether a transform skip flag indicating whether a transform skip is applied to a transform block included in a current block is present in a transform unit syntax, generates a palette activation flag indicating whether a palette mode is applied, when the transform skip activation flag indicates that the transform skip flag exists in the transform unit syntax, or when the palette activation flag indicates application of the palette mode, generates information related to a minimum quantization parameter allowed in a transform skip mode, based on the minimum quantization parameter, and generates a bitstream, based on the transform skip activation flag, the palette activation flag, and the minimum quantization parameter-related information, and when the transform skip flag indicates that a transform skip is applied to a transform block of the current block, a transform is not applied to the transform block.

Advantageous Effects of Invention

According to an embodiment of the present disclosure, video signal coding efficiency may be improved.

BRIEF DESCRIPTION OF DRAWINGS

FIG. 8 is a diagram specifically illustrating a method for acquiring a residual signal by inverse transforming a transform coefficient by an encoder and a decoder.

FIG. 9 illustrates a basis function corresponding to each transform type.

FIG. 12 illustrates a method of configuring a transform candidate set according to a prediction mode of a current block.

FIG. 13 illustrates a horizontal transform kernel and a vertical transform kernel determined according to a set index.

FIG. 14 is a diagram illustrating in detail a method of transforming a residual signal into a transform coefficient by an encoder performing an adaptive color transform.

FIG. 15 is a diagram illustrating in detail a method of inverse-transforming a transform coefficient to obtain a residual signal by a decoder performing an adaptive color transform.

FIG. 16 illustrates a method of correcting a quantization parameter value, and performing scaling (dequantization), based on the corrected quantization parameter according to the first method of the present disclosure.

FIG. 17 illustrates a method of correcting a quantization parameter value, and performing scaling (dequantization), based on the corrected quantization parameter according to the second method of the present disclosure.

FIG. 18 illustrates a method of correcting a quantization parameter value, and performing scaling (dequantization), based on the corrected quantization parameter according to the third method of the present disclosure.

FIG. 19 illustrates a method of correcting a quantization parameter value, and performing scaling (dequantization), based on the corrected quantization parameter according to the fourth method of the present disclosure.

FIG. 20 illustrates a method of correcting a quantization parameter value, and performing scaling (dequantization), based on the corrected quantization parameter according to the fifth method of the present disclosure.

FIG. 21 illustrates a method of signaling a minimum quantization parameter applied to a transform skip mode.

FIG. 24 illustrates a transform_tree( ) syntax structure which is a syntax structure related to a transform_tree.

FIG. 25 illustrates a transform_unit( ) syntax structure according to an embodiment of the present disclosure.

FIG. 26 illustrates a transform_unit( ) syntax structure according to another embodiment of the present disclosure.

BEST MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including at least one a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
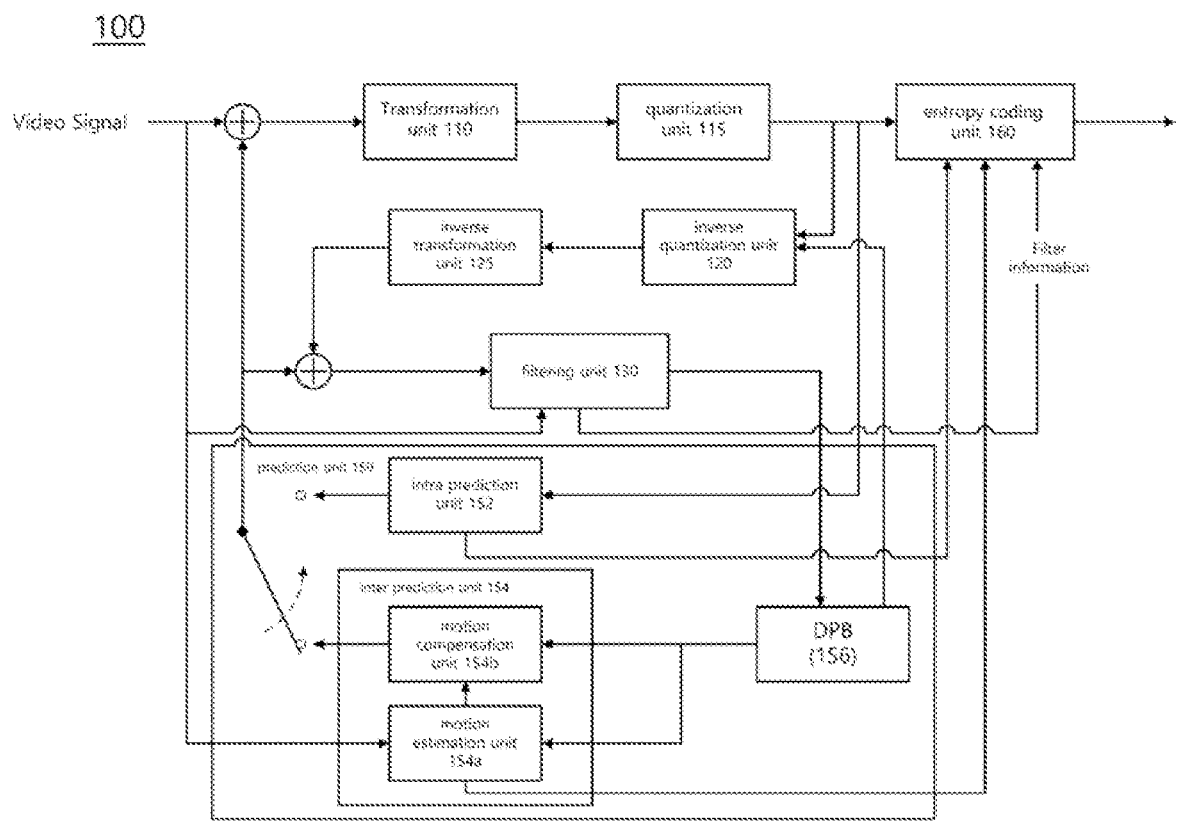
FIG. 1 is a schematic block diagram of a video signal encoding apparatus according to an embodiment of the present invention.

FIG. 1 is a schematic block diagram of a video signal encoding apparatus 100 according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes (scaling) the value of the transform coefficient, and the inverse transformation unit 125 reconstructs the residual value using the inverse quantized (scaling) transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to increase coding efficiency, instead of coding a picture signal as it is, a method for acquiring a reconstructed picture is used in which a picture is predicted using a region that has been already coded through the prediction unit 150, and a residual value between the original picture and the predicted picture is added to the predicted picture. An intra prediction unit 152 performs intra prediction within the current picture, and an inter prediction unit 154 predicts the current picture by using a reference picture stored in the decoded picture buffer 156. The intra prediction unit 152 performs intra prediction from reconstructed regions in the current picture, and transmits intra encoding information to an entropy coding unit 160. Again, the inter prediction unit 154 may include a motion estimation unit 154a and a motion compensation unit 154b. The motion estimation unit 154a obtains a motion vector value of the current region by referring to the reconstructed specific region. The motion estimation unit 154a may transmit position information (reference frame, motion vector, or the like) of the reference region to the entropy coding unit 160 to be included in the bitstream. The motion compensation unit 154b performs inter-motion compensation using the motion vector value transmitted from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The intra encoding information may include information on the reference sample. The inter prediction unit 154 may include a motion estimation unit 154*a* and a motion compensation unit 154*b*. The motion estimation unit 154*a* refers to a specific region of the reconstructed reference picture to obtain a motion vector value of the current region. The motion estimation unit 154*a* transmits motion information set (reference picture index, motion vector information, etc.) on the reference region to the entropy coding unit 160. The motion compensation unit 154*b* performs motion compensation using the motion vector value transmitted from the motion estimation unit 154*a*. The inter prediction unit 154 transmits inter encoding information including motion information on a reference region to the entropy coding unit 160.

According to an additional embodiment, the prediction unit 150 may include an intra block copy (BC) prediction unit (not illustrated). The intra BC prediction unit performs intra BC prediction from reconstructed samples in the current picture, and transmits intra BC encoding information to an entropy coding unit 160. The intra BC prediction unit refers to a specific region in the current picture and obtains a block vector value indicating a reference region to be used for prediction of the current region. The intra BC prediction unit may perform intra BC prediction using the obtained block vector value. The intra BC prediction unit transmits the intra BC encoding information to the entropy coding unit 160. The intra BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients information, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used. For example, the entropy coding unit 160 may binarize information representing a quantized transform coefficient. In addition, the entropy coding unit 160 may generate a bitstream by arithmetic coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
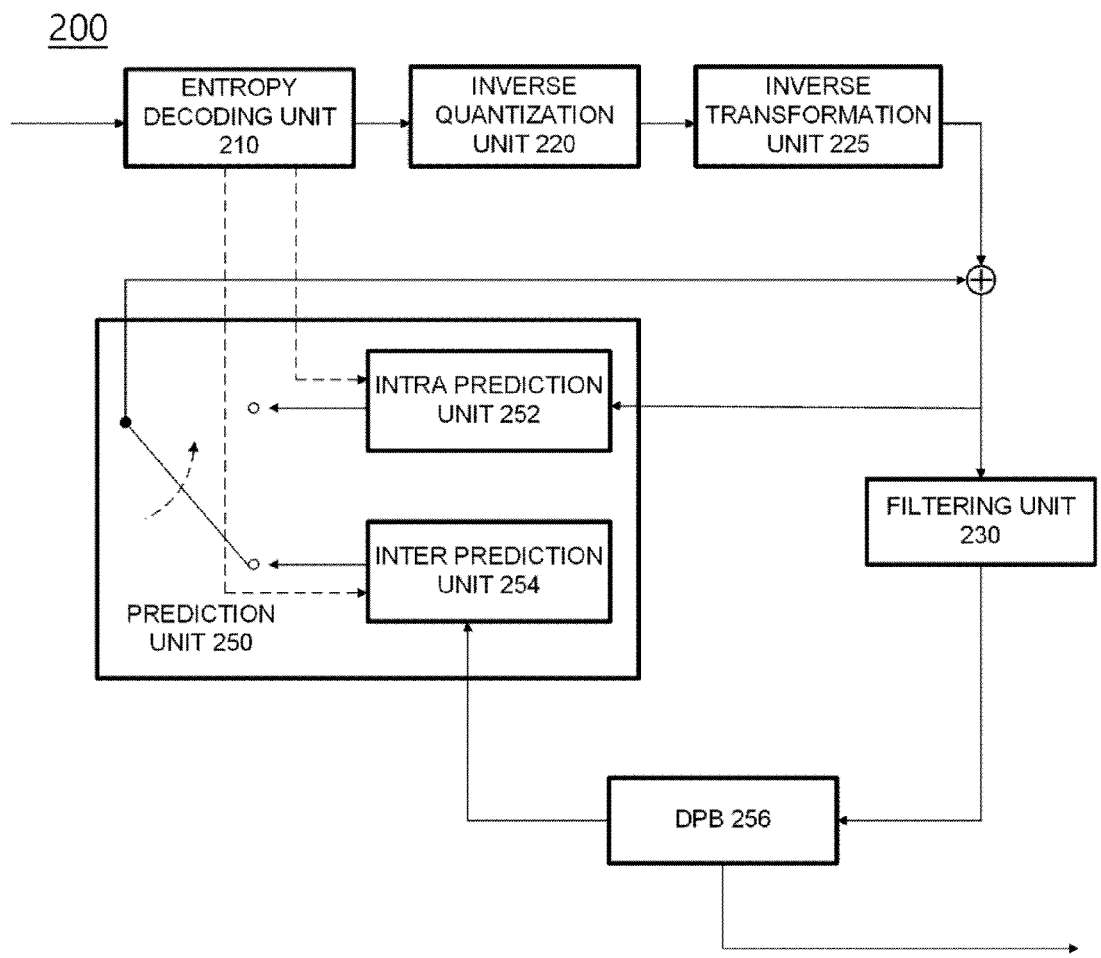
FIG. 2 is a schematic block diagram of a video signal decoding apparatus according to an embodiment of the present invention.

FIG. 2 is a schematic block diagram of a video signal decoding apparatus 200 according to an embodiment of the present disclosure. Referring to FIG. 2, the decoding apparatus 200 of the present disclosure includes an entropy decoding unit 210, a dequantization unit 220, an inverse transform_unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binary code for transform coefficient information of a specific region from the video signal bitstream. Further, the entropy decoding unit 210 obtains a quantized transform coefficient by inverse-binarizing a binary code. The dequantization unit 220 dequantizes the quantized transform coefficient. The inverse transform_unit 225 reconstructs a residual value by using the dequantized transform coefficient. The video signal processing device 200 reconstructs an original pixel value by summing the residual value obtained by the inverse transform_unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. A picture (or tile/slice) using only the current picture for reconstruction, that is, performing intra prediction or intra BC prediction is referred to as an intra picture or I picture (or tile/slice), and a picture (or tile/slice) performing all of intra prediction, inter prediction, and intra BC prediction is referred to as an inter picture (or tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and restored samples in the current picture. As described above, the intra encoding information may include at least one of an intra prediction mode, a Most Probable Mode (MPM) flag, and an MPM index. The intra prediction unit 252 predicts the sample values of the current block by using the restored samples located on the left and/or upper side of the current block as reference samples. In this disclosure, restored samples, reference samples, and samples of the current block may represent pixels. Also, sample values may represent pixel values.

According to an embodiment, the reference samples may be samples included in a neighboring block of the current block. For example, the reference samples may be samples adjacent to the left boundary of the current block and/or samples adjacent to the upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in a bi-prediction scheme may be regions selected from each of an L0 picture list and an L1 picture list.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not illustrated). The intra BC prediction unit may reconstruct the current region by referring to a specific region including reconstructed samples in the current picture. The intra BC prediction unit obtains intra BC encoding information on the current region from the entropy decoding unit 210. The intra BC prediction unit obtains a block vector value of the current region indicating a specific region in the current picture. The intra BC prediction unit may perform intra BC prediction using the obtained block vector value. The intra BC encoding information may include block vector information.

The reconstructed video picture is generated by adding the prediction value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
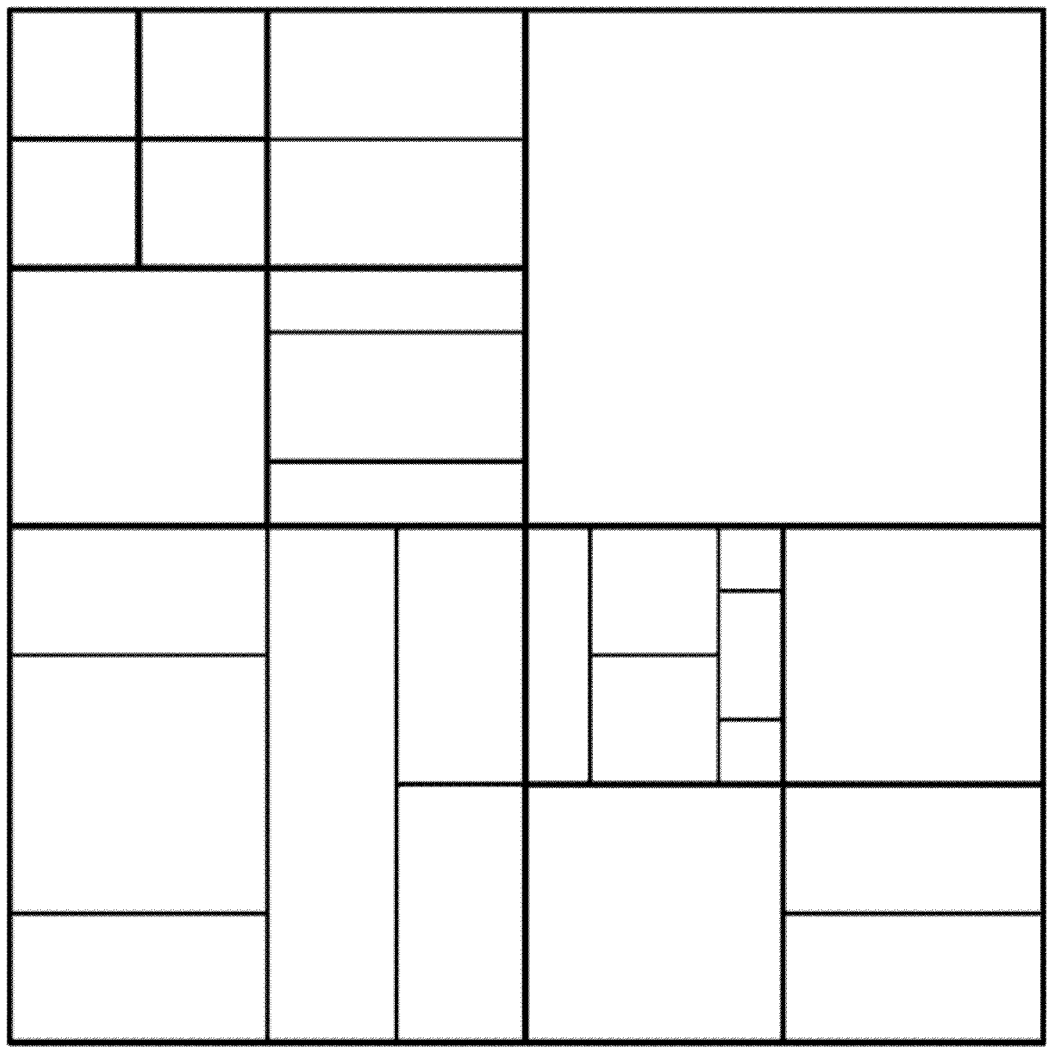
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type-tree may be a coding unit. If splitting for the coding unit is not indicated or the coding unit is not large compared to the maximum transform length, the coding unit is used as a unit of prediction and transform without further splitting. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
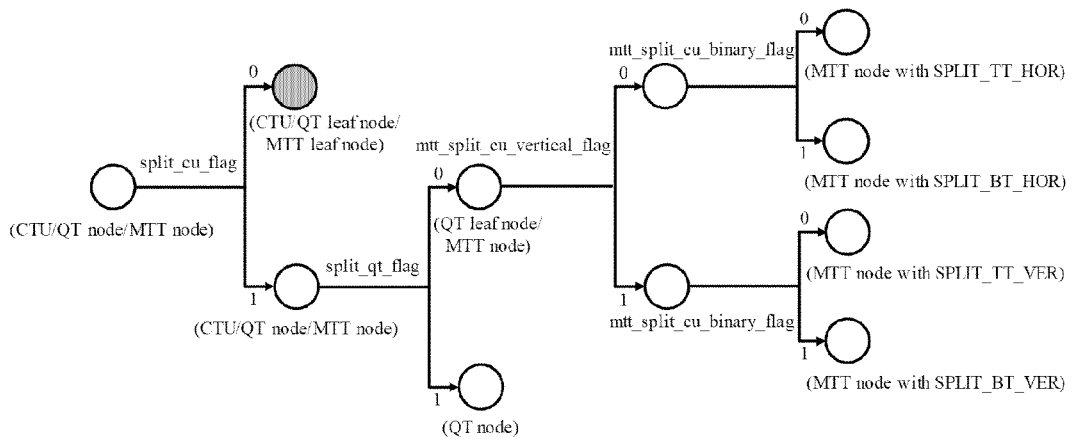
FIG. 4 shows an embodiment of a method for signaling a division of a quad tree and a multi-type tree.

FIG. 4 illustrates an embodiment of a method for signaling a quad tree and multi-type tree split. Preset flags may be used to signal the quad tree and multi-type tree split described above. With reference to FIG. 4, at least one of a flag 'split_cu_flag' indicating whether or not a node is split, a flag 'split_qt_flag' indicating whether or not a quad tree node is split, a flag 'mtt_split_cu_vertical_flag' indicating a split direction of the multi-type tree node, or a flag 'mtt_split_cu_binary_flag' indicating the split shape of the multi-type tree node may be used.

According to an embodiment of the present invention, 'split_cu_flag', which is a flag indicating whether or not the current node is split, may be signaled first. When the value of 'split_cu_flag' is 0, it indicates that the current node is not split, and the current node becomes a coding unit. When the current node is a coding tree unit, the coding tree unit includes one non-split coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes a coding unit.

When the value of 'split_cu_flag' is 1, the current node may be split into nodes of a quad tree or a multi-type tree according to the value of 'split_qt_flag'. The coding tree unit is a root node of a quad tree, and may be first split into a quad tree structure. In the quad-tree structure, 'split_qt_flag' is signaled for each node 'QT node'. When the value of 'split_qt_flag' is 1, the node is split into 4 square nodes, and when the value of 'split_qt_flag' is 0, the node becomes the leaf node of the quad tree 'QT leaf node', and the node is split into multi-type tree nodes. According to an embodiment of the present invention, the quad-tree split may be limited according to the type of the current node. When the current node is a coding tree unit (root node of the quad tree) or a quad tree node, quad-tree split may be allowed, and when the current node is a multi-type tree node, the quad tree split may not be allowed. Each quad tree leaf node 'QT leaf node' may be further split into multi-type tree structures. As described above, when 'split_qt_flag' is 0, the current node may be split into multi-type nodes. In order to indicate the split direction and split shape, 'mtt_split_cu_vertical_flag' and 'mtt_split_cu_binary_flag' may be signaled. When the value of 'mtt_split_cu_vertical_flag' is 1, the vertical split of the node 'MTT node' is indicated, and when the value of 'mtt_split_cu_vertical_flag' is 0, the horizontal split of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

Picture prediction (motion compensation) for coding is performed on coding units that are no longer split (that is, leaf nodes of the coding unit tree). The basic unit that performs such prediction is hereinafter referred to as a prediction unit or a prediction block. Hereinafter, the term unit used in the present specification may be used as a term for replacing the prediction unit, which is a basic unit for performing prediction. However, the present invention is not limited thereto, and may be more broadly understood as a concept including the coding unit.

Figure 5:
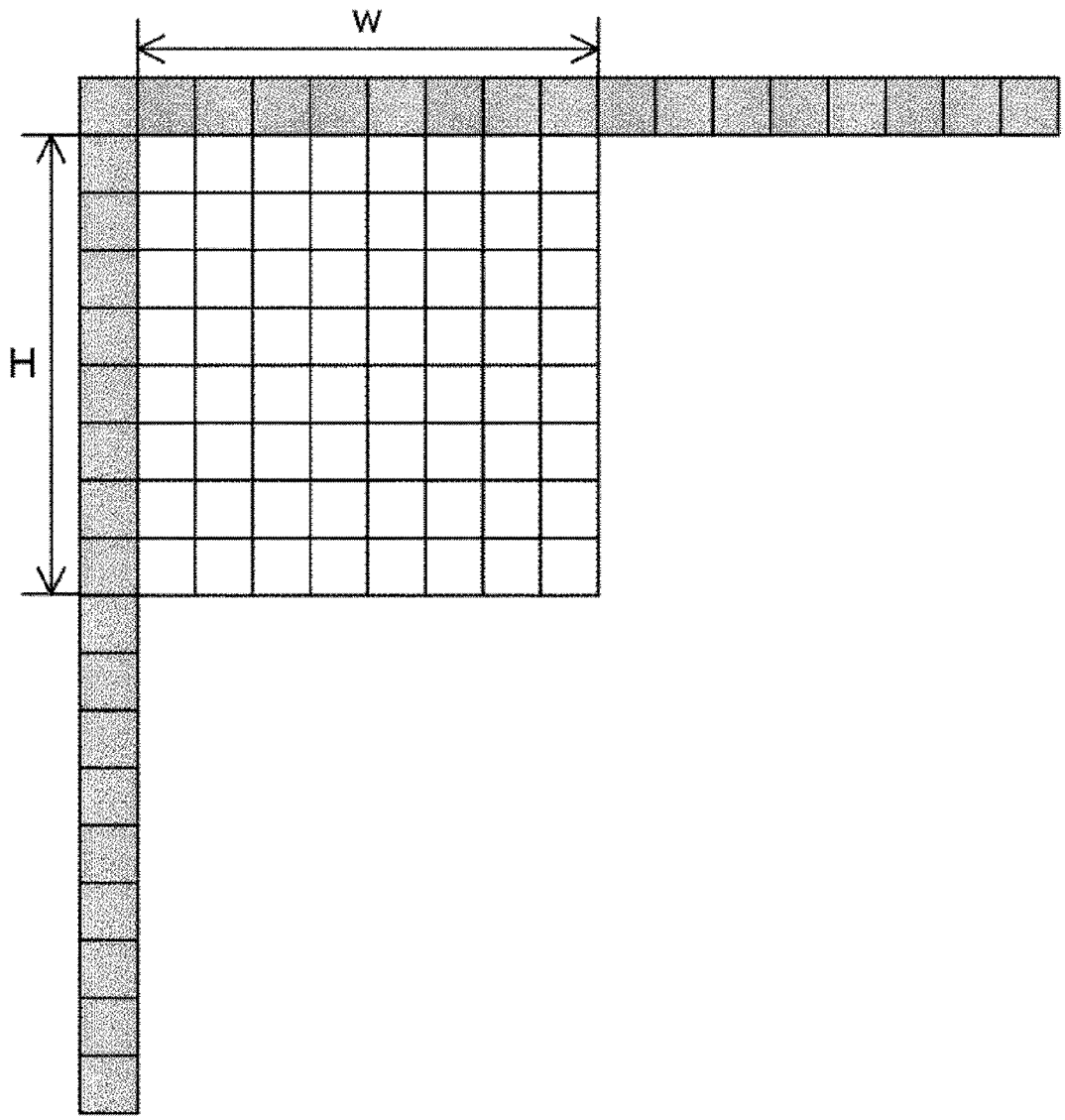
FIGS. 5 and 6 more specifically illustrate an intra prediction method according to an embodiment of the present invention.
Figure 6:
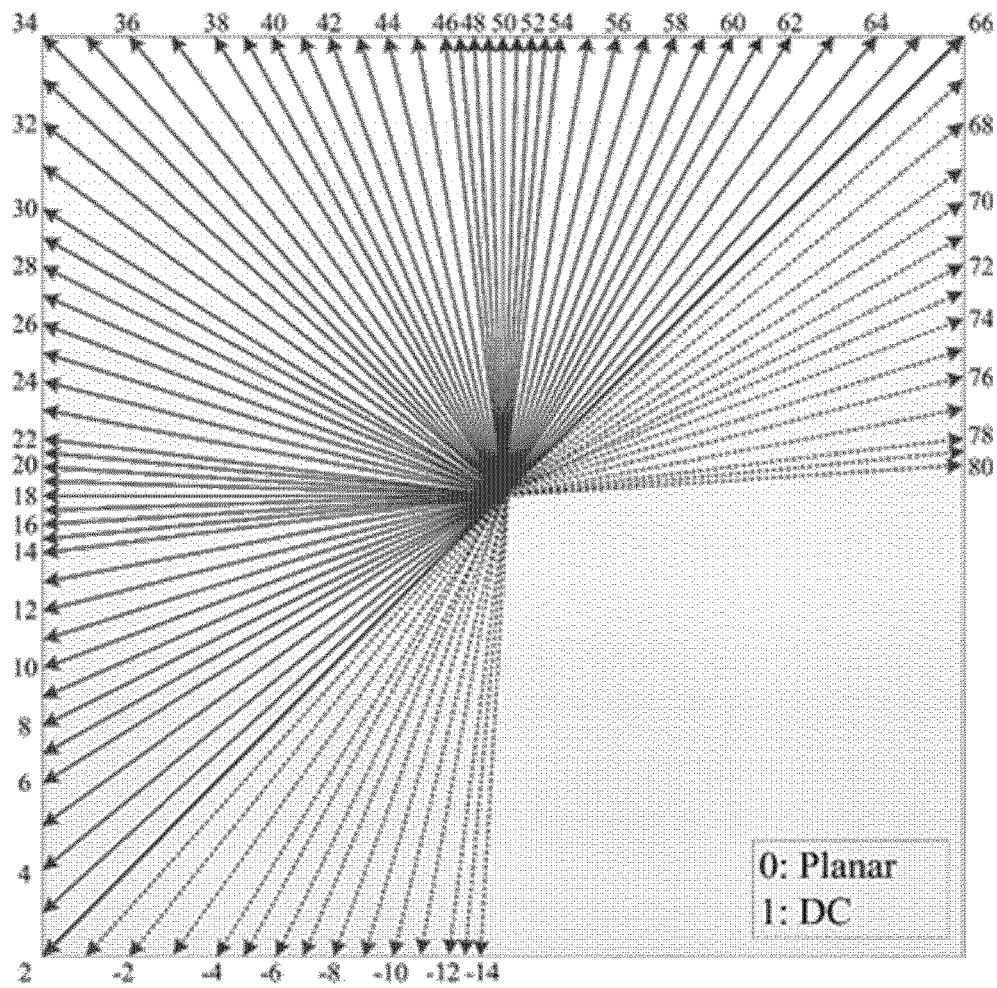

FIGS. 5 and 6 more specifically illustrate an intra prediction method according to an embodiment of the present invention. As described above, the intra prediction unit predicts the sample values of the current block by using the restored samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

In addition, if at least some of the samples to be used as reference samples have not been restored, the intra prediction unit may obtain a reference sample by performing a reference sample padding process. In addition, the intra prediction unit may perform a reference sample filtering process to reduce errors in intra prediction. That is, performing filtering on surrounding samples and/or reference samples obtained by a reference sample padding process may be performed to obtain filtered reference samples. The intra prediction unit predicts the samples of the current block using the reference samples thus obtained. The intra prediction unit predicts samples of the current block by using reference samples that have not been filtered or reference samples that have been filtered. In the present disclosure, surrounding samples may include samples on at least one reference line. For example, the surrounding samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

On the other hand, in order to increase coding efficiency, instead of coding the residual signal described above as it is, a method in which a transform coefficient value obtained by transforming the residual signal is quantized and the quantized transform coefficient is coded may be used. As described above, the transform unit may obtain a transform coefficient value by transforming the residual signal. In this case, the residual signal of a specific block may be distributed over the entire region of the current block. Accordingly, it is possible to improve coding efficiency by concentrating energy in the low frequency domain through frequency domain transform on the residual signal. Hereinafter, a method for transforming or inversely transforming a residual signal will be described in detail.

Figure 7:
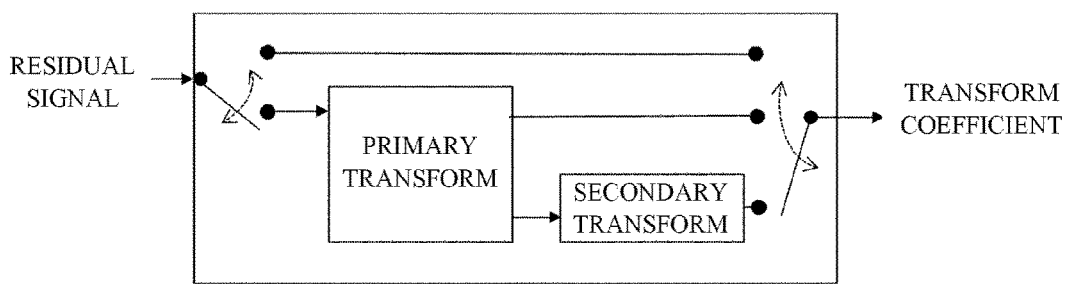
FIG. 7 is a diagram specifically illustrating a method for transforming a residual signal by an encoder.

FIG. 7 is a diagram specifically illustrating a method for transforming a residual signal by an encoder. As described above, the residual signal in a spatial domain may be transformed to a frequency domain. The encoder may obtain a transform coefficient by transforming the obtained residual signal. First, the encoder may acquire at least one residual block including a residual signal for the current block. The residual block may be any one of the current block or blocks into which the current block is divided. In the present disclosure, the residual block may be referred to as a residual array or a residual matrix including residual samples of the current block. In addition, in the present disclosure, the residual block may represent a transform unit or a block having the same size as the size of the transform block.

Next, the encoder may transform the residual block using a transform kernel. The transform kernel used for transforming the residual block may be a transform kernel having separable characteristics into a vertical transform and a horizontal transform. In this case, the transform on the residual block may be separable into the vertical transform and the horizontal transform. For example, the encoder may perform the vertical transform by applying a transform kernel in the vertical direction of the residual block. In addition, the encoder may perform the horizontal transform by applying a transform kernel in the horizontal direction of the residual block. In the present disclosure, the transform kernel may be used as a term to refer to a parameter set used for transforming the residual signal such as transform matrix, transform array, and transform function. According to an embodiment, the transform kernel may be any one of a plurality of available kernels. Further, a transform kernel based on different transform types may be used for each of the vertical transform and the horizontal transform. A method for selecting one of multiple available transform kernels will be described later with reference to FIGS. 12 to 13.

The encoder may transmit a transform block transformed from the residual block to a quantization unit to quantize it. In this case, the transform block may include a plurality of transform coefficients. Specifically, the transform block may be composed of a plurality of transform coefficients arranged in two dimensions. Like the residual block, the size of the transform block may be the same as that of any one of the current block or the block into which the current block is divided. The transform coefficients transferred to the quantization unit may be expressed as quantized values.

In addition, the encoder may perform an additional transform before the transform coefficient is quantized. As illustrated in FIG. 7, the above-described transform method may be referred to as a primary transform, and an additional transform may be referred to as a secondary transform. The secondary transform may be selective for each residual block. According to an embodiment, the encoder may improve coding efficiency by performing the secondary transform on a region where it is difficult to concentrate energy in a low-frequency domain only by the primary transform. For example, the secondary transform may be added to a block in which residual values appear relatively large in a direction other than the horizontal or vertical direction of the residual block. The residual values of the intra-predicted block may have a relatively high probability of changing in a direction other than the horizontal or vertical direction compared to the residual values of the inter-predicted block. Accordingly, the encoder may additionally perform the secondary transform on the residual signal of the intra-predicted block. In addition, the encoder may omit the secondary transform on the residual signal of the inter-predicted block.

For another example, whether to perform the secondary transform may be determined according to the size of the current block or the residual block. In addition, transform kernels having different sizes may be used according to the size of the current block or the residual block. For example, a 8×8 secondary transform may be applied to a block in which the shorter side of the width or height is shorter than a first preset length. In addition, a 4×4 secondary transform may be applied to a block in which the shorter side of the width or height is greater than a second preset length. In this case, the first preset length may be a value greater than the second preset length; however, the present disclosure is not limited thereto. Furthermore, unlike the primary transform, the secondary transform may not be separable into the vertical transform and the horizontal transform. This secondary transform may be referred to as a low frequency non-separable transform (LFNST).

In addition, in the case of a video signal in a specific region, energy in a high frequency band may not be reduced even when a frequency transform is performed due to a sudden change in brightness. Accordingly, the performance of compaction performance due to quantization may deteriorate. In addition, when a transform is performed on a region in which the residual value rarely exists, encoding time and decoding time may unnecessarily increase. Accordingly, the transform on the residual signal of the specific region may be omitted. Whether to perform the transform on the residual signal of the specific region may be determined by a syntax element related to the transform of the specific region. For example, the syntax element may include transform skip information. The transform skip information may be a transform skip flag. When the transform skip information on the residual block indicates transform skip, the transform on the residual block is not performed. In this case, the encoder may immediately quantize the residual signal on which the transform of the region has not been performed. The operations of the encoder described with reference to FIG. 7 may be performed through the transform unit of FIG. 1.

The above-described syntax elements related to the transform may be information parsed from a video signal bitstream. The decoder may entropy decode the video signal bitstream to obtain the syntax elements related to the transform. In addition, the encoder may generate a video signal bitstream by entropy coding the syntax elements related to the transform.

FIG. 8 is a diagram specifically illustrating a method for acquiring a residual signal by inverse transforming a transform coefficient by an encoder and a decoder. Hereinafter, for convenience of description, it will be described that an inverse transform operation is performed through the inverse transform unit of each of the encoder and the decoder. The inverse transform unit may obtain the residual signal by inverse transforming an inverse quantized transform coefficient. First, the inverse transform unit may detect whether or not an inverse transform of a specific region is performed from the transform-related syntax element of the specific region. According to an embodiment, when a transform-related syntax element on a specific transform block indicates a transform skip, the transform on the transform block may be omitted. In this case, both the inverse primary transform and the inverse secondary transform may be omitted for the transform block. In addition, the inverse quantized transform coefficient may be used as the residual signal. For example, the decoder may reconstruct the current block by using the inverse quantized transform coefficient as the residual signal. The above-described inverse primary transform represents an inverse transform for the primary transform, and may be referred to as a primary inverse transform.

According to another embodiment, the transform-related syntax element for the specific transform block may not indicate a transform skip. Here, the inverse transform unit may determine whether to perform inverse secondary transform for secondary transform. For example, if the transform block is a transform block of an intra-predicted block, inverse secondary transform may be performed on the transform block. In addition, a secondary transform kernel used for the corresponding transform block may be determined based on an intra prediction mode corresponding to the transform block. As another example, whether to perform inverse secondary transform may be determined based on the size of the transform block.

The inverse transform unit may perform inverse primary transform of the dequantized transform coefficient or the inverse secondary transformed transform coefficient. Like the primary transform, the inverse primary transform may be separable into a vertical transform and a horizontal transform. For example, the inverse transform unit may perform a vertical inverse transform and a horizontal inverse transform on the transform block to obtain a residual block. The inverse transform unit may inverse transform the transform block based on the transform kernel used for transforming the transform block. For example, the encoder may explicitly or implicitly signal information indicating a transform kernel applied to the current transform block among a plurality of available transform kernels. The decoder may select a transform kernel to be used for an inverse transform of the transform block among a plurality of available transform kernels by using information indicating the signaled transform kernel. The inverse transform unit may reconstruct the current block by using the residual signal obtained through inverse transform on the transform coefficient.

On the other hand, the distribution of the residual signal of a picture may be different for each region. For example, a distribution of values for the residual signal in a specific region may vary according to the prediction method. When transforming a plurality of different transform regions using the same transform kernel, coding efficiency may vary for each transform region depending on distributions and characteristics of values in the transform region. Accordingly, when a transform kernel used for transforming a specific transform block is adaptively selected from among a plurality of available transform kernels, coding efficiency may be further improved. That is, the encoder and the decoder may be configured to additionally use a transform kernel other than the basic transform kernel in transforming a video signal. A method for adaptively selecting a transform kernel may be referred to as an adaptive multiple core transform (AMT) or multiple transform selection (MTS). A method of adaptively selecting a transform kernel will be described later with reference to related drawings. In the present disclosure, for convenience of explanation, transform and inverse transform may be collectively referred to as transform. Further, the transform kernel and the inverse transform kernel are collectively referred to as a transform kernel.

Hereinafter, multiple transform kernels that can be used for the transform of a video signal will be described with reference to FIG. 9. According to an embodiment of the present disclosure, a transform kernel may be a kernel derived based on a specific basis function. Each of the multiple different transform kernels may be obtained based on a different basis function. Multiple transform kernels may be obtained based on a basis function corresponding to each of different transform types.

FIG. 9 illustrates a basis function corresponding to each transform type. According to an embodiment, a transform kernel usable for transform of a video residual signal may include at least one of a transform kernel based on discrete cosine transform type 2 (DCT-II), a transform kernel based on discrete cosine transform type 5 (DCT-V), a transform kernel based on discrete cosine transform type 8 (DCT-VIII), a transform kernel based on discrete sine transform type 1 (DST-I), and a transform kernel based on discrete sine transform type 7 (DST-VII).

Referring to FIG. 9, basis functions corresponding to the above-described respective transform types of DCT-II, DCT-V, DCT-VIII, DST-I, and DST-VII may be expressed as cosine or sine functions. For example, the basis functions corresponding to respective DCT-II, DCT-V, and DCT-VIII may be a cosine-type function, and the basis functions corresponding to respective DST-I and DST-VII may be a sine type function. Further, the basis function corresponding to a specific transform type may be expressed in the form of a basis function for each frequency bin. For example, a basis function of Ti(j) may be a basis function corresponding to the i-th frequency bin. That is, as a value indicated by i is smaller, a basis function corresponding to a lower frequency is indicated. Further, as a value indicated by i is greater, a basis function corresponding to a higher frequency is indicated. In FIG. 9, j may indicate an integer from 0 to N−1.

The basis function of Ti(j) may be expressed as a two-dimensional matrix representing an element in the i-th row and the j-th column. Here, a transform using transform kernels based on the transform type of FIG. 9 has a separable characteristic in performing transform. That is, transform on the residual signal may be separately transformed in each of a horizontal direction and a vertical direction. For example, a transform using transform matrix T regarding residual block X may be expressed as matrix operation TXT'. Here, T' refers to a transpose matrix of transform matrix T. In addition, inverse transform using transform matrix T regarding transform block Y may be expressed as T'YT.

Values of the transform matrix defined by the basis functions illustrated in FIG. 9 may be in a decimal form rather than an integer form. It may be difficult to implement decimal values in hardware in a video encoding apparatus and a decoding apparatus. Therefore, a transform kernel integer-approximated from an original transform kernel including values in the form of decimals may be used for encoding and decoding of a video signal. The approximated transform kernel including integer values may be generated via scaling and rounding of the original transform kernel. The integer value included in the approximated transform kernel may be a value within a range that is expressible by a preconfigured number of bits. The preconfigured number of bits may be 8 or 10. According to the approximation, orthonormal properties of DCT and DST may not be maintained. However, a coding efficiency loss resulting therefrom is not large, and therefore it may be advantageous, in terms of hardware implementation, to approximate the transform kernel in an integer form.

Figure 10:
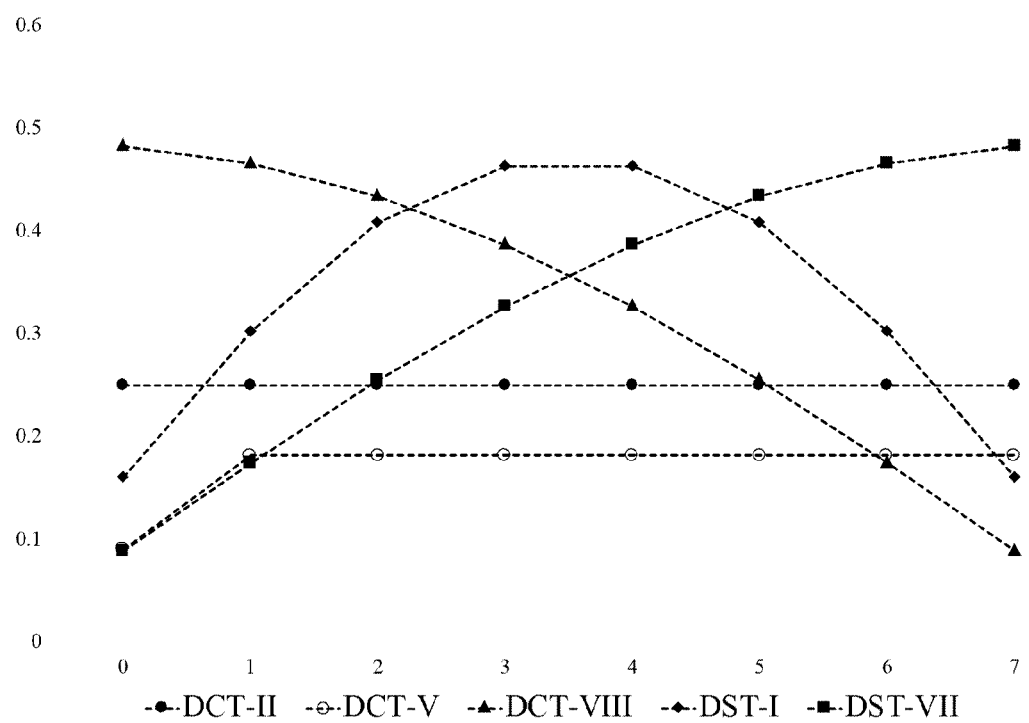
FIG. 10 illustrates a signal magnitude for each index of transform types of DCT-II, DCT-V, DCT-VIII, DST-I, and DST-VII.

FIG. 10 illustrates a signal magnitude for each index of transform types of DCT-II, DCT-V, DCT-VIII, DST-I, and DST-VII. FIG. 10 illustrates a form of a basis function corresponding to a lowest frequency bin from among basis functions for each frequency bin. FIG. 10 illustrates a basis function corresponding to a 0-th frequency bin from among basis functions for each frequency bin. In FIG. 10, a horizontal axis represents index j (j=0, 1, . . . , N−1) in the basis function, and a vertical axis represents a magnitude value of a signal. N represents the number of samples in a specific area to be subjected to transform.

As illustrated in FIG. 10, in DST-VII, as index j increases, a signal magnitude tends to increase. Therefore, like a residual block of an intra-predicted block, DST-VII may be efficient for transform of a residual block in which a magnitude of a residual signal increases as the distance in the horizontal and vertical directions increases with reference to the upper left of the residual block.

On the other hand, in DCT-VIII, as index j increases, a signal magnitude tends to decrease. That is, DCT-VIII satisfies duality characteristics with DST-VII. Therefore, DCT-VIII may be effective for transform of a residual block in which a magnitude of a residual signal decreases as the distance in the horizontal and vertical directions increases with reference to the upper left of the residual block.

In DST-I, as index j in the basis function increases, a signal magnitude increases, and then the signal magnitude decreases starting from a specific index. Therefore, DST-I may be efficient for transform of a residual block having a large residual signal magnitude at the center thereof.

A 0-th basis function of DCT-II represents DC. Therefore, it may be efficient for transform of a residual block having a uniform signal magnitude distribution inside thereof.

DCT-V is similar to DCT-II. However, in DCT-V, a signal magnitude when index j is 0 has a value smaller than that of a signal magnitude when index j is not 0. That is, when index j is 1, DCT-V has a signal model in which a straight line is bent.

As described above, if a transform kernel having a separable characteristic is used, transform may be performed in each of the horizontal and vertical directions of the residual block. Specifically, transform of the residual block may be performed conducting a 2D matrix multiplication operation twice. The matrix multiplication operation may involve the computation amount, which corresponds to a level equal to or higher than a preconfigured level. Accordingly, when the residual block is transformed using a DCT-II-based transform kernel, the computation amount may be reduced by using a butterfly structure. However, implementation of DST-VII and DCT-VIII may be difficult in terms of the computation amount, due to relatively high implementation complexity. Accordingly, transform types, which have similar characteristics to those of DST-VII and DCT-VIII, respectively, and have relatively low implementation complexity, may be used.

Figure 11:
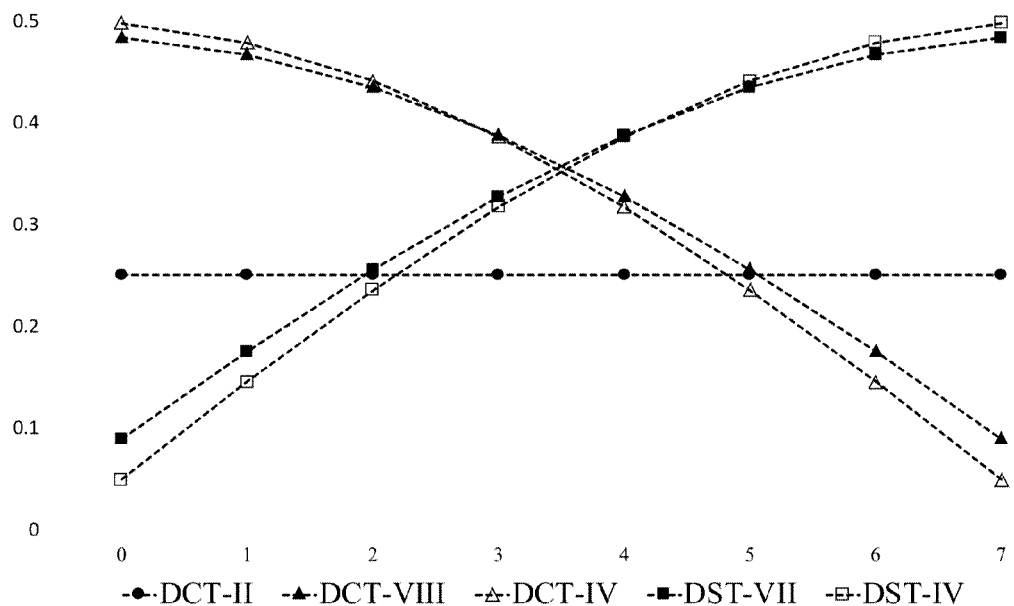
FIG. 11 illustrates a signal magnitude for each index of transform types of DST-IV, DCT-IV, DST-VII, and DCT-VIII.

According to an embodiment, discrete sine transform type-IV (DST-IV) and discrete cosine transform type-IV (DCT-IV) may replace DST-VII and DCT-VIII, respectively. FIG. 11 illustrates a signal magnitude for each index of a transform type, such as DST-IV, DCT-IV, DST-VII, and DCT-VIII. FIG. 11(a) illustrates a basis function corresponding to DST-IV and a basis function corresponding to DCT-IV. DST-IV and DCT-IV for the number of samples, N, may be derived from DCT-II for the number of samples, 2N. That is, a DCT-II partial butterfly structure for the number of samples, 2N, includes DCT-IV for the number of samples, N. DST-IV for the number of samples, N, may be implemented by arranging a sign inversion operation and a corresponding basis function in reverse order from DCT-IV for the number of samples, N.

As illustrated in FIG. 11(b), DST-IV indicates a signal model similar to that of DST-VII. Accordingly, like a residual block of an intra-predicted block, DST-IV may be efficient for transform of a residual block in which a residual signal magnitude increases as the distance in the horizontal and vertical directions increases with reference to the upper left of the residual block. DCT-IV shows a signaling model similar to that of DCT-VIII. Accordingly, DCT-IV may be effective for transform of a residual block having a residual signal magnitude, which is largest at a specific boundary and decreases in the direction to another boundary further from the specific boundary.

If only a transform kernel based on one of the above-described transform types is used for transforming of a video signal, it is difficult to perform adaptive transform according to a characteristic of an original signal and a pattern of a residual signal, which varies according to a prediction mode. Therefore, in transform of a residual signal, an encoder and a decoder according to an embodiment of the present disclosure may improve coding efficiency by using a transform kernel selected for each area from among multiple available transform kernels.

In the existing high efficiency video coding (HEVC) standard, a residual signal is transformed using a DCT-II-based transform kernel from among the multiple transform types described above, and residual signal transform is performed by limitedly using a DST-VII-based transform kernel for only an intra-predicted block having the size of 4×4. As described above, DCT-II may be suitable for transform of a residual signal of an inter-predicted block, but may not be suitable for transform of a residual signal of an intra-predicted block. That is, according to a method of predicting a current block, a pattern of a residual signal within the residual block may differ.

Accordingly, at least one transform kernel selected from among multiple available transform kernels may be used for transforming of a specific transform block. According to an embodiment, the encoder and the decoder may select a transform kernel for at least one transform area of the current block, based on the method of predicting the current block. This method may be referred to as adaptive multiple core transform (AMT) described above. If a transform kernel determined according to a prediction method for a specific area is used for transforming of the corresponding area, coding efficiency may be improved compared to a case where transform is performed for all areas by using a DCT-II-based transform kernel.

FIG. 12 illustrates a method of configuring a transform candidate set according to a prediction mode of a current block. According to an embodiment of the present disclosure, an encoder and a decoder may select a transform kernel used for at least one transform area of a current block, based on a transform candidate set corresponding to the current block. The transform candidate set may include multiple candidate transform kernels. The transform candidate set may include different candidate transform kernels according to a prediction mode of the current block.

According to an embodiment, the current block may be a block predicted based on one of multiple intra prediction modes. Here, a pattern of a residual signal of the current block may differ according to the intra prediction mode used for prediction of the current block. As described above, intra prediction mode information may indicate an intra prediction direction. Accordingly, the pattern of the residual signal of the current block may differ according to a prediction direction indicated by intra prediction mode information of the current block. The encoder and the decoder may improve coding efficiency by using multiple different transform candidate sets according to the prediction direction.

Accordingly, the encoder and the decoder may determine a transform kernel to be used in a transform area of the current block from a transform candidate set corresponding to the intra prediction mode of the current block. For example, the transform kernel to be used in the transform area may be signaled via a candidate index indicating one of multiple candidate transform kernels included in the transform candidate set. If the transform candidate set corresponding to the intra prediction mode of the current block includes two candidate transform kernels, a candidate index indicating the transform kernel used in the transform area may be expressed as 1-bit.

Further, different transform candidate sets may be used for each of the vertical and horizontal directions of the transform area. Due to characteristics of the intra prediction method preformed based on directionality, a vertical direction pattern and a horizontal direction pattern of a residual signal of a predicted area may be different from each other. Therefore, a vertical transform kernel and a horizontal transform kernel for a block predicted using a specific intra prediction mode may be obtained from an individual transform candidate set. In the present disclosure, a transform kernel used for vertical transform of a specific transform area may be referred to as a vertical transform kernel. A transform kernel used for horizontal transform of a specific transform area may be referred to as a horizontal transform kernel. FIG. 12(a) illustrates transform candidate sets corresponding to 67 intra prediction mode indices, respectively. In FIG. 12(a), vertical (V) denotes a transform candidate set for a vertical transform kernel. Horizontal (H) denotes a transform candidate set for a horizontal transform kernel.

FIG. 12(b) illustrates a candidate transform kernel defined according to a transform candidate set. According to an embodiment, a first transform candidate set (e.g., transform set 0 in FIG. 12B) may include a candidate transform kernel based on DST-VII and a candidate transform kernel based on DCT-VIII. A second transform candidate set (e.g., transform set 1 in FIG. 12(b)) may include a candidate transform kernel based on DST-VII and a candidate transform kernel based on DST-I. A third transform candidate set (e.g., transform set 2 in FIG. 12(b)) may include a candidate transform kernel based on DST-VII and a candidate transform kernel based on DCT-V. FIG. 12 illustrates that a transform candidate set includes two candidate transform kernels, but the present disclosure is not limited thereto.

According to another embodiment, the current block may be an inter-predicted block. Here, a transform kernel used in a transform area of the current block may be obtained from a preconfigured transform candidate set. For example, the preconfigured transform candidate set may be one of the above-described multiple transform candidate sets. FIG. 12(c) illustrates a transform candidate set corresponding to a current block if the current block is an inter prediction block. For example, the preconfigured transform candidate set corresponding to the inter prediction block may include a candidate transform kernel based on DCT-VIII and a candidate transform kernel based on DST-VII. That is, a transform kernel used for the transform area of the inter prediction block may be one of a candidate transform kernel based on DCT-VIII and a candidate transform kernel based on DST-VII.

According to an additional embodiment, the above-described embodiments may be limitedly applied only to a transform block of a luma component. Here, a preconfigured default transform kernel may be used for a transform block of a chroma component. For example, the default transform kernel may be a DCT-II-based transform kernel.

According to an additional embodiment, the encoder may not signal a candidate index according to the number of non-zero transform coefficients in the transform area. Here, the decoder may determine a transform kernel by comparing the number of non-zero transform coefficients in the transform area with a preconfigured number. For example, if the number of non-zero transform coefficients is one or two, the candidate index may not be signaled. Here, an inverse transform unit may perform transform of the corresponding area by using a preconfigured transform kernel. The preconfigured transform kernel may be a DST-VII-based transform kernel.

FIG. 13 illustrates a horizontal transform kernel and a vertical transform kernel determined according to a set index. According to an embodiment of the present disclosure, information indicating a transform kernel for a residual signal of a specific area from among multiple available transform kernels may be signaled. Here, information indicating one of the multiple available transform kernels may be signaled regardless of a prediction mode corresponding to the corresponding area. For example, an encoder may signal transform kernel information indicating the transform kernel for the residual signal of the specific area. A decoder may obtain the transform kernel for the corresponding area by using the signaled transform kernel information. The transform kernel information may include at least one of information indicating a horizontal transform kernel of the corresponding area and information indicating a vertical transform kernel of the corresponding area. This method may be referred to as multiple transform selection (MTS) described above.

The transform kernel may be indicated by one of kernel indices indicating the multiple available transform kernels, respectively. According to an embodiment, a transform kernel corresponding to kernel index '0' may be a DCT-II-based transform kernel, a transform kernel corresponding to kernel index '1' may be a DST-VII-based transform kernel, and a transform kernel corresponding to kernel index '2' may be a DCT-VIII-based transform kernel.

According to an embodiment, transform kernel information may be a set index indicating a transform kernel set. The transform kernel set may represent a combination of a transform kernel to be used as a vertical transform kernel and a transform kernel to be used as a horizontal transform kernel. The set index may indicate a combination of a kernel index indicating a horizontal transform kernel and a kernel index indicating a vertical transform kernel. Referring to FIG. 13(a), when transform kernel information of a specific area indicates a set index indicating a first transform kernel set (for example, in a case of FIG. 13(a) where tu_mts_idx [x0][y0] is 0), a vertical transform kernel of the corresponding area may be a transform kernel corresponding to kernel index '0'. A horizontal transform kernel of the area may be a transform kernel corresponding to kernel index '0'.

Further, FIG. 13(b) illustrates a transform kernel corresponding to a kernel index. Referring to FIG. 13(b), a transform kernel corresponding to first kernel index "0" may indicate a DCT-II-based transform kernel. Referring to FIG. 13(b), a transform kernel corresponding to second kernel index "1" may indicate a DST-VII-based transform kernel. Referring to FIG. 13(b), a transform kernel corresponding to third kernel index "2" may indicate a DCT-VIII-based transform kernel.

According to an additional embodiment, the above-described embodiments may be limitedly applied only to a luma block. Here, a preconfigured default transform kernel may be used for a chroma component. For example, the default transform kernel may be a transform kernel based on DCT-II. The above-described set index may be signaled in units of transform blocks.

Further, information indicating whether a set index is signaled may be signaled via a header of a high level including a current block. Here, the high level may indicate a slice/tile, a picture, or a sequence, which includes the current block. Information indicating whether the set index is signaled may be signaled via an individual flag for each prediction method. For example, in determination of a transform kernel of a block, a flag indicating whether a set index is used may be independently configured for each of an intra-predicted block and an inter-predicted block.

According to an embodiment, if information, which indicates whether a set index of a high level including a transform block is signaled, indicates that the set index is not explicitly signaled, a transform kernel regarding the corresponding transform block may be determined using a different method. For example, a transform kernel to be applied to inverse transform of the current transform block may be determined based on information derived from information other than the set index. Specifically, the decoder may derive information indicating the transform kernel for the current transform block, from information signaled in relation to the current transform block. That is, information indicating a vertical transform kernel and information indicating a horizontal transform kernel, which are to be used in the transform block may be implicitly signaled. According to another embodiment, if information, which indicates whether a set index of a high level including a transform block is signaled, indicates that the set index is explicitly signaled, the decoder may obtain a transform kernel for the transform block based on the signaled set index.

According to an additional embodiment, whether the encoder signals a set index may be determined according to the number of non-zero transform coefficients in a transform area. Here, the decoder may determine the transform kernel by comparing the number of non-zero transform coefficients in the transform area with a preconfigured number. For example, if the number of non-zero transform coefficients is two or less, the set index may not be signaled. Here, an inverse transform_unit may perform transform of the corresponding area by using a preconfigured transform kernel. The preconfigured transform kernel may be a DST-VII-based transform kernel.

A pixel of an input image in an image compression system may have three values including red (R), green (G), and blue (B) (RGB color space), and each of R, G, and B channels may be independently encoded. However, this encoding is not efficient for a natural image obtained by a digital camera. This is because each channel in RBG color space has a high correlation therebetween, and, generally, in order to efficiently compress an RGB image, the RGB image may be transformed to be in a different color space for encoding. A transform between color spaces as described above may be called a color space transform or a color transform, and a color space transform most commonly used in compression of an RGB image may be a transform from RGB color space to YCbCr color space. In a case of RGB color space, R, G, and B channels all represent color components, but, in YCbCr color space, Y represents a luma component, and Cb and Cr represent chroma components. The vision system of human beings is more sensitive to a luma component than to a chroma component, and thus, in a case of sub-sampling a chroma component, and quantizing luma and chroma components by applying a larger quantization step size to the chroma component than to the luma component, a color image may be efficiency compressed. According to the degree of sub-sampling of a chroma component, YCbCr 4:4:4, 4:2:2, and 4:2:0 images may be distinguished. This transform from RGB color space to YCbCr color space is considered to be useful in view of image compression, but causes loss of information in a color transform process, and is thus difficult to be used in a lossless image compression or a close lossless image compression application field. In view of loss of information, the best way to encode an RGB image is to directly encode an RGB original image without transform of color space. However, as described above, this encoding can not achieve a high compression efficiency due to redundancy existing in RGB color space.

Adaptive color transform (ACT, adaptive color space transform, adaptive color transform) adaptively performs a color space transform according to characteristics of an image signal, so that redundancy existing between channels may be removed, and an encoding efficiency may be improved. ACT may be applied to a residual signal after prediction by an encoder, and may selectively transform the color space of the residual signal. Selected color space information may be included in a bitstream and then be transmitted, and a decoder may inverse-transform the color space of the residual signal obtained through an inverse-transform, based on the received color space information.

Hereinafter, ACT and inverse-ACT processes are described with reference to FIG. 14 and FIG. 15 in detail.

FIG. 14 is a diagram illustrating in detail a method of transforming a residual signal into a transform coefficient by an encoder performing an ACT. A residual signal in a space area may be transformed to be in a frequency area, and an encoder may transform a residual signal in a space area, which is obtained after a prediction, so as to obtain a transform coefficient. First, the encoder may obtain at least one residual block including a residual signal of a current block. The residual block may be one of the current block or blocks obtained by partitioning the current block. In the present disclosure, the residual block may be called a residual array or a residual matrix including residual samples of the current block. In addition, in the present disclosure, the residual block may indicate a block having the same size as a transform block or a transform_unit.

Next, the encoder may perform an adaptive color transform. The adaptive color transform may be applied to the residual signal, and a residual signal in a first color space may be transformed into a residual signal in a second color space. The first color space may be configured by multiple color channels (or components) including a first channel, a second channel, a third channel, and the like, and may be a color space such as GBR or YCbCr. In GBR color space, the first channel indicates green (G), the second channel indicates blue (B), and the third channel indicates red (R). In YCbCr color space, the first channel indicates Y (luma), the second channel indicates Cb (chroma), and the third channel indicates Cr (chroma). The second color space may be configured by multiple color channels (or components) including a first channel, a second channel, a third channel, and the like, and may be a color space such as YCgCo or YCbCr. In YCgCo color space, the first channel indicates Y (luma), the second channel indicates Cg (chroma), and the third channel indicates Co (chroma), and a transform (forward transform) from the first color space to YCgCo color space that is the second color space may be defined according to the following equation.

$C'\_0=(2*C\_0+C\_1+C\_2)/4$ $C'\_1=(2*C\_0-C\_1-C\_2)/4$ $C'\_2=(-2*C\_1+2*C\_2)/4$ [Equation 1]

In the above equation, $C\_0$, $C\_1$, and $C\_2$ indicate the first channel, the second channel, and the third channel of the first color space, respectively, and for example, may be G, B, and R channels in GBR color space or Y, Cb, and Cr channels in YCbCr color space. $C'\_0$, $C'\_1$, and $C'\_2$ indicate Y, the first channel in YCgCo color space that is the second color space, Cg, the second channel, and Co, the third channel, respectively. An inverse transform from YCgCo color space that is the second color space to the first color space may be defined according to the following equation.

$C\_0=(C'\_0+C'\_1)$ $C\_1=(C'\_0-C'\_1-C'\_2)$ $C\_2=(C'\_0-C'\_1+C'\_2)$ [Equation 2]

The best color space in image compression is a color space having channels exhibiting uncorrelated properties therebetween. Therefore, a correlation matrix between color components of a sufficient color image data set is calculated, and a Karhunen-Loeve transform (KLT) is applied thereto, so that a transform equation minimizing correlation may be obtained. A transform to YCgCo color space may effectively reduce correlation existing between channels of RGB (or GBR) color space, and the inverse transform described above is implemented by only add operations.

The encoder may adaptively select a color space in view of rate-distortion cost, and information on the color space may be included in a bitstream and then be transmitted. For example, an ACT may be applied in a coding unit level, and a color space transform activation flag (cu_act_enabled_flag) may be signaled. When the color space transform activation flag (cu_act_enabled_flag) is 1, the residual of a current coding unit has been encoded to be in YCgCo color space, and when the color space transform activation flag (cu_act_enabled_flag) is 0, the residual of the current coding unit has been encoded to be in the original color space, and this may indicate that an ACT has not been applied.

Next, the encoder may transform the residual block by using a transform kernel. The transform kernel used in transform of the residual block may be a transform kernel which is separable into a vertical transform and a horizontal transform. In this case, a transform of the residual block may be divided into a vertical transform and a horizontal transform, and then be performed. For example, the encoder may apply a transform kernel in the vertical direction of the residual block to perform a vertical transform. In addition, the encoder may apply a transform kernel in the horizontal direction of the residual block to perform a horizontal transform. In the present disclosure, the transform kernel may be used as a term indicating a parameter set used for transform of a residual signal, such as a transform matrix, a transform array, a transform function, and a transform. According to an embodiment, the transform kernel may be one of multiple available kernels. In addition, transform kernels based on different transform types may be used for a vertical transform and a horizontal transform, respectively. According to the transform kernel selecting method described above with reference to FIG. 12 and FIG. 13, one of multiple available transform kernels may be selected.

The encoder may transfer a transform block obtained by transforming the residual block to a quantization unit, and quantizes same. The transform block may include multiple transform coefficients. Specifically, the transform block may include two-dimensionally arranged multiple transform coefficients. Similar to the residual block, the transform block may have the same size as one of a current block or a block obtained by partitioning the current block. The transform coefficients transferred to the quantization unit may be represented by a quantized value.

In addition, before the transform coefficients are quantized, the encoder may perform an additional transform. As illustrated in FIG. 14, the transform method described above may be called a primary transform, and the additional transform may be called a secondary transform. A secondary transform may be selective for each residual block. According to an embodiment, the encoder may perform a secondary transform to an area which is difficult to focus energy on in a low-frequency area with only a primary transform, so as to improve a coding efficiency. For example, a secondary transform may be added to a block having large residual values in the directions other than the horizontal or the vertical direction of the residual block. Residual values of an intra-predicted block may have a higher probability of changing in the directions other than the horizontal or the vertical direction, compared to residual values of an inter-predicted block. Accordingly, the encoder may additionally perform a secondary transform of a residual signal of an intra-predicted block. In addition, the encoder may omit a secondary transform of a residual signal of an inter-predicted block.

As another example, whether to perform a secondary transform may be determined according to the size of a current block or a residual block. In addition, transform kernels with different sizes may be used according to the size of a current block or a residual block. For example, an 8×8 secondary transform may be applied to a block in which the length of a shorter side among the width or the height is smaller than a first pre-configured length. In addition, a 4×4 secondary transform may be applied to a block in which the length of a shorter side among the width or the height is greater than a second pre-configured length. The first pre-configured length may be larger than the second pre-configured length, but the present disclosure is not limited thereto. In addition, unlike a primary transform, a secondary transform may not be divided into a vertical transform and a horizontal transform. Such a secondary transform may be called a low frequency non-separable transform (LFNST).

In addition, in a case of a video signal in a particular area, due to a rapid brightness change, a high-frequency band energy may not be reduced even when a frequency transform is performed. Accordingly, a compression performance due to quantization may degrade. In addition, when a transform is performed on an area in which residual values rarely exist, encoding time and decoding time may be unnecessarily increased. Accordingly, a transform of a residual signal in a particular area may be omitted. Whether to perform a transform of a residual signal in a particular area may be determined by a syntax element related to a transform of the particular area. For example, the syntax element may include transform skip information. The transform skip information may be a transform skip flag. When transform skip information related to a residual block indicates a transform skip, a transform of the residual block is not performed. In this case, the encoder may immediately quantize a residual signal which has not been transformed in a corresponding area. The operations of the encoder described with reference to FIG. 14 may be performed by the transform unit of FIG. 1.

The transform-related syntax elements described above may be information parsed from a video signal bitstream. A decoder may obtain transform-related syntax elements by entropy-decoding a video signal bitstream. In addition, the encoder may entropy-code transform-related syntax elements to generate a video signal bitstream.

FIG. 15 is a diagram illustrating in detail a method of inverse-transforming a transform coefficient to obtain a residual signal by a decoder performing an adaptive color transform. Hereinafter, for convenience of explanation, an inverse transform operation will be described to be performed by an inverse transform unit of each of an encoder and a decoder. An inverse transform unit may obtain a residual signal by inverse-transforming an inverse-quantized transform coefficient. First, the inverse transform unit may detect, from a transform-related syntax element of a particular area, whether an inverse transform of the corresponding area is performed. According to an embodiment, when a transform-related syntax element related to a particular transform block indicates a transform skip, a transform of the corresponding transform block may be omitted. In this case, a primary inverse transform and a secondary inverse transform as described above of the transform block may be both omitted. In this case, an inverse-quantized transform coefficient may be used as a residual signal, or a residual signal may be obtained by performing an inverse adaptive color transform (inverse ACT) of an inverse-quantized transform coefficient. The inverse transform unit may reconstruct a current block by using the obtained residual signal.

According to another embodiment, the transform-related syntax element related to the particular transform block may not indicate a transform skip. In this case, the inverse transform unit may determine whether to perform an inverse secondary transform related to a secondary transform. For example, when a transform block is a transform block of an intra-predicted block, an inverse secondary transform of the transform block may be performed. In addition, a secondary transform kernel used for the transform block may be determined based on an intra prediction mode corresponding to the transform block. As another example, whether to perform an inverse secondary transform may be determined according to the size of a transform block. An inverse secondary transform may be performed before an inverse primary transform is performed after an inverse quantization process.

The inverse transform unit may perform an inverse primary transform of an inverse-quantized transform coefficient or a transform coefficient for which an inverse secondary transform has been performed. Similar to a primary transform, an inverse primary transform may be divided into a vertical transform and a horizontal transform so as to be performed. For example, the inverse transform unit may obtain a residual block by performing a vertical inverse transform and a horizontal inverse transform of the transform block. The inverse transform unit may inverse-transform a transform block, based on a transform kernel which has been used for transform of the transform block. For example, the encoder may explicitly or implicitly signal information indicating a transform kernel applied to a current transform block among multiple available transform kernels. The decoder may select a transform kernel to be used for inverse transform of the transform block among the multiple available transform kernels by using the signaled information indicating the transform kernel. The inverse transform unit may perform an inverse transform of a transform coefficient, or perform an inverse adaptive color transform of a signal obtained by performing an inverse transform, so as to obtain a residual signal. The inverse transform unit may reconstruct a current block by using the residual signal.

The inverse transform unit may perform an inverse adaptive color transform, based on a transform-related syntax element. An inverse adaptive color transform may be applied to a signal for which an inverse primary transform has been performed, or a signal to which a transform skip has been applied, and may perform a transform from the second color space to the first color space. A video signal processing device may perform an operation of obtaining, from a bitstream, a color space transform activation flag (cu_act_enabled_flag) indicating whether a color space transform is applied to a current block. Specifically, when the color space transform activation flag (cu_act_enabled_flag) is 1, this indicates that the residual of the current block has been encoded to be in YCgCo color space, and thus as shown in Equation 2, an inverse transform from YCgCo color space, the second color space, to the first color space may be performed. When the color space transform activation flag (cu_act_enabled_flag) is 0, this indicates that the residual of the current block has been encoded to be in an original color space, and this may indicate that an inverse adaptive color transform is not performed. Specifically, an inverse adaptive color transform shown in Equation 2 may involve a process as follows.

[Color Space Transform Process]
Process Input:
  nTbW: The width of transform block
  nTbH: The height of transform block
  rY: rY may be a first channel residual sample array of the second color space, and may be an array having a (nTbW)×(nTbH) size. The second color space may be YCgCo color space, and the first channel may indicate luma Y. An element of an rY array may be expressed by rY[x][y].
  rCb: rCb may be a second channel residual sample array of the second color space, and may be an array having a (nTbW)×(nTbH) size. The second color space may be YCgCo color space, and the second channel may indicate chroma Cg. An element of an rCb array may be expressed by rCb[x][y].
  rCr: rCr may be a third channel residual sample array of the second color space, and may be an array having a (nTbW)×(nTbH) size. The second color space may be YCgCo color space, and the third channel may indicate chroma Co. An element of an rCr array may be expressed by rCr[x][y].
  rY, rCb, and rCr array may indicate one of a signal after a transform skip is applied, or a signal after an inverse primary transform is applied.
Process Output:
  Residual sample array rY having a modified (nTbW)×(nTbH) size: According to the present process, the second color space may be transformed to the first color space, and the first channel residual sample array of the first color space may be indicated. An element of an rY array may be expressed by rY[x][y].
  Residual sample array rCb having a modified (nTbW)×(nTbH) size: According to the present process, the second color space may be transformed to the first color space, and the second channel residual sample array of the first color space may be indicated. An element of an rCb array may be expressed by rCb[x][y].
  Residual sample array rCr having a modified (nTbW)×(nTbH) size: According to the present process, the second color space may be transformed to the first color space, and the third channel residual sample array of the first color space may be indicated. An element of an rCr array may be expressed by rCr[x][y].
  rY, rCb, and rCr which are residual sample arrays each having a (nTbW)×(nTbH) size may be modified according to Equation 3 to Equation 6 below:

$$tmp = rY[x][y] - rCb[x][y] \quad \text{[Equation 3]}$$

$$rY[x][y] = rY[x][y] + rCb[x][y] \quad \text{[Equation 4]}$$

$$rCb[x][y] = tmp - rCr[x][y] \quad \text{[Equation 5]}$$

$$rCr[x][y] = tmp + rCr[x][y] \quad \text{[Equation 6]}$$

According to the color space process, rY, rCb, and rCr which are second color space residual sample arrays may be modified to be rY, rCb, rCr which are first color space residual sample arrays. The inverse transform unit may reconstruct a current block by using rY, rCb, and rCr which are modified residual sample arrays.

A case where the second color space is YCgCo color space has been described in relation to ACT and inverse ACT described with reference to FIG. 14 and FIG. 15, but the present disclosure is not limited thereto. As another example of the second color space, YCgCo-R color space may be used. YCgCo-R color space may be derived from YCgCo color space by using a lifting algorithm so as to enable perfect reconstruction with only integer operations. A forward transform from the first color space to YCgCo-R color space may be defined according to the following equation.

$$C'\_2 = C\_2 - C\_1$$

$$t = C\_1 + (C'\_2 >> 1)$$

$$C'\_1 = C\_0 - t$$

$$C'\_0 = t + (C'\_1 >> 1) \quad \text{[Equation 7]}$$

In the above equation, C_0, C_1, and C_2 indicate the first channel, the second channel, and the third channel of the first color space, respectively, and for example, may be G, B, and R channels in GBR color space or Y, Cb, and Cr channels in YCbCr color space. C'_0, C'_1, and C'_2 indicate Y, the first channel in YCgCo-R color space that is the second color space, Cg, the second channel, and Co, the third channel, respectively. An inverse transform from YCgCo-R color space that is the second color space to the first color space may be defined according to the following equation.

$$t = C'\_0 - (C'\_1 >> 1)$$

$$C\_0 = C'\_1 + t$$

$$C\_1 = t - (C'\_2 >> 1)$$

$$C\_2 = C\_1 + C'\_2 \quad \text{[Equation 8]}$$

As another example of the second color space, one of YCgCo and YCgCo-R color spaces may be adaptively selected according to a current encoding mode. For example, when an encoding mode of a current block is a lossless or a close lossless compression mode, YCgCo-R color space may be used as the second color space. Meanwhile, when an encoding mode of a current block is a loss compression mode, YCgCo color space may be used as the second color space. The lossless or close lossless compression mode, and the loss compression mode may be signaled in an encoding unit level by a flag, or may be indicated by using a quantization parameter (QP) and a transform skip flag.

Meanwhile, a transform to YCgCo color space shown in Equation 1 is not normalized. In Y=[2/4, 1/4, 1/4]*[C_0, C_1, C_2]', l2-norm of a [2/4, 1/4, 1/4] vector is equal to sqrt(6)/4. In Cg=[2/4, -1/4, -1/4]*[C_0, C_1, C_2]', l2-norm of a [2/4, -1/4, -1/4] vector is equal to sqrt(6)/4. In Co=[0, -2, 2]*[C_0, C_1, C_2], l2-norm of a [0, -2, 2] vector is equal to sqrt(8)/4. That is, a change in a dynamic range occurs before and after a color space transform, and thus a QP value may be corrected to compensate for the change. The correction may be based on a quantization parameter offset (qpActOffset). The video signal processing device may perform an operation of determining a quantization parameter offset (qpActOffset), based on a color component of a transform block included in a current block and a color space transform activation flag (cu_act_enabled_flag). The color component of the current block may include at least one of a first channel, a second channel, and a third channel. The quantization parameter offset (qpActOffset) may include at least one of a first QP offset, a second QP offset, and a third QP offset.

The video signal processing device may determine the quantization parameter offset (qpActOffset), based on the color component of the current block. When a quantization parameter (QP) applied to the first channel of the first color space is QP_0, QP'_0 that is a quantization parameter (QP) applied to the first channel of the second color space may be determined by QP_0+Offset_0, and Offset_0 indicates the first QP offset. The first QP offset may be included in a higher level syntax, such as an SPS, a PPS, a picture header, or a slice header, and then be transmitted, and a fixed value pre-defined by the encoder and the decoder may be used as the first QP offset. The first QP offset may be −5.

When a QP applied to the second channel of the first color space is QP_1, QP'_1 that is a QP applied to the second channel of the second color space may be determined by QP_1+Offset_1, and Offset_1 indicates the second QP offset. The second QP offset may be included in a higher level syntax, such as an SPS, a PPS, a picture header, or a slice header, and then be transmitted, and a fixed value pre-defined by the encoder and the decoder may be used as the second QP offset. The second QP offset may be −5.

When a QP applied to the third channel of the first color space is QP_2, QP'_2 that is a QP applied to the third channel of the second color space may be determined by QP_2+Offset_2, and Offset_2 indicates the third QP offset. The third QP offset may be included in a higher level syntax, such as an SPS, a PPS, a picture header, or a slice header, and then be transmitted, and a fixed value pre-defined by the encoder and the decoder may be used as the third QP offset. The third QP offset may be −3.

In addition, the video signal processing device may determine the quantization parameter offset (qpActOffset), based on the color space transform activation flag (cu_act_enabled_flag). When the color space transform activation flag (cu_act_enabled_flag) indicates that a color space transform is not applied to a current block, the video signal processing device may perform an operation of determining a quantization parameter offset (qpActOffset) to be 0.

In addition, when the color space transform activation flag (cu_act_enabled_flag) indicates that a color space transform is applied to the current block, the video signal processing device may perform an operation of determining the quantization parameter offset to be a predetermined offset, based on a color component of a transform block. Hereinafter, a description thereof will be given in more detail.

When a color component of a current block is indicated to be a first channel component, and a color space transform activation flag (cu_act_enabled_flag) indicates that a color space transform is applied to the current block, the video signal processing device may perform an operation of determining a quantization parameter offset (qpActOffset) to be a predetermined first QP offset (Offset_0). In addition, when a quantization parameter (QP) applied to a first channel of a first color space is QP_0, QP'_0 that is a quantization parameter (QP) applied to a first channel of a second color space may be determined by QP_0+Offset_0.

When a color component of a current block is indicated to not be a first channel component, TuCResMode indicating a joint coding of chroma residuals (JCCR) mode indicates 2, and a color space transform activation flag (cu_act_enabled_flag) indicates that a color space transform is applied to the current block, the video signal processing device may perform an operation of determining a quantization parameter offset (qpActOffset) to be a predetermined second QP offset (Offset_1). In addition, when a QP applied to a second channel of the first color space is QP_1, QP'_1 that is a QP applied to a second channel of the second color space may be determined by QP_1+Offset_1. The JCCR mode may correspond to an encoding method by which residual signals of a second channel and a third channel are represented by one signal.

When a color component of a current block is indicated to be a second channel component, and a color space transform activation flag (cu_act_enabled_flag) indicates that a color space transform is applied to the current block, the video signal processing device may perform an operation of determining a quantization parameter offset (qpActOffset) to be the predetermined second QP offset (Offset_1). In addition, when a QP applied to the second channel of the first color space is QP_1, QP'_1 that is a QP applied to the second channel of the second color space may be determined by QP_1+Offset_1.

When a color component of a current block is indicated to be a third channel component, and a color space transform activation flag (cu_act_enabled_flag) indicates that a color space transform is applied to the current block, the video signal processing device may perform an operation of determining a quantization parameter offset (qpActOffset) to be the predetermined third QP offset (Offset_2). In addition, when a QP applied to a third channel of the first color space is QP_2, QP'_2 that is a QP applied to a third channel of the second color space may be determined by QP_2+Offset_2.

Meanwhile, a QP used for quantization and dequantization may be defined in a pre-configured integer range, and a quantization step size used in quantization may be determined according to a QP value. For example, a QP may be defined in an integer range in which the integer is not negative, and an increasing QP value may indicate an increasing quantization step size. This consequently means that a quantization error may increase. When an ACT is applied to a current block, a QP value may be corrected by the first QP offset (Offset_0), the second QP offset (Offset_1), and the third QP offset (Offset_2), and QP' 0, QP' 1, and QP'_2 which are corrected QPs used in an actual quantization and dequantization may deviate from a pre-configured integer range in which a QP is defined. Specifically, Offset_0, Offset_1, and Offset_2 may be negative numbers, and thus QP' 0, QP' 1, and QP'_2 may be negative numbers. The QP values deviate from a defined range, and thus after correcting a QP value by an offset, a clipping operation may be performed for the QP value to fall within a pre-configured range in which the QP value is defined. For example, when a QP is defined in a [0, 63] range, and Offset_0, Offset_1, and Offset_2 are −5, −5, and −3, respectively, a clipping process may be performed to prevent a corrected QP value from being a negative number. QP'_0 that is a QP applied to the first channel of the second color space may be determined by Max(0, QP_0+Offset_0). A Max(x, y) operation is a function of returning x when x>=y, and returning y when x<y, and thus when a value of QP_0+Offset_0 is a negative number, QP'_0 may be configured to be 0 and then be used in a quantization and a dequantization. QP'_1 that is a QP applied to the second channel of the second color space may be determined by Max(0, QP_1+Offset_1). According to a max operation, when a value of QP_1+Offset_1 is a negative number, QP'_1 may be configured to be 0 and then be used in a quantization and a dequantization. QP'_2 that is a QP applied to the third channel of the second color space may be determined by Max(0, QP_2+Offset_2). According to a max operation, when a value of QP_2+Offset_2 is a negative number, QP'_2 may be configured to be 0 and then be used in a quantization and a dequantization.

Referring to FIG. 16 to FIG. 19 of the present disclosure described below, a method of correcting a QP value is described.

FIG. 16 illustrates a method of correcting a QP value, and performing scaling (dequantization), based on the corrected QP according to the first method of the present disclosure. A scaling process may receive an input of (xTbY, yTbY), nTbW, nTbH, predMode, and cIdx, and a description for each variable is as follows.

(xTbY, yTbY): This is the position of a luma, may indicate top-left coordinates of a current luma transform block, and may be coordinates based on a top-left luma sample of a current picture.

nTbW: The width of transform block nTbH: The height of transform block predMode: This is a variable indicating a method of prediction of a current coding unit, and may indicate an intra prediction when the variable is MODE_INTRA, indicate an inter prediction when the variable is MODE_INTER, and indicate an IBC prediction (a prediction method of generating a prediction block from a reference block indicated by a block vector in a current picture) when the variable is MODE IBC.

cIdx: This is a variable indicating a color component of a current transform block, and may indicate a first channel component when cIdx is 0, indicate a second channel component when cIdx is 1, and indicate a third channel component when cIdx is 2. When an ACT has been applied to a current block, a current transform coefficient may indicate an expression in a second color space, and the second color space may be YCgCo color space. Meanwhile, when an ACT is not applied to a current block, a current transform coefficient indicates an expression in a first color space, that is, an original color space.

The video signal processing device may perform an operation of reconstructing a current block, based on a quantization parameter. The quantization parameter may be corrected. Specifically, in a scaling process, scaling (dequantization) may be performed for a quantized transform coefficient so as to obtain a scaled (dequantized) transform coefficient. An inverse transform may be performed for the scaled transform coefficient so as to obtain a residual signal. An inverse transform unit may reconstruct a current block by using the obtained residual signal. The scaled transform coefficient array d[x][y], which is an output of a scaling process, may be an array having a (nTbW)×(nTbH) size.

In a scaling process, a quantization parameter (variable qP) and a quantization parameter offset (qpActOffset) variable required for scaling may be first derived as follows.

A case where the variable cIdx is 0:

qP=Qp'Y: When cIdx is 0, this indicates a first channel component, and thus a qP variable that is a quantization parameter used in a real scaling may be configured to be Qp'Y that is a quantization parameter applied to the first channel component. Qp'Y may be determined in an encoding unit level, and may be determined based on a syntax element related to transform. For example, a rectangular quantization group is defined in a coding tree block, and coding units existing in the quantization group may share a prediction value of the same quantization parameters. A prediction value of a quantization parameter may be derived from a quantization parameter of a block neighboring the quantization group. For example, when the top-left coordinates of a rectangular quantization group is (xQg, yQg), an average value between a quantization parameter of the position (xQg−1, yQg) and a quantization parameter of the position (xQg, yQg−1) may be used as a prediction value of a quantization parameter. In order to reduce a bit amount required for quantization parameter signaling, a differential value between a prediction value of a quantization parameter and an actual quantization parameter may be included in a bitstream in a coding unit level for transmission, and the decoder may determine Qp'Y, based on the prediction value of the quantization parameter and the differential value parsed from the bitstream.

qpActOffset=−5: When an ACT is applied, a dynamic range changes, and thus in order to compensate for the change, an offset may be added to a quantization parameter to correct the quantization parameter. Applying an ACT may indicate a case where a color space transform activation flag (cu_act_enabled_flag) indicates that a color space transform is applied to a current block. Specifically, when a color component of a current block indicates a first channel component, and a color space transform activation flag (cu_act_enabled_flag) indicates that a color space transform is applied to the current block, the video signal processing device may perform an operation of determining a quantization parameter offset (qpActOffset) to be a predetermined first QP offset (Offset_0). A first QP offset applied to the first channel component may be −5.

When a color component of a current block is indicated to be the first channel component, and a color space transform activation flag (cu_act_enabled_flag) indicates that a color space transform is not applied to the current block, the video signal processing device may perform an operation of determining a quantization parameter offset (qpActOffset) to be 0.

A case where the variable cIdx is not 0, and the variable TuCResMode[xTbY][yTbY] is 2: In a joint coding of chroma residuals (JCCR) mode, two chroma residual signals may be expressed by one residual array by using a correlation existing between chroma components. When TuCResMode[xTbY][yTbY] is 2, this may indicate that one of JCCR modes is applied, and when cIdx is not 0, this may indicate a current transform block is a transform coefficient block expressing a second channel and a third channel to be one residual signal. When a residual array obtained by the inverse transform unit of the decoder is C[x][y], a second channel residual array is Cb[x][y], and a third channel residual array is Cr[x][y], Cb[x][y]=C[x][y] and Cr[x][y]=CSign*C[x][y] may be determined. The variable CSign is sign information applied to a third channel, and may be included in a slice header for transmission.

qP=Qp'CbCr: When cIdx is not 0, and TuCResMode[xTbY][yTbY] is 2, qP which is a quantization parameter applied in a scaling process may be configured to be Qp'CbCr which is a quantization parameter applied when TuCResMode[xTbY][yTbY] is 2. Similarly to Qp'Y, Qp'CbCr may be determined in an encoding unit level, and may be determined based on a syntax element related to transform.

qpActOffset=−5: When an ACT is applied, a dynamic range changes, and thus in order to compensate for the change, an offset may be added to a quantization parameter to correct the quantization parameter. Applying an ACT may indicate a case where a color space transform activation flag (cu_act_enabled_flag) indicates that a color space transform is applied to a current block. More specifically, when a color component of a current block is indicated to not be a first channel component, TuCResMode indicating a joint coding of chroma residuals (JCCR) mode is 2, and a color space transform activation flag (cu_act_enabled_flag) indicates that a color space transform is applied to the current block, the video signal processing device may perform an operation of determining a quantization parameter offset (qpActOffset) to be a predetermined second QP offset (Offset_1). A QP offset applied when TuCResMode[xTbY][yTbY] among JCCR modes is 2 may be −5.

When a color component of a current block is indicated to not be a first channel component, TuCResMode indicating a joint coding of chroma residuals (JCCR) mode indicates 2, and a color space transform activation flag (cu_act_enabled_flag) indicates that a color space transform is not applied to the current block, the video signal processing device may perform an operation of determining a quantization parameter offset (qpActOffset) to be 0.

A case where the variable TuCResMode[xTbY][yTbY] is not 2, and the variable cIdx is 1: This case may include a case where the variable TuCResMode[xTbY][yTbY] is 0, and the variable cIdx is 1, and a case where the variable TuCResMode[xTbY][yTbY] is 1, and the variable cIdx is 1. The former case may indicate that residual arrays of a second channel and a third channel are independently encoded, and cIdx is 1, and thus this indicates that a current transform block is a second channel residual array. The latter case may indicate that a current transform block is a transform coefficient block expressing a second channel and a third channel to be one residual signal by means one of JCCR modes. When a residual array obtained by the inverse transform_unit of the decoder is C[x][y], a second channel residual array is Cb[x][y], and a third channel residual array is Cr[x][y], Cb[x][y]=C[x][y], and Cr[x][y]=(CSign*C[x][y])>>1 may be determined. The variable CSign is sign information applied to a third channel, and may be included in a slice header for transmission.

qP=Qp'Cb: In both of the cases, qP that is a quantization parameter applied to scaling may be configured to be Qp'Cb which is a quantization parameter applied to a second channel. Similarly to Qp'Y, Qp'Cb may be determined in an encoding unit level, and may be determined based on a syntax element related to transform.

qpActOffset=−5: When an ACT is applied, a dynamic range changes, and thus in order to compensate for the change, an offset may be added to a quantization parameter to correct the quantization parameter. Applying an ACT may indicate a case where a color space transform activation flag (cu_act_enabled_flag) indicates that a color space transform is applied to a current block. More specifically, when a color component of a current block is indicated to be a second channel component, and a color space transform activation flag (cu_act_enabled_flag) indicates that a color space transform is applied to the current block, the video signal processing device may perform an operation of determining a quantization parameter offset (qpActOffset) to be the predetermined second QP offset (Offset_1). A second QP offset applied to a second channel may be −5.

When a color component of a current block is indicated to be the second channel component, and a color space transform activation flag (cu_act_enabled_flag) indicates that a color space transform is not applied to the current block, the video signal processing device may perform an operation of determining a quantization parameter offset (qpActOffset) to be 0.

A case where the variable cIdx is 2: This case may include a case where the variable TuCResMode[xTbY][yTbY] is 0, and the variable cIdx is 2, and a case where the variable TuCResMode[xTbY][yTbY] is 3, and the variable cIdx is 2. The former case may indicate that residual arrays of a second channel and a third channel are independently encoded, and cIdx is 2, and thus this indicates that a current transform block is a third channel residual array. The latter case may indicate that a current transform block is a transform coefficient block expressing a second channel and a third channel to be one residual signal by means one of JCCR modes. When a residual array obtained by the inverse transform_unit of the decoder is C[x][y], a second channel residual array is Cb[x][y], and a third channel residual array is Cr[x][y], Cb[x][y]=(CSign*C[x][y])>>1, and Cr[x][y]=C[x][y] may be determined. The variable CSign is sign information applied to a second channel, and may be included in a slice header for transmission.

qP=Qp'Cr: In both of the cases, qP that is a quantization parameter applied to scaling may be configured to be Qp'Cr which is a quantization parameter applied to a third channel. Similarly to Qp'Y, Qp'Cr may be determined in an encoding unit level, and may be determined based on a syntax element related to transform.

qpActOffset=−3: When an ACT is applied, a dynamic range changes, and thus in order to compensate for the change, an offset may be added to a quantization parameter to correct the quantization parameter. Applying an ACT may indicate a case where a color space transform activation flag (cu_act_enabled_flag) indicates that a color space transform is applied to a current block. When a color component of a current block indicates a third channel component, and a color space transform activation flag (cu_act_enabled_flag) indicates that a color space transform is applied to the current block, the video signal processing device may perform an operation of determining a quantization parameter offset (qpActOffset) to be the predetermined third QP offset (Offset_2). A third QP offset applied to a third channel may be −3.

When a color component of a current block is indicated to be the third channel component, and a color space transform activation flag (cu_act_enabled_flag) indicates that a color space transform is not applied to the current block, the video signal processing device may perform an operation of determining a quantization parameter offset (qpActOffset) to be 0.

A quantization parameter may be modified based on a quantization parameter (qP) and a quantization parameter offset (qpActOffset) described above, and the variable rectNonTsFlag and the variable bdShift required for a scaling process may be configured as follows.

A case where a transform skip is not applied (transform skip flag[xTbY][yTbY][cIdx] is 0): a transform skip flag[xTbY][yTbY][cIdx] syntax element that is a transform skip flag may indicate whether a transform skip is applied to a current transform block. The current transform block may be a transform block included in a current block. When transform skip flag[xTbY][yTbY][cIdx] is 0, this may indicate that a transform skip is not applied to a current transform block. This may imply that a residual sample is obtained by performing an inverse transform of a scaled (dequantized) transform coefficient.

qP=Max(0, qP+(cu_act_enabled_flag[xTbY][yTbY]?qpActOffset:0)); According to the first method of the present disclosure, in a case where an ACT is applied to a current block, a qP value may be corrected in order to compensate for the change in a dynamic range, and the corrected qP value may deviate from a pre-configured range, and thus a clipping operation may be performed. In the first method, based on that a quantization parameter is defined in an integer area in which the integer is not negative, a value smaller than 0 may be clipped to be 0 to allow a corrected qP value to be 0 or larger. In the above formula, a x?y:z tertiary operation means an operation of returning y when x is true or is not 0, and returning z when x is false or is 0. Therefore, when an ACT is applied to a current block (cu_act_enabled_flag[xTbY][yTbY] is 1), qpActOffset may be returned as a quantization parameter offset by the operation cu_act_enabled_flag[xTbY][yTbY] ?qpActOffset:0, and the quantization parameter qP may be corrected by qpActOffset. Meanwhile, when an ACT is not applied to a current block (cu_act_enabled_flag [xTbY][yTbY] is 0), a quantization parameter offset is 0, and thus the quantization parameter qP may not be corrected. According to the first method of the present disclosure, a clipping based on a max operator may be performed to prevent a corrected qP value from being a negative number. When an ACT is applied, a scaling may be performed based on a corrected quantization parameter.

rectNonTsFlag=(((Log 2(nTbW)+Log 2(nTbH))&1)==1) ?1:0; A transform kernel based on sine or cosine may not have an integer type as described with reference to FIG. 9, and the transform kernel may be approximated to be in an integer type so as to reduce the complexity of implementation. In order to express a transform kernel in an integer type, a power of 2 (the exponent may not be an integer) may be multiplied to the transform kernel and then be rounded so as to obtain an approximated integer transform kernel. According to an approximation error, the orthonormal properties of a transform kernel may be weakened. However, a coding efficiency degradation resulting therefrom is small, and the implementation complexity of transform encoding based on an integer transform kernel in a hardware encoder and decoder is remarkably low, and thus an integer transform kernel including an approximation error may be used. An integerized transform kernel has a scale enlarged by a power of 2, and thus after a transform, a process of lowering the scale is required, and this down scaling may be performed in a scaling process and a transform process. rectNonTsFlag and the variable bdShift described below may be interpreted as a parameter for down scaling performed in a scaling process. When a result of a (Log 2(nTbW)+Log 2(nTbH))&1 operation in rectNonTsFlag is 1, a transform coefficient after a horizontal inverse transform and a vertical inverse transform may have a scale increased by $2^{\wedge}(N+0.5)$. When a result of a (Log 2(nTbW)+Log 2(nTbH))&1 operation is 0, a transform coefficient after a horizontal inverse transform and a vertical inverse transform may have a scale increased by $2^{\wedge}(M)$, and N and M are positive integers. That is, when an inverse transform is performed, in order to consider a sqrt(2) scaling factor according to the width and the height of a transform block, the variable rectNonTsFlag may be configured to be 1 in a case where a result of a (Log 2(nTbW)+Log 2(nTbH))&1 operation is 1 when an inverse transform is performed for a current transform block (transform skip flag [xTbY][yTbY][cIdx] is 0).

bdShift=BitDepth+rectNonTsFlag+((Log 2(nTbW)+Log 2(nTbH))/2)−5+pic_dep_quant_enabled_flag: The variable BitDepth indicates a bit depth of luma and chroma array samples. For example, when BitDepth is N (a natural number), first channel, second channel, and third channel array samples may have values within a [0, $2^{\wedge}$N−1] range. The variable BitDepth may be configured based on a syntax element included in an SPS, a PPS, a picture header, a slice header, etc. For example, a bit_depth_minus8 syntax element may be signaled to signal bit depth information in an SPS. The decoder may configure the variable BitDepth to be 8+bit_depth_minus8, based on the parsed bit_depth_minus8 syntax element. pic_dep_quant_enabled_flag is a syntax element indicating whether a dependent quantization is enabled or disabled in a current slice, and when pic_dep_quant_enabled_flag is 1, this may indicate that a dependent quantization is enabled in a current slice. The variable bdShift is a parameter for down scaling, and may be determined according to a bit depth, whether to consider a sqrt(2) scaling factor, the size of a transform block, and whether a dependent quantization is enabled or disabled.

bdOffset=(1<<bdShift)>>1: In a scaling process described below, a bit shift operation may be performed based on the parameter bdShift, and the variable bdOffset may indicate a rounding offset of a bit shift operation.

A case where a transform skip is applied (transform skip flag[xTbY][yTbY][cIdx] is 1): When transform skip flag[xTbY][yTbY][cIdx] that is a transform skip flag is 1, this indicates that a transform skip is applied to a current transform block, and this may imply that a scaled (dequantized) transform coefficient is used as the residual.

qP=Max(0, Max(QpPrimeTsMin, qP)+(cu_act_enabled_flag[xTbY][yTbY]?qpActOffset:0)); According to the first method of the present disclosure, in a case where an ACT is applied to a current block, a qP value may be corrected in order to compensate for the change in a dynamic range, and the corrected qP value may deviate from a pre-configured range, and thus a clipping operation may be performed. In the first method, first, through a comparison between the variable QpPrimeTsMin and a qP value, a clipping may be performed to allow the qP value to be equal to or greater than QpPrimeTsMin. The variable QpPrimeTsMin defines a minimum quantization parameter allowed in a transform skip mode, and may be included and indicated in a higher level syntax structure such as an SPS, a PPS, a picture header, or a slice header. Information (min_qp_prime_ts_minus4) related to a minimum quantization parameter may correspond to a syntax element. For example, the decoder may obtain information (min_qp_prime_ts_minus4) related to a minimum quantization parameter in an SPS from a bitstream. However, the disclosure is not limited thereto, and the decoder may obtain information (min_qp_prime_ts_minus4) related to a minimum quantization parameter from one bitstream among an SPS, a PPS, a picture header, or a slice header. In addition, the decoder may perform an operation of obtaining a minimum quantization parameter (QpPrimeTsMin), based on information (min_qp_prime_ts- _minus4) related to the minimum quantization parameter. For example, the decoder may configure the variable QpPrimeTsMin to be 4+min_qp_prime_ts_minus4, based on a min_qp_prime_ts_minus4 syntax element. min_qp_prime_ts_minus4 may be information related to a minimum quantization parameter allowed in a transform skip mode. The video signal processing device may perform an operation of correcting a quantization parameter, based on a minimum quantization parameter. In addition, the video signal processing device may perform an operation of reconstructing the current block, based on a corrected quantization parameter.

In the first method of the present disclosure, a quantization parameter may be first clipped to be a value of QpPrimeTsMin or greater by the variable QpPrimeTsMin, and then a quantization parameter offset (qpActOffset) for compensating for the change in a dynamic range due to ACT may be added thereto.

As described above already, qpActOffset may be determined to be 0 or one of a first QP offset, a second QP offset, or a third QP offset, based on cu_act_enabled_flag[xTbY][yTbY]. However, the disclosure is not limited thereto, and according to various embodiments of the present disclosure, a value may be added to a quantization parameter (qP) by a process as follows. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset: 0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the first method of the present disclosure, a clipping based on a max operator may be performed to prevent a corrected qP value from being a negative number. When an ACT is applied, a scaling may be performed based on a corrected quantization parameter. According to the qP correction described above, when an ACT is applied to a current block, the minimum value of qP may be configured to be 0, and when an ACT is not applied to a current block, the minimum value of qP may be configured to be a minimum quantization parameter (QpPrimeTsMin).

rectNonTsFlag=0: rectNonTsFlag is a variable considering a scale factor increasing due to a transform kernel, and thus the variable rectNonTsFlag may be configured to be 0 in a transform skip mode in which a transform is not applied.

bdShift=10: In a transform skip mode in which a transform and a dependent quantization are not applied, the variable bdShift may be configured to be 10 that is a fixed value.

bdOffset=(1<<bdShift)>>1: In a scaling process described below, a bit shift operation may be performed based on the parameter bdShift, and the variable bdOffset may indicate a rounding offset of a bit shift operation.

A levelScale[j][k] list may indicate a scaled quantization step size. A quantization step size basically has a real number type, and may be approximated to be in an integer type. In addition, when qP is increased by 6, a quantization step size is doubled, and thus a quantization step size is defined for qP from 0 to 5, and in the remaining qP section, a quantization step size may be derived through a qP %6 operation and a qP/6 operation.

The array dz having a (nTbW)×(nTbH) size may be configured to be the same as TransCoeffLevel[xTbY][yTbY][cIdx] that is an array having a (nTbW)×(nTbH) size, and TransCoeffLevel[xTbY][yTbY][cIdx] indicates a quantized transform coefficient obtained in coefficient coding (residual coding).

d[x][y] which is a scaled transform coefficient (x is from 0 to nTbW−1, and y is from 0 to nTbH−1) may be obtained through a process as follows.

First, a process of configuring m[x][y] that is a middle scaling element array may be performed. The frequency response characteristics of a human vision system is insensitive to high frequency bands, and relatively sensitive to low frequency bands, and thus in consideration of these characteristics, different scaling factors may be configured according to x and y which are frequency bin indexes. This indicates that a value of an m[x][y] array element changes according to x and y. For example, when a large scaling value is used for a high frequency area and a small scaling value is used for a low frequency area, a quantization may be efficiently performed. This is because a person is highly probable to fail to recognize a quantization error well, the error occurring due to the use of a large scaling value for a high frequency area. Meanwhile, when a transform skip is applied, a received quantized transform coefficient is a signal in a space area rather than a signal in a frequency area. Therefore, when a value of an m[x][y] array is configured to vary according to x and y, a distortion becomes large in a partial space area, and thus image quality may deteriorate. Therefore, a value of an m[x][y] array element may be configured to be a fixed constant regardless of x and y. The fixed constant may be 16. As another example, when a secondary transform is applied, a value of an m[x][y] array element may be configured to be a fixed constant regardless of x and y. The fixed constant may be 16. A secondary transform may be interpreted to map a primary-transformed transform coefficient to another space, and the characteristics of a secondary-transformed coefficient are totally different from those of a primary-transformed coefficient. For example, when a secondary transform is not applied, and only a primary transform based on a DCT-II kernel is performed, d[0][0] may indicate a DC coefficient. Meanwhile, when a secondary transform is performed for a primary-transformed coefficient based on a DCT-II kernel, d[0][0] does not indicate a DC coefficient. In order to obtain a DC coefficient of a primary-transformed coefficient, a dot product between a secondary-transformed coefficient vector and the first basis vector of an inverse secondary-transformed kernel is required to be performed, and this implies that all secondary-transformed coefficients affect a low-frequency area of a primary-transformed coefficient. Therefore, considering different scaling elements with respect to a secondary-transform coefficient according to indexes x and y may not only degrades the performance of a quantizer, but also cause the deterioration of image quality. Therefore, when a secondary transform is applied to a current block, m[x][y] may be configured to have the same value with respect to all indexes x and y. For example, m[x][y] may be 16 regardless of x and y indexes.

ls[x][y] which is a final scaling element array may be configured based on m[x][y] and levelScale[j][k]. Specifically, when a dependent quantization is applied (pic_dep_quant_enabled_flag is 1, and transform skip flag [xTbY][yTbY][cIdx] is 0), ls[x][y] may be configured by (m[x][y]*levelScale[rectNonTsFlag][(qP+1)%6])<<((qP+1)/6). levelScale having a scale increased by sqrt(2) may be applied when rectNonTsFlag is 1, compared to a case when rectNonTsFlag is 0. When a bit left shift is performed for a base quantization step size (levelScale[rectNonTsFlag][(qP+1)%6]) by (qP+1)/6 by using (qP+1)%6 as an index, a final quantization step size may be determined. This reflects a characteristic wherein, in a case where a dependent quantization is applied, when (qP+1) is increased by 6, a quantization step size is doubled. Meanwhile, when a dependent quantization is not applied (pic_dep_quant_enabled_flag is 0, or transform skip flag[xTbY][yTbY][cIdx] is 1), ls[x][y] may be configured by (m[x][y]*levelScale[rectNonTsFlag][qP %6])<<(qP/6). When a bit left shift is performed for a base quantization step size (levelScale[rectNonTsFlag][qP %6]) by qP/6 by using qP %6 as an index, a final quantization step size may be determined. This reflects a characteristic wherein, in a case where a dependent quantization is not applied, when qP is increased by 6, a quantization step size is doubled.

Meanwhile, in a case of a block-based delta pulse code modulation (BDPCM) prediction, an intra prediction is performed in a pre-configured mode, and a quantized transform coefficient may be expressed by the sum of a sample at a previous position and a sample at a current position according to the pre-configured mode. That is, in a BDPCM mode, as a quantized transform coefficient, a difference between a sample at a previous position and a sample at a current position according to a pre-configured mode is transmitted. The pre-configured mode may be a horizontal mode or a vertical mode. When a BDPCM is applied to a current coding block, BdpcmFlag[xTbY][yTbY] may be 1, and BdpcmDir[xTbY][yTbY] may indicate a pre-configured mode.

When BdpcmFlag[xTbY][yTbY] is 1, and BdpcmDir[xTbY][yTbY] is 0, this may indicate that a horizontal mode BDPCM is applied, and dz[x][y] may be configured by Clip3(CoeffMin, CoeffMax, dz[x−1][y]+dz[x][y]). An Clip3 (x, y, z) operator is an operator of clipping z to be between x and y, and when z<x, Clip3(x, y, z)=x, when z>y, Clip3(x, y, z)=y, and otherwise, (x<=z<=y), Clip3(x, y, z)=z may be expressed. A transform coefficient may be expressed at a pre-configured bit accuracy, and this may be 16 bits. In this case, CoeffMin may be configured to be −2^(16), and CoeffMax may be configured to be 2^(16)−1. When BdpcmFlag[xTbY][yTbY] is 1, and BdpcmDir[xTbY][yTbY] is 1, this may indicate that a vertical mode BDPCM is applied, and dz[x][y] may be configured by Clip3(CoeffMin, CoeffMax, dz[x][y−1]+dz[x][y]).

dnc[x][y] may be calculated by (dz[x][y]*ls[x][y]+bdOffset)>>bdShift, and d[x][y] that is a scaled transform coefficient may be obtained through Clip3(CoeffMin, CoeffMax, dnc[x][y]).

FIG. 17 illustrates a method of correcting a QP value, and performing scaling (dequantization), based on the corrected QP according to the second method of the present disclosure. A description which is not given with reference to FIG. 17 may follow the description given with reference to FIG. 16, and hereinafter, a method of correcting a quantization parameter when a transform skip is not applied and when a transform skip is applied according to the second method of the present disclosure is described.

A video signal processing device may perform an operation of obtaining a transform skip flag (transform_skip_flag) indicating whether a transform skip is applied to a transform block included in a current block. The video signal processing device may obtain a transform skip flag from a bitstream. In addition, when a transform skip flag is not obtained from a bitstream, the video signal processing device may configure a transform skip flag to be a predetermined value.

A case where a transform skip is not applied (transform_skip_flag[xTbY][yTbY][cIdx] is 0):
qP=Max(0, qP+(cu_act_enabled_flag[xTbY][yTbY] ?qpActOffset:0)); According to the second method of the present disclosure, in a case where an ACT is applied to a current block, a qP value may be corrected in order to compensate for the change in a dynamic range. That is, when a transform_skip_flag indicates that a transform skip is not applied, the video signal processing device may perform an operation of obtaining a corrected quantization parameter, based on a quantization parameter offset (qpActOffset).

The video signal processing device may perform an operation of determining a quantization parameter offset, based on a color component of a transform block and a color space transform activation flag (cu_act_enabled_flag). The corrected quantization parameter may be qP+qpActOffset.

As described above, when the color space transform activation flag (cu_act_enabled_flag) indicates that a color space transform is not applied to a current block, the video signal processing device may perform an operation of determining a quantization parameter offset (qpActOffset) to be 0. In this case, the quantization parameter offset (qpActOffset) may be 0, and an original quantization parameter (qP) may be maintained. When the color space transform activation flag (cu_act_enabled_flag) indicates that a color space transform is applied to a current block, the video signal processing device may perform an operation of determining a quantization parameter offset (qpActOffset) to be one of a first QP offset, a second QP offset, or a third QP offset. A process of determining a quantization parameter offset (qpActOffset) to be one of a first QP offset, a second QP offset, or a third QP offset has been already described with reference to FIG. 14 to FIG. 16, and thus the repeated explanation is omitted. In addition, the video signal processing device may apply a quantization parameter offset (qpActOffset) to a quantization parameter (qP) to obtain a corrected quantization parameter.

When a corrected quantization parameter is smaller than 0, the video signal processing device may perform an operation of clipping the corrected quantization parameter to be 0. That is, the video signal processing device may prevent a quantization parameter (qP) from being smaller than 0. More specifically, a corrected qP value may deviate from a pre-configured range, and thus a clipping operation may be performed. In the second method, based on that a quantization parameter is defined in an integer area in which the integer is not negative, a value smaller than 0 may be clipped to be 0 to allow a corrected qP value to be 0 or larger.

As described above already, qpActOffset may be determined to be 0 or one of a first QP offset, a second QP offset, or a third QP offset, based on cu_act_enabled_flag[xTbY][yTbY]. However, the disclosure is not limited thereto, and according to various embodiments of the present disclosure, a value may be added to a quantization parameter (qP) by a process as follows. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset: 0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the second method of the present disclosure, a clipping based on a max operator may be performed to prevent a corrected qP value from being a negative number.

The video signal processing device may perform an operation of reconstructing a current block, based on a corrected quantization parameter. The corrected quantization parameter may be a clipped corrected quantization parameter. Specifically, when an ACT is applied, a scaling may be performed based on a corrected quantization parameter. A scaling method based on a corrected quantization parameter qP and a method of reconstructing a current block may follow methods described with reference to FIG. 16.

A case where a transform skip is applied (transform_skip_flag[xTbY][yTbY][cIdx] is 1):

qP=Max(QpPrimeTsMin, qP+(cu_act_enabled_flag [xTbY][yTbY]?qpActOffset:0)); According to the second method of the present disclosure, in a case where an ACT is applied to a current block, a qP value may be corrected in order to compensate for the change in a dynamic range. When a transform skip flag indicates that a transform skip is applied, the video signal processing device may perform an operation of obtaining a corrected quantization parameter, based on a quantization parameter offset (qpActOffset). The video signal processing device may perform an operation of determining a quantization parameter offset, based on a color component of a transform block and a color space transform activation flag (cu_act_enabled_flag). The corrected quantization parameter may be qP+qpActOffset. However, the disclosure is not limited thereto, and when a color space transform activation flag (cu_act_enabled_flag) indicates that a color space transform is not applied to a current block, a qP value may not be corrected.

As described above, when the color space transform activation flag (cu_act_enabled_flag) indicates that a color space transform is not applied to a current block, the video signal processing device may perform an operation of determining a quantization parameter offset (qpActOffset) to be 0. In this case, the quantization parameter offset (qpActOffset) may be 0, and an original quantization parameter (qP) may be maintained. When the color space transform activation flag (cu_act_enabled_flag) indicates that a color space transform is applied to a current block, the video signal processing device may perform an operation of determining a quantization parameter offset (qpActOffset) to be one of a first QP offset, a second QP offset, or a third QP offset. A process of determining a quantization parameter offset (qpActOffset) to be one of a first QP offset, a second QP offset, or a third QP offset has been already described with reference to FIG. 14 to FIG. 16, and thus the repeated explanation is omitted. In addition, the video signal processing device may apply a quantization parameter offset (qpActOffset) to a quantization parameter (qP) to obtain a corrected quantization parameter.

When a corrected quantization parameter is smaller than a minimum quantization parameter (QpPrimeTsMin), the video signal processing device may perform an operation of clipping the corrected quantization parameter to be the minimum quantization parameter (QpPrimeTsMin). That is, the video signal processing device may prevent a quantization parameter (qP) from being smaller than a minimum quantization parameter (QpPrimeTsMin). More specifically, a corrected qP value may deviate from a pre-configured range, and thus a clipping operation may be performed. In the second method, based on information on a quantization parameter allowed when a transform skip is applied, a clipping may be performed so that a corrected quantization parameter value is equal to or greater than a quantization parameter allowed in a transform skip mode.

As described above already, qpActOffset may be determined to be 0 or one of a first QP offset, a second QP offset, or a third QP offset, based on cu_act_enabled_flag[xTbY][yTbY]. However, the disclosure is not limited thereto, and according to various embodiments of the present disclosure, a value may be added to a quantization parameter (qP) by a process as follows. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset:0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the second method of the present disclosure, a clipping may be performed so that a quantization parameter value corrected using a max operator becomes equal to or greater than a minimum quantization parameter (QpPrimeTsMin). The variable QpPrimeTsMin defines a minimum quantization parameter allowed in a transform skip mode, and a condition that a quantization parameter is required to be equal to or greater than QpPrimeTsMin even with respect to a block to which an ACT is applied may be required to be satisfied. Therefore, when a corrected quantization parameter value is smaller than QpPrimeTsMin, the value may be clipped to be QpPrimeTsMin. For example, QpPrimeTsMin is a natural number, and thus when a corrected quantization parameter value is smaller than 0, the value may be clipped to be QpPrimeTsMin. As another example, even when a corrected quantization parameter value is equal to or greater than 0, if the value is smaller than QpPrimeTsMin, the value may be clipped to be QpPrimeTsMin.

The video signal processing device may perform an operation of reconstructing a current block, based on a corrected quantization parameter. The corrected quantization parameter may be a clipped corrected quantization parameter. Specifically, when an ACT is applied, a scaling may be performed based on a corrected quantization parameter. A scaling method based on a corrected quantization parameter qP and a method of reconstructing a current block may follow methods described with reference to FIG. 16.

FIG. 18 illustrates a method of correcting a QP value, and performing scaling (dequantization), based on the corrected QP according to the third method of the present disclosure. A part omitted in the description related to FIG. 18 may follow the description given with reference to FIG. 16, and hereinafter, a method of adjusting a quantization parameter when a transform skip is not applied and when a transform skip is applied according to the third method of the present disclosure is described.

A case where a transform skip is not applied (transform_skip_flag[xTbY][yTbY][cIdx] is 0):

qP=Max(QpBdOffset, qP+(cu_act_enabled_flag [xTbY][yTbY]?qpActOffset:0)); According to the third method of the present disclosure, in a case where an ACT is applied to a current block, a qP value may be corrected in order to adjust the change in a dynamic range, and the adjusted qP value may deviate from a pre-configured range, and thus a clipping operation may be performed. In the third method, a value smaller than QpBdOffset may be clipped to be QpBdOffset so as to make an adjusted quantization parameter a value equal or greater than the variable QpBdOffset, based on a quantization parameter offset reflecting the bit depth of an image. QpBdOffset is a quantization parameter offset added according to the bit depth of an image, and may be included and indicated in a higher level syntax structure such as an SPS, a PPS, a picture header, or a slice header. For example, a bit_depth_minus8 syntax element may be signaled to signal bit depth information in an SPS. The decoder may configure the variable QpBdOffset to be 6*bit_depth_minus8, based on the parsed bit_depth_minus8 syntax element. For example, if a bit depth (BitDepth) is 8, QpBdOffset may be configured to be 0. As another example, if a bit depth is 10, QpBdOffset may be configured to be 12. Qp'Y, Qp'CbCr, Qp'Cb, and Qp'Cr used in a scaling process are obtained by adding QpBdOffset, and express a transform coefficient in a pre-configured accuracy (e.g., 16 bits) according to a bit depth. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset:0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the third method of the present disclosure, in order to consider a quantization parameter offset according to a bit depth, a clipping based on a max operator may be performed so that a qP value which is a corrected quantization parameter is equal to or greater than QpBdOffset. For example, QpBdOffset is an integer which is not negative, and thus when a corrected quantization parameter value is smaller than 0, the value may be clipped to be QpBdOffset. As another example, even when a corrected quantization parameter value is equal to or greater than 0, if the value is smaller than QpBdOffset, the value may be clipped to be QpBdOffset. When an ACT is applied, a scaling may be performed based on a corrected quantization parameter. A scaling method based on a corrected quantization parameter qP may follow a method described with reference to FIG. 16.

A case where a transform skip is applied (transform_skip_flag[xTbY][yTbY][cIdx] is 1):

qP=Max(QpBdOffset, Max(QpPrimeTsMin, qP)+(cu_act_enabled_flag[xTbY][yTbY]?qpActOffset: 0)); According to the third method of the present disclosure, in a case where an ACT is applied to a current block, a qP value may be corrected in order to adjust the change in a dynamic range, and the adjusted qP value may deviate from a pre-configured range, and thus a clipping operation may be performed. In the third method, first, through a comparison between the variable QpPrimeTsMin and a qP value, a clipping may be performed to allow the qP value to be equal to or greater than QpPrimeTsMin. The variable QpPrimeTsMin defines a minimum quantization parameter allowed in a transform skip mode, a quantization parameter may be first clipped to be a value of QpPrimeTsMin or greater by the variable QpPrimeTsMin, and then a quantization parameter offset (qpActOffset) for compensating for the change in a dynamic range due to ACT may be added thereto. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset:0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the third method of the present disclosure, in order to consider a quantization parameter offset according to a bit depth, a clipping based on a max operator may be performed so that a qP value which is a corrected quantization parameter is equal to or greater than QpBdOffset. For example, QpBdOffset is an integer which is not negative, and thus when a corrected quantization parameter value is smaller than 0, the value may be clipped to be QpBdOffset. As another example, even when a corrected quantization parameter value is equal to or greater than 0, if the value is smaller than QpBdOffset, the value may be clipped to be QpBdOffset. When an ACT is applied, a scaling may be performed based on a corrected quantization parameter. A scaling method based on a corrected quantization parameter qP may follow a method described with reference to FIG. 16.

FIG. 19 illustrates a method of adjusting a QP value, and performing scaling (dequantization), based on the adjusted QP according to the fourth method of the present disclosure. A part omitted from the description related to FIG. 19 may follow the description given with reference to FIG. 16, and hereinafter, a method of adjusting a quantization parameter when a transform skip is not applied and when a transform skip is applied according to the fourth method of the present disclosure is described.

A case where a transform skip is not applied (transform_skip_flag[xTbY][yTbY][cIdx] is 0):

qP=Max(QpBdOffset, qP+(cu_act_enabled_flag[xTbY][yTbY]?qpActOffset:0)); According to the fourth method of the present disclosure, in a case where an ACT is applied to a current block, a qP value may be corrected in order to adjust the change in a dynamic range, and the adjusted qP value may deviate from a pre-configured range, and thus a clipping operation may be performed. In the fourth method, a value smaller than QpBdOffset may be clipped to be QpBdOffset so as to make an adjusted quantization parameter a value equal or greater than the variable QpBdOffset, based on a quantization parameter offset reflecting the bit depth of an image. QpBdOffset is a quantization parameter offset added according to the bit depth of an image, and express a transform coefficient in a pre-configured accuracy (e.g., 16 bits) according to a bit depth. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset:0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the fourth method of the present disclosure, in order to consider a quantization parameter offset according to a bit depth, a clipping based on a max operator may be performed so that a qP value which is a corrected quantization parameter is equal to or greater than QpBdOffset. For example, QpBdOffset is an integer which is not negative, and thus when a corrected quantization parameter value is smaller than 0, the value may be clipped to be QpBdOffset. As another example, even when a corrected quantization parameter value is equal to or greater than 0, if the value is smaller than QpBdOffset, the value may be clipped to be QpBdOffset. When an ACT is applied, a scaling may be performed based on a corrected quantization parameter. A scaling method based on a corrected quantization parameter qP may follow a method described with reference to FIG. 16.

A case where a transform skip is applied (transform_skip_flag[xTbY][yTbY][cIdx] is 1):

qP=Max(QpPrimeTsMin, qP+(cu_act_enabled_flag[xTbY][yTbY][cIdx]?qpActOffset:0)); According to the fourth method of the present disclosure, in a case where an ACT is applied to a current block, a qP value may be corrected in order to adjust the change in a dynamic range, and the adjusted qP value may deviate from a pre-configured range, and thus a clipping operation may be performed. In the fourth method, based on information on a quantization parameter allowed when a transform skip is applied, a clipping may be performed so that a corrected quantization parameter value is equal to or greater than a quantization parameter allowed in a transform skip mode. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset:0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the fourth method of the present disclosure, a clipping may be performed so that a quantization parameter value corrected using a max operator becomes equal to or greater than QpPrimeTsMin. The variable QpPrimeTsMin defines a minimum quantization parameter allowed in a transform skip mode, and a condition that a quantization parameter is required to be equal to or greater than QpPrimeTsMin even with respect to a block to which an ACT is applied may be required to be satisfied. Therefore, when a corrected quantization parameter value is smaller than QpPrimeTsMin, the value may be clipped to be QpPrimeTsMin. For example, QpPrimeTsMin is a natural number, and thus when a corrected quantization parameter value is smaller than 0, the value may be clipped to be QpPrimeTsMin. As another example, even when a corrected quantization parameter value is equal to or greater than 0, if the value is smaller than QpPrimeTsMin, the value may be clipped to be QpPrimeTsMin. When an ACT is applied, a scaling may be performed based on a corrected quantization parameter. A scaling method based on a corrected quantization parameter qP may follow a method described with reference to FIG. 16.

FIG. 20 illustrates a method of adjusting a QP value, and performing scaling (dequantization), based on the adjusted QP according to the fifth method of the present disclosure. A part omitted from the description related to FIG. 20 may follow the description given with reference to FIG. 16, and hereinafter, a method of adjusting a quantization parameter when a transform skip is not applied and when a transform skip is applied according to the fifth method of the present disclosure is described.

A case where a transform skip is not applied (transform_skip_flag[xTbY][yTbY] is 0):

qP=Max(0, qP+(cu_act_enabled_flag[xTbY][yTbY]?qpActOffset:0)); According to the fifth method of the present disclosure, in a case where an ACT is applied to a current block, a qP value may be corrected in order to adjust the change in a dynamic range, and the adjusted qP value may deviate from a pre-configured range, and thus a clipping operation may be performed. In the fifth method, based on that a quantization parameter is defined in an integer area in which the integer is not negative, a value smaller than 0 may be clipped to be 0 to allow an adjusted qP value to be 0 or larger. When an ACT is applied to a current block (cu_act_enabled_flag[xTbY][yTbY] is 1), qpActOffset may be returned as a quantization parameter offset by the operation cu_act_enabled_flag[xTbY][yTbY]?qpActOffset:0, and the quantization parameter qP may be corrected by qpActOffset. Meanwhile, when an ACT is not applied to a current block (cu_act_enabled_flag[xTbY][yTbY] is 0), a quantization parameter offset is 0, and thus the quantization parameter qP may not be corrected. According to the fifth method of the present disclosure, a clipping based on a max operator may be performed to prevent a corrected qP value from being a negative number. When an ACT is applied, a scaling may be performed based on a corrected quantization parameter.

A case where a transform skip is applied (transform_skip_flag[xTbY][yTbY] is 1): According to the fifth method of the present disclosure, in a case where an ACT is applied to a current block, a qP value may be corrected in order to adjust the change in a dynamic range, and the adjusted qP value may deviate from a pre-configured range, and thus a clipping operation may be performed.

A case where an ACT is applied (cu_act_enabled_flag[xTbY][yTbY] is 1):

qP=Max(0, qP+qpActOffset); When an ACT is applied, a qP value may be adjusted by qpActOffset that is a quantization parameter offset, and the adjusted qP value may deviate from a pre-configured range, and thus a clipping based on a max operator may be performed. When the adjusted qP value is a negative number, qP may be configured to be 0 by means of the max operator.

A case where an ACT is not applied (cu_act_enabled_flag[xTbY][yTbY] is 0):

qP=Max(QpPrimeTsMin, qP); When an ACT is not applied, qpActOffset that is a quantization parameter offset is not applied. Therefore, a clipping based on a max operator may be performed so that a qP value becomes equal to or greater than a minimum quantization parameter value allowed in a transform skip mode. When a current qP value is smaller than QpPrimeTsMin, the qP value may be configured to be QpPrimeTsMin by a max operator.

According to the fifth method, when a transform skip is applied, an allowed minimum quantization parameter may be configured to vary according to whether an ACT is applied. When an ACT is applied, a minimum quantization parameter value may be configured to be 0, and when an ACT is not applied, a minimum quantization parameter value may be configured to be QpPrimeTsMin.

ACT is indicated in a coding unit level in methods described above with reference to FIG. 16 to FIG. 20, but the present disclosure is not limited thereto. For example, even if an ACT is indicated in a transform_unit level, in a case where the ACT is applied to a transform unit (block) to which a current transform block processed in a scaling process belongs, a quantization parameter may be corrected according to the first to the fifth methods described above, and a scaling may be performed based on the corrected quantization parameter.

FIG. 21 illustrates a method of signaling a minimum quantization parameter applied to a transform skip mode. As described with reference to FIG. 16 to FIG. 20, a minimum quantization parameter value allowed in a transform skip mode may be included and indicated in at least one of higher level syntax structures including an SPS, a PPS, a picture header, a slice header, or the like.

Structure (a) of FIG. 21 shows a method of indicating a minimum quantization parameter applied to a transform skip mode in an SPS syntax structure according to an embodiment of the present disclosure.

chroma_format_idc may be signaled in an SPS syntax structure. A chroma_format_idc syntax element indicates chroma sampling relative to luma sampling, and a chroma format of a currently processed image may be determined according to chroma_format_idc. When chroma_format_idc is 0, this may indicate a monochrome format, and only one luma (first channel) sample array may exist in the monochrome format. When chroma_format_idc is 1, this may indicate a 4:2:0 format, the height and width of a chroma (second channel and third channel) sample array in the 4:2:0 format may be the halves of those of a luma (first channel) sample array, respectively. When chroma_format_idc is 2, this may indicate a 4:2:2 format, the height of a chroma (second channel and third channel) sample array in the 4:2:2 format may be the same as that of a luma (first channel) sample array, and the width of the chroma sample array may be the half of that of the luma sample array. When chroma_format_idc is 3, this may indicate a 4:4:4 format, and additionally, separate colour plane flag may be signaled. When separate colour plane flag is 1, this may indicate that three components of the 4:4:4 format are separated and independently coded, and when separate colour plane flag is 0, this may indicate that components configuring a color space are not separably coded. separate colour plane flag may be signaled only in a case where chroma_format_idc is 3, the case indicating the 4:4:4 format, and when separate colour plane flag is not signaled (same is not included in a bitstream), separate colour plane flag may be inferred to be 0. When separate colour plane flag is 0 in the 4:4:4 format, the height and width of a chroma (second channel and third channel) component sample array may be the same as those of a luma (first channel) component sample array. When separate colour plane flag is 1 in the 4:4:4 format, components configuring a color space may be separably coded, and each component may be processed by a monochrome picture. When separate colour plane flag is 1, colour_plane_id may be additionally signaled in a picture header, and colour_plane_id may indicate which component, among a first channel component, a second channel component, and a third channel component configuring a color space, a currently processed picture corresponds to.

In an SPS syntax structure, a bit_depth_minus8 syntax element indicating bit depth information of luma and chroma array samples may be signaled. The decoder may configure BitDepth, which is a variable indicating the bit depth of luma and chroma array samples, to be 8+bit_depth_minus8, based on a bit_depth_minus8 syntax. When BitDepth is N (a natural number), first channel, second channel, and third channel array samples may have values within a [0, 2^N−1] range. For example, when BitDepth is 8, first channel, second channel, and third channel array samples may have values within a [0, 255] range.

In an SPS syntax structure, a min_qp_prime_ts_minus4 syntax element indicating information related to a minimum quantization parameter allowed in a transform skip mode may be signaled. The decoder may configure QpPrimeTsMin, which is a variable indicating a minimum quantization parameter value allowed in a transform skip mode, to be 4+min_qp_prime_ts_minus4, based on a min_qp_prime_ts_minus4 syntax element.

In an SPS syntax structure, an sps_transform_skip_enabled_flag syntax element may be signaled. When sps_transform_skip_enabled_flag is 1, this indicates that transform_skip_flag[ ][ ][ ], which is a syntax element indicating a transform skip mode, may exist in a transform_unit syntax, and this indicates that a transform skip mode can be applied in a sequence-lower transform_unit level. Meanwhile, when sps_transform_skip_enabled_flag is 0, this indicates that transform_skip_flag[ ][ ][ ] does not exist in a transform_unit syntax (same is not included in a bitstream), and this indicates that a transform skip mode can not be applied in a sequence-lower transform_unit level.

In an SPS syntax structure, when chroma_format_idc is 3 (the format is 4:4:4 format), information indicating whether a coding method for the 4:4:4 format is on/off may be additionally signaled.

When sps_act_enabled_flag is 1, this indicates that an ACT can be used and cu_act_enabled_flag indicating whether an ACT is applied in a coding unit level may exist in a coding unit syntax. When sps_act_enabled_flag is 0, this indicates that ACT is not used and cu_act_enabled_flag does not exist in a coding unit syntax (same is not included in a bitstream). When sps_act_enabled_flag does not exist, same may be inferred to be 0.

When sps_palette_enabled_flag is 1, this indicates that pred_mode_plt_flag indicating whether a palette mode is applied in a coding unit level may exist in a coding unit syntax, and this may indicate that a palette mode which is one of prediction methods can be applied in a sequence-lower coding unit level. When sps_palette_enabled_flag is 0, this indicates that pred_mode_plt_flag does not exist in a coding unit syntax (same is not included in a bitstream), and this may indicate that a palette mode is not applied. When sps_palette_enabled_flag does not exist, same may be inferred to be 0.

As described above, QpPrimeTsMin, which is a variable indicating a minimum quantization parameter allowed in a transform skip mode, may be configured based on a min_qp_prime_ts_minus4 syntax element, and the min_qp_prime_ts_minus4 syntax element may be always signaled not depending on a different syntax element in an SPS syntax structure.

Meanwhile, the QpPrimeTsMin parameter indicates a minimum quantization parameter allowed in a transform skip mode, and when an escape value is coded in a case where a palette mode is applied to a current block, or a transform skip mode is applied, the parameter may be limitedly used. That is, in a case where it is indicated that both a transform skip mode and a palette mode are not applied in an SPS level (sps_transform_skip_enabled_flag is 0 and sps_palette_enabled_flag is 0), it may be unnecessary to include a min_qp_prime_ts_minus4 syntax element in a bitstream for QpPrimeTsMin. Therefore, only in a case where it is indicated that at least one of a transform skip mode and a palette mode can be used in an SPS level (sps_transform_skip_enabled_flag is 1, or sps_palette_enabled_flag is 1), when a min_qp_prime_ts_minus4 syntax element is signaled, the amount of a bitstream may be reduced.

Diagram (b) of FIG. 21 shows a method of indicating a minimum quantization parameter applied to a transform skip mode in an SPS syntax structure according to another embodiment of the present disclosure.

In diagram (b) of FIG. 21, min_qp_prime_ts_minus4 may indicate information related to a minimum quantization parameter allowed in a transform skip mode. Referring to diagram (b) of FIG. 21, the video signal processing device may perform an operation of obtaining a transform skip activation flag (sps_transform_skip_enabled_flag) from a bitstream. A transform skip activation flag (sps_transform_skip_enabled_flag) may indicate whether a syntax element (transform_skip_flag) indicating a transform skip mode can exist in a transform unit syntax. A syntax element (transform_skip_flag) indicating a transform skip mode may be a transform_skip_flag indicating whether a transform skip is applied to a transform block included in a current block. When the transform_skip_flag indicates that a transform skip is applied to a transform block included in a current block, transform may not be applied. A transform skip activation flag may be obtained from a bitstream among an SPS, a PPS, a picture header, or a slice header.

In addition, the video signal processing device may perform an operation of obtaining a palette activation flag (sps_palette_enabled_flag) from a bitstream. A palette activation flag (sps_palette_enabled_flag) may indicate whether a palette mode is applied. A palette activation flag (sps_palette_enabled_flag) may be obtained from a bitstream among an SPS, a PPS, a picture header, or a slice header.

In addition, in diagram (b) of FIG. 21, a min_qp_prime_ts_minus4 syntax element may be limitedly signaled as follows, based on sps_transform_skip_enabled_flag and sps_palette_enabled_flag.
   if(sps_transform_skip_enabled_flag||sps_palette_enabled_flag)
      min_qp_prime_ts_minus4

That is, when a transform skip activation flag indicates that a syntax element (transform_skip_flag) indicating a transform skip mode exists in a transform unit syntax, or a palette activation flag (sp_spalette_enabled_flag) indicates application of a palette mode, the video signal processing device may perform an operation of obtaining information (min_qp_prime_ts_minus4) related to a minimum quantization parameter allowed in a transform skip mode from a bitstream. More specifically, when it is indicated that at least one of a transform skip mode and a palette mode can be used in an SPS level (sps_transform_skip_enabled_flag is 1, or sps_palette_enabled_flag is 1), a min_qp_prime_ts_minus4 syntax element may be included in a bitstream, and otherwise (sps_transform_skip_enabled_flag and sps_palette_enabled_flag are both 0), a min_qp_prime_ts_minus4 syntax element may not be included in a bitstream. When a min_qp_prime_ts_minus4 syntax element does not exist in a bitstream, the syntax element may be inferred to be 0. As described above, when both a transform skip mode and a palette mode are not applied in an SPS level, a min_qp_prime_ts_minus4 syntax element is not signaled, and thus the amount of a bitstream can be reduced.

In the above embodiment, a QpPrimeTsMin variable is described to be used in only a transform skip mode and a palette mode, but the present disclosure is not limited thereto. For example, when a QpPrimeTsMin parameter is used in coding methods A, B, C, and D, and on/off syntax elements of the coding methods in an SPS level are sps_tool_A_enabled_flag, sps_tool_B_enabled_flag, sps_tool_C_enabled_flag, and sps_tool_D_enabled_flag, respectively, a min_qp_prime_ts_minus4 syntax element may be limitedly signaled as follows.
   if(sps_tool_A_enabled_flag||sps_tool_B_enabled_flag||sps_tool_C_enabled_flag||sps_tool_D_enabled_flag)
      min_qp_prime_ts_minus4

This indicates that, only in a case where it is indicated that at least one of coding methods A, B, C, and D can be applied in an SPS level, a min_qp_prime_ts_minus4 syntax element is included in a bitstream.

Figure 22:
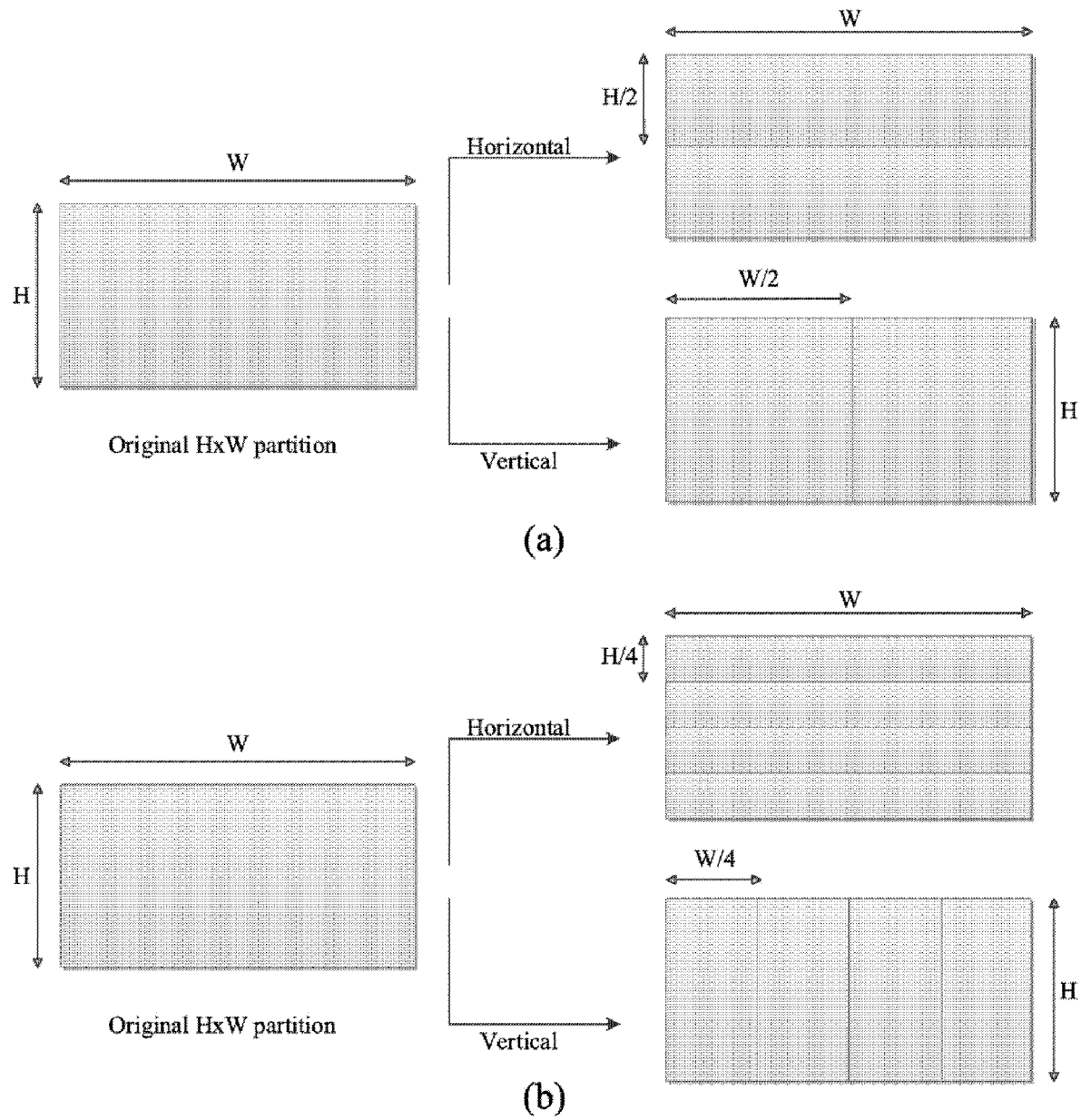
FIG. 22 illustrates an embodiment of partitioning a block in an intra sub-partition (ISP) mode.

FIG. 22 is a diagram illustrating an embodiment of partitioning a block in an intra sub-partition (ISP) mode. An ISP mode corresponds to a method of, when an intra prediction is applied to a current coding unit, partitioning a current block into multiple transform units (blocks) and performing a prediction and a reconstruction. In the ISP mode, a current block may be partitioned into multiple sub-blocks by a pre-configured method, and the pre-configured method may include horizontal partitioning and vertical partitioning. The number of sub-blocks obtained by partitioning a current block may be determined according to the size of the current block. For example, when the size of a coding unit is 4×4, the ISP mode may not be applied, and this may imply that the coding unit is not partitioned. When the size of a coding unit is 4×8 or 8×4, the coding unit may be partitioned into two transform units (blocks), and in a case of the other sizes, the coding unit may be partitioned into four transform units. A coding unit size for which the ISP mode can be applied may be determined according to transform-related information. For example, the ISP mode may be applied to a case where the width and the height of a coding unit are both equal to or smaller than a maximum size of a luma transform block, and the product of the width and the height of the coding unit is greater than the square of a minimum size of the luma transform block. The minimum size and the maximum size of the luma transform block may be 4 and 64, respectively.

Diagram (a) of FIG. 22 illustrates a transform_unit partitioning method which can be applied to a 4×8 or 8×4 coding unit, and when horizontal partitioning is indicated for a coding unit having a W×H size, the coding unit may be partitioned into two transform units having a W×(H/2) size, and when vertical partitioning is indicated, the coding unit may be partitioned into two transform units having a (W/2)×H size. Whether the partitioning is horizontal partitioning or vertical partitioning may be indicated by a 1-bit flag.

Diagram (b) of FIG. 22 illustrates a transform_unit partitioning method which can be applied to a coding unit not having a 4×8 or 8×4 size, and when horizontal partitioning is indicated for a coding unit having a W×H size, the coding unit may be partitioned into four transform units having a W×(H/4) size, and when vertical partitioning is indicated, the coding unit may be partitioned into four transform units having a (W/4)×H size. Whether the partitioning is horizontal partitioning or vertical partitioning may be indicated by a 1-bit flag.

When the ISP mode is applied to a current coding unit, a chroma block may not be partitioned. A pre-configured number of transform units partitioned by the ISP mode may include luma transform blocks, but a chroma transform block may be included only in some transform units. Specifically, a chroma transform block may be included in only the last transform unit among partitioned transform units. For example, when the ISP mode is applied to a 4×8 or 8×4 coding unit, the coding unit may include two partitioned transform units, and each of the transform units may include a luma transform block. Meanwhile, a chroma transform block may be included only in the second partitioned transform unit, and the size of the chroma transform block may be the same as that of a chroma coding block. As another example, when the ISP mode is applied to a coding unit not having a 4×8 or 8×4 size, the coding unit may include four partitioned transform units, and each of the transform units may include a luma transform block. Meanwhile, a chroma transform block may be included only in the fourth partitioned transform unit, and the size of the chroma transform block may be the same as that of a chroma coding block.

With respect to a residual signal of an inter-predicted block, the residual signal may concentrically exist at a particular position of the block (the energy of the residual signal is large at the same position). For example, a pattern in which the energy of a residual signal is large in a boundary area of a residual signal block, and the energy of the residual signal is relatively small at a center part of the block and the other side boundary area may exist. In a case of using this pattern of a residual signal of an inter-predicted block to partition a current block into sub-blocks and perform a transform and a quantization, the coding efficiency of the inter-predicted block can be improved.

Figure 23:
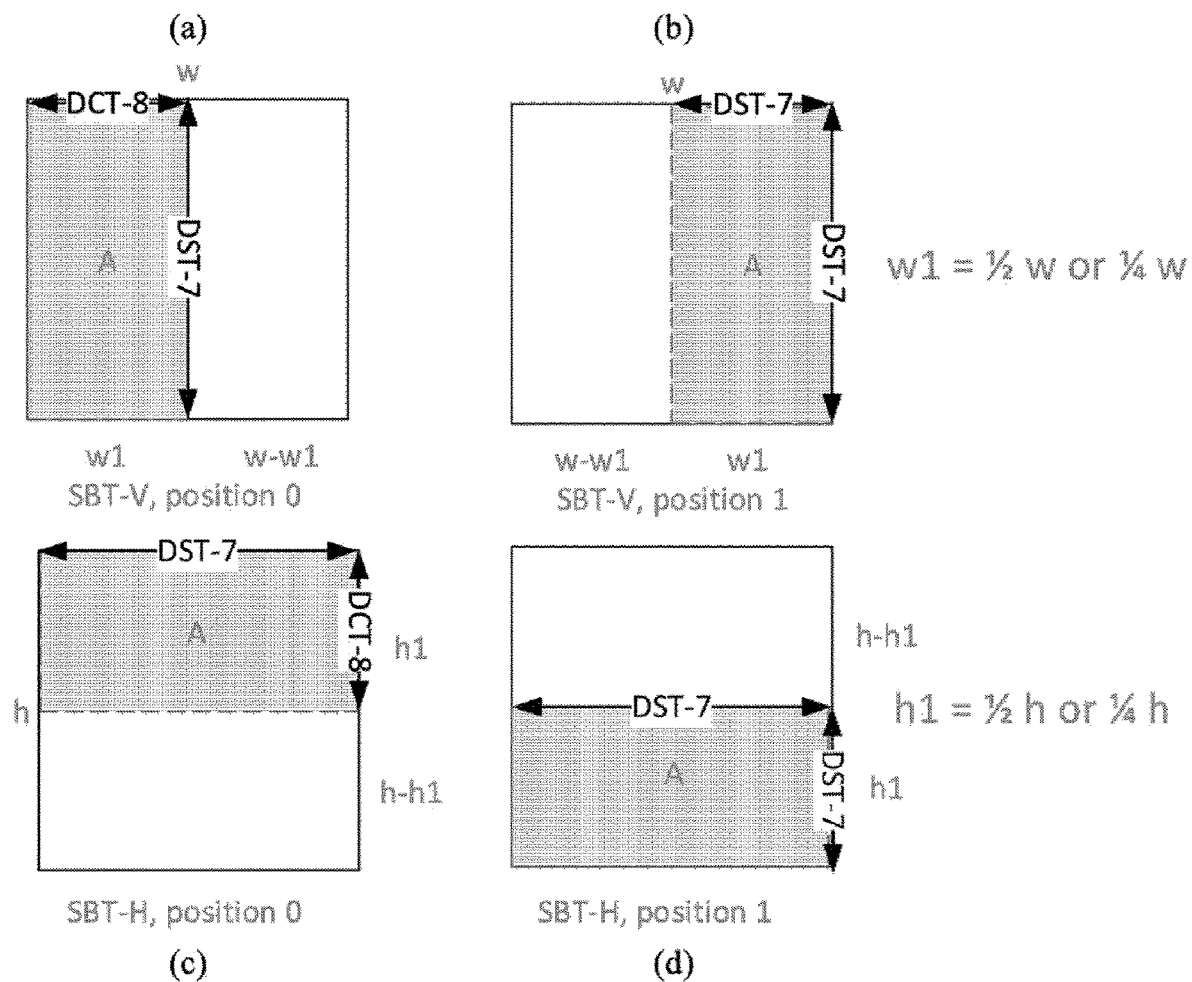
FIG. 23 illustrates a sub-block transform (SBT) method.

FIG. 23 illustrates a sub-block transform (SBT) method. SBT may partition a current coding unit at a pre-configured ratio, and perform a transform and a quantization of only some transform units among partitioned transform units. In the present disclosure, partitioning into two transform units having a 1:1 or 1:3 ratio is described, but the disclosure is not limited thereto.

SBT may assume that a residual signal is concentrated on one transform unit among partitioned transform units, perform a transform and a quantization of only one transform unit, and assume that the residual signal does not exist in the remaining transform units. In diagrams (a), (b), (c), and (d) of FIG. 23, a transform unit in an area indicated by "A" corresponds to an area in which a transform and a quantization are performed, and whether a transform coefficient (a quantized transform coefficient) other than 0 exists in a transform block after quantization may be indicated using a transform-related syntax element. Specifically, a transform coefficient flag may include a first transform coefficient flag (tu_cbf_luma), a second transform coefficient flag (tu_cbf_cb), or a third transform coefficient flag (tu_cbf_cr). In the present disclosure, the first transform coefficient flag, the second transform coefficient flag, and the third transform coefficient flag may be also called tu_y_coded_flag, tu_cb_coded_flag, and tu_cr_coded_flag, respectively. The encoder may signal a tu_cbf_cb syntax element, and the decoder may determine whether one or more transform coefficients other than 0 exist in a second channel transform block, based on the tu_cbf_cb syntax element parsed from a bitstream. When the second transform coefficient flag (tu_cbf_cb) is 1, this may indicate that one or more transform coefficients other than 0 exist in the second channel transform block, and when the second transform coefficient flag (tu_cbf_cb) is 0, this may indicate that transform coefficients of the second channel transform block are all 0. When an ACT is applied to a current block, the second channel transform block may be a Cg transform block. When an ACT is not applied to a current block, the block may indicate the second channel transform block of an original color space, and may be a Cb transform block of YCbCr.

Next, the encoder may signal a tu_cbf_cr syntax element, and the decoder may determine whether one or more transform coefficients other than 0 exist in a third channel transform block, based on the tu_cbf_cr syntax element parsed from a bitstream. When the third transform coefficient flag (tu_cbf_c) is 1, this may indicate that one or more transform coefficients other than 0 exist in the third channel transform block, and when the third transform coefficient flag (tu_cbf_cr) is 0, this may indicate that transform coefficients of the third channel transform block are all 0. When an ACT is applied to a current block, the third channel transform block may be a Co transform block. When an ACT is not applied to a current block, the block may indicate the third channel transform block of an original color space, and may be a Cr transform block of YCbCr.

Next, the encoder may signal a tu_cbf_luma syntax element which is the first transform coefficient flag and the decoder may determine whether one or more transform coefficients other than 0 exist in the first channel transform block, based on a tu_cbf_luma syntax element parsed from a bitstream. When the first transform coefficient flag (tu_cbf_luma) is 1, this may indicate that one or more transform coefficients other than 0 exist in the first channel transform block, and when the first transform coefficient flag (tu_cbf_luma) is 0, this may indicate that transform coefficients of the first channel transform block are all 0. The first channel transform block may be a luma transform block.

In diagrams (a), (b), (c), and (d) of FIG. 23, an area indicated by "A" corresponds to an area in which a residual signal exists, and the encoder may perform a transform and a quantization of a transform_unit indicated by "A", and then signal tu_cbf_luma, tu_cbf_cb, and tu_cbf_cr syntax elements, based on quantized transform coefficient information. The decoder may determine whether to perform coefficient coding (residual coding), scaling (dequantization), and an inverse transform of a corresponding transform block, based on the tu_cbf_luma, tu_cbf_cb, and tu_cbf_cr syntax elements parsed from a bitstream. When the corresponding transform block includes one or more coefficients other than 0, based on the tu_cbf_luma, tu_cbf_cb, and tu_cbf_cr syntax elements, the decoder may obtain a quantized transform coefficient (a TransCoeffLevel array), based on the syntax elements parsed from the bitstream. The decoder may dequantize the quantized transform coefficient to obtain a transform coefficient, and inverse-transform the transform coefficient to obtain a residual signal. Meanwhile, when all coefficients of a transform block are 0, the decoder may not perform coefficient coding, scaling, and inverse transform, and configure all residual sample arrays to be 0. A method of signaling tu_cbf_luma, tu_cbf_cb, and tu_cbf_cr may be described below with reference to FIG. 25 and FIG. 26.

Meanwhile, an area not indicated by "A" in diagrams (a), (b), (c), and (d) of FIG. 23 is a transform_unit area assuming that a residual signal does not exist therein, coefficient coding, dequantization, and inverse transform processes may not be performed, and the encoder may not signal tu_cbf_luma, tu_cbf_cb, and tu_cbf_cr syntax elements. The decoder may configure tu_cbf_luma, tu_cbf_cb, and tu_cbf_cr syntax elements to be 0 without parsing same from a bitstream.

Diagram (a) of FIG. 23 illustrates a method of, when the size of a coding unit is W×H, vertically partitioning the coding unit into two transform units having a (W/2)×H size. Alternatively, when a 1-bit flag indicating {1/4, 3/4} partitioning is 1, the coding unit may be partitioned into two transform units having a (W/4)×H size, and a (3 W/4)×H size. Both in the above cases, a transform may be performed for the left transform unit, DCT-VIII may be applied in the horizontal direction, and DST-VII may be applied in the vertical direction. If the width or the height of a corresponding transform unit is greater than a pre-configured value, DCT-II may be applied in both the horizontal and vertical directions. The pre-configured value may be 32. In a case of a chroma block, DCT-II may be applied in both the horizontal and vertical directions.

Diagram (b) of FIG. 23 illustrates a method of, when the size of a coding unit is W×H, vertically partitioning the coding unit into two transform units having a (W/2)×H size. Alternatively, when a 1-bit flag indicating {1/4, 3/4} partitioning is 1, the coding unit may be partitioned into two transform units having a (3 W/4)×H size, and a (W/4)×H size. Both in the above cases, a transform may be performed for the right transform unit, and DST-VII may be applied both in the horizontal direction and the vertical direction. If the width or the height of a corresponding transform unit is greater than a pre-configured value, DCT-II may be applied in both the horizontal and vertical directions. The pre-configured value may be 32. In a case of a chroma block, DCT-II may be applied in both the horizontal and vertical directions.

Diagram (c) of FIG. 23 illustrates a method of, when the size of a coding unit is W×H, horizontally partitioning the coding unit into two transform units having a W×(H/2) size. Alternatively, when a 1-bit flag indicating {1/4, 3/4} partitioning is 1, the coding unit may be partitioned into two transform units having a W×(H/4) size, and a W×(3H/4) size. Both in the above cases, a transform may be performed for the upper transform unit, DST-VII may be applied in the horizontal direction, and DCT-VIII may be applied in the vertical direction. If the width or the height of a corresponding transform unit is greater than a pre-configured value, DCT-II may be applied in both the horizontal and vertical directions. The pre-configured value may be 32. In a case of a chroma block, DCT-II may be applied in both the horizontal and vertical directions.

Diagram (d) of FIG. 23 illustrates a method of, when the size of a coding unit is W×H, horizontally partitioning the coding unit into two transform units having a W×(H/2) size. Alternatively, when a 1-bit flag indicating {1/4, 3/4} partitioning is 1, the coding unit may be partitioned into two transform units having a W×(3H/4) size, and a W×(H/4) size. Both in the above cases, a transform may be performed for the lower transform unit, and DST-VII may be applied both in the horizontal direction and the vertical direction. If the width or the height of a corresponding transform unit is greater than a pre-configured value, DCT-II may be applied in both the horizontal and vertical directions. The pre-configured value may be 32. In a case of a chroma block, DCT-II may be applied in both the horizontal and vertical directions.

Whether to use SBT may be determined according to cu_cbf which is a syntax element indicating existence/absence of a transform_tree( ) syntax structure which is a transform-related syntax structure, and whether to apply SBT may be signaled in an encoding unit level. In the present disclosure, a cu_cbf syntax element may be also called cu_coded_flag. For example, when an SBT flag (cu_sbt_flag) is 1, this may indicate that an SBT is used for a current coding unit, and when an SBT flag (cu_sbt_flag) is 0, this may indicate that an SBT is not used for a current coding unit. When cu_cbf is 1, this may indicate that a transform_tree( ) syntax structure exists for a current coding unit, and this may imply that the current coding unit includes one or more coefficients that are at least not 0. Meanwhile, when cu_cbf is 0, this may indicate that a transform_tree( ) syntax structure does not exist, and this may imply that a residual signal does not exist. The encoder and the decoder may configure a root node having the same size as a coding unit, and partition a transform tree, and a leaf node of the partitioned transform tree may be a transform unit. The transform tree may be performed by a transform_tree( ) syntax structure, and the decoder may determine whether the transform_tree( ) syntax structure exists, based on a cu_cbf syntax element parsed from a bitstream. When there is no transform_tree( ) transform unit partitioning is unable to be performed by transform_tree( ) and thus SBT may not be applied. In this case, the decoder may not parse an SBT flag (cu_sbt_flag) from a bitstream and configure same to be 0.

In another embodiment, whether to use an SBT may be determined according to a prediction method. SBT is effective when a residual signal is distributed to be concentrated on one area, and thus, when a prediction method is an inter prediction, an SBT may be applied. In a case of intra prediction, an SBT may not be applied, and the decoder may not parse an SBT flag (cu_sbt_flag) from a bitstream and configure same to be 0. In addition, use of SBT may be limited in a particular prediction method of inter prediction. For example, as a method of a merge prediction among inter predictions, a reference block indicated by a merge candidate and an intra prediction block generated using a pre-configured intra prediction mode may be merged to generate a prediction block of a current block. In this case, the characteristic of a residual signal may show the characteristic of an intra-predicted block, and thus SBT may not be applied.

When an SBT flag (cu_sbt_flag) is 1, this may indicate that an SBT is applied to a current block, and an additional syntax element may be used to indicate a method of partitioning a transform_tree. First, a syntax element indicating whether partitioning is {1/4, 3/4} partitioning or {1/2, 1/2} partitioning may be signaled. For example, when cu_sbt_quad_flag is 1, this may indicate that a current coding unit includes a transform_unit which is obtained through an SBT and is ¼ the size of the current coding unit, and thus may imply that the current coding unit includes two transform units partitioned into {1/4, 3/4} sizes. Meanwhile, when cu_sbt_quad_flag is 0, this may indicate that a current coding unit includes a transform_unit which is obtained through an SBT and is ½ the size of the current coding unit, and thus may imply that the current coding unit includes two transform units partitioned into {1/2, 1/2} sizes.

Next, information on a partitioning direction may be signaled. For example, when cu_sbt_horizontal_flag is 1, this may indicate that the current coding unit is horizontally partitioned into two transform units by an SBT. Meanwhile, when cu_sbt_horizontal_flag is 0, this may indicate that the current coding unit is vertically partitioned into two transform units by an SBT.

Next, information indicating a transform_unit among the transform units partitioned by the SBT, in which a residual signal exists, may be signaled. For example, when an SBT position flag (cu_sbt_pos_flag) is 1, this may indicate that tu_cbf_luma, tu_cbf_cb, and tu_cbf_cr syntax elements do not exist in a bitstream with respect to the first transform_unit among two transform units partitioned by an SBT. This may imply that a residual signal does not exist in the first transform_unit. The encoder may not signal tu_cbf_luma, tu_cbf_cb, and tu_cbf_cr syntax elements with respect to the first transform_unit. The decoder may configure tu_cbf_luma, tu_cbf_cb, and tu_cbf_cr syntax elements to be 0 without parsing same from a bitstream with respect to the first transform_unit. Meanwhile, when an SBT position flag (cu_sbt_pos_flag) is 0, this may indicate that tu_cbf_luma, tu_cbf_cb, and tu_cbf_cr syntax elements do not exist in a bitstream with respect to the second transform_unit among two transform units partitioned by an SBT. This may imply that a residual signal does not exist in the second transform_unit. The encoder may not signal tu_cbf_luma, tu_cbf_cb, and tu_cbf_cr syntax elements with respect to the second transform_unit. The decoder may configure tu_cbf_luma, tu_cbf_cb, and tu_cbf_cr syntax elements to be 0 without parsing same from a bitstream with respect to the second transform unit.

When an SBT is applied, a transform kernel applied in the horizontal and vertical directions according to the index (position) of a transform unit and the size of the transform unit may be selected, and thus a syntax element indicating the transform kernel may not be explicitly signaled.

The ISP mode and SBT described above with reference to FIG. 22 and FIG. 23 may partition a transform tree, and FIG. 24 illustrates a transform_tree( ) syntax structure which is a syntax structure related to a transform_tree. A transform_tree( ) syntax structure may process partitioning of a transform tree, and leaf nodes of the transform tree may be transform units (TUs), and parsing and processing of a syntax element related to a residual signal may be performed in the transform unit.

transform_tree( ) may receive an input of (x0, y0) which is the top-left coordinates of a currently processed node, tbWidth which is the width of the currently processed node, tbHeight which is the height thereof, treeType which is a variable indicating the type of a currently processed encoding tree, and a chType variable configured according to the treeType variable. When information (treeType) indicating the type of a currently processed tree is SINGLE_TREE, this may indicate that luma and chroma have been encoded in the same encoding tree structure. That is, SINGLE_TREE may indicate that a single tree is used in partitioning an upper area including the current block. When information (treeType) indicating the type of a currently processed tree is DUAL_TREE_LUMA, this may indicate that the currently processed tree is a tree for a luma component when luma and chroma have been encoded in different encoding tree structures. That is, DUAL_TREE_LUMA may indicate that a dual tree is used in partitioning an upper area including the current block, and a component included in the current block is a first channel component (LUMA). When treeType is DUAL_TREE_CHROMA, this may imply that the currently processed tree is a tree for a chroma component when luma and chroma are encoded in different encoding tree structures. The variable chType may be configured based on treeType, and when treeType is DUAL_TREE_CHROMA, chType may be configured to be 1, and otherwise, same may be configured to be 0. When transform_tree( ) is initially called, (x0, y0) may be the same as the top-left coordinate of a coding unit, and tbWidth, tbHeight, treeType, and chType may be the same as the width, the height, treeType, and chType of the coding unit, respectively. Partitioning of a root node of a transform tree having the same size as a coding unit may be divided into three cases as follows.

i) When the width of a current node is greater than the maximum number (MaxTbSizeY) of luma transform samples, or when the height of the current node is greater than the maximum number of luma transform samples (tbWidth>MaxTbSizeY||tbHeight>MaxTbSizeY): MaxTbSizeY is a variable indicating the size (the number of samples) of a luma maximum transform block, and may be determined according to the maximum size of a transform kernel defined in a codec. An increasing maximum size of a transform kernel may generally increase energy compaction, and thus can increase coding efficiency, but the size of a pipeline buffer of a hardware encoder and decoder may be determined according to the maximum size of a transform kernel. Therefore, the maximum size of a transform kernel may be determined in consideration of both complexity and coding efficiency. MaxTbSizeY may be configured to be the same fixed constant for both the encoder and the decoder, and may be configured according to a syntax element signaled in a higher level. For example, information on the maximum size (the number of samples) of a luma transform block may be included and indicated in one of an SPS and a PPS. For example, sps_max_luma_transform_size_64_flag may be included in an SPS and then be signaled. When sps_max_luma_transform_size_64_flag is 1, this may indicate the maximum transform size (the number of samples) of a luma sample is 64, and when the same flag is 0, this may indicate the maximum transform size (the number of samples) of a luma sample is 32, The variables MaxTbLog2SizeY and MaxTbSizeY may be configured as below, based on sps_max_luma_transform_size_64_flag.

MaxTbLog 2SizeY=sps_max_luma_transform_size_64_flag?6:5
MaxTbSizeY=1<<MaxTbLog 2SizeY The variable MaxTbSizeY indicates the maximum size (the number of samples) of a luma transform block, and MaxTbLog 2SizeY may be the same as a value that is the logarithm of MaxTbSizeY to the base 2. In the above embodiment, it has been described that information on the maximum size (the number of samples) of a luma transform block is signaled in a flag type in an SPS level, and the maximum size (the number of samples) of the luma transform block is determined to be one of 64 or 32. However, the present disclosure is not limited thereto. For example, a value of the logarithm of, to the base 2, the maximum size (the number of samples) of a luma transform block may be directly signaled. In the above embodiment, MaxTbLo2SizeY and MaxTbSizeY may be determined in an SPS level, and the parameters may be applied to a picture, a tile, and a slice level which are lower levels of an SPS.

In transform tree partitioning based on the maximum size (the number of samples) of a luma transform block, a transform tree partitioning method may not be explicitly signaled. Meanwhile, in a case of ISP or SBT, a transform tree partitioning method may be explicitly signaled, and transform tree partitioning based on the maximum size (the number of samples) of a luma transform block may be performed in a case where ISP and SBT are not applied. Therefore, whether ISP or SBT is applied to a current coding unit may be identified in the first if statement of a transform_tree syntax structure of FIG. 24. When IntraSubPartitionsSplitType is ISP_NO_SPLIT, this may indicate that ISP is not applied to a current coding unit, and when IntraSubPartitionsSplitType is not ISP_NO_SPLIT, this may indicate that ISP is applied to a current coding unit. When an SBT flag (cu_sbt_flag) is 1, this may indicate that an SBT is applied to a current coding unit, and when an SBT flag (cu_sbt_flag) is 0, this may indicate that an SBT is not applied to a current coding unit. Transform tree partitioning based on the maximum size (the number of samples) of a luma transform block may be performed in a case where ISP and SBT are not applied. Therefore, when, in the first if statement, IntraSubPartitionsSplitType is ISP_NO_SPLIT, and an SBT flag (cu_sbt_flag) is 0, transform tree partitioning based on the maximum size (the number of samples) of a luma transform block may be performed.

When the width (tbWidth) or the height (tbHeight) of a root node and a partitioned middle node of a transform tree is greater than MaxTbSizeY, a partitioning method is not explicitly signaled and parsed, and the transform tree may be partitioned until both the width and the height of the partitioned node become equal to or smaller than MaxTbSizeY. When tbWidth and tbHeight are both equal to or smaller than MaxTbSizeY, the corresponding node may become a transform unit, which is a leaf node of the transform tree.

For example, when MaxTbSizeY is 32 with respect to a 64×64 root node (the same size as a coding unit), a transform tree may be partitioned into four nodes having a 32×32 size, and a leaf node having a 32×32 size may become a transform unit without further partitioning. As another example, when MaxTbSizeY is 32 with respect to a 64×32 root node, a transform tree may be partitioned into two nodes having a 32×32 size, and a leaf node having a 32×32 size may become a transform unit without further partitioning. When the width or the height of a root node and a partitioned middle node of a transform tree is greater than MaxTbSizeY, transform_tree( ) may be recursively called to partition the transform tree. When the width and the height of a root node and a partitioned middle node of a transform tree are both equal to or smaller than MaxTbSizeY, the corresponding node may become a transform unit without further partitioning, and parsing and processing of a syntax element related to a residual signal may be performed in a transform_unit( ) syntax structure.

ii) When SBT is applied to a current coding unit (cu_sbt_flag==1): Differently from case i) described above, when an SBT is applied, a transform tree partitioning method may be determined through explicit signaling of a syntax element in a coding unit level.

iii) When ISP is applied to a current coding unit (IntraSubPartitionsSplitType !=ISP_NO_SPLIT): Differently from the case described in index i), when ISP is applied, a transform tree partitioning method may be determined through explicit signaling of a syntax element in a coding unit level. When IntraSubPartitionsSplitType is ISP HOR SPLIT, this may indicate horizontal partitioning by ISP, and when IntraSubPartitionsSplitType is ISP VER SPLIT, this may indicate vertical partitioning by ISP.

As cases i), ii), and iii) described above, partitioning of a transform tree may be classified into case i) of partitioning without explicit signaling of a syntax element, and cases ii) and iii) of indicating a partitioning method by using an explicit signal of a syntax element. In a case of a transform_tree( ) syntax structure illustrated in FIG. 24, transform tree partitioning described in all cases i), ii), and iii) may be performed, and the transform_tree( ) syntax structure of FIG. 24 is as follows in brief

```
transform_tree( )
{
if(IntraSubPartitionsSplitType==ISP_NO_SPLIT && !cu_sbt_flag)
{
Do implicit partitioning based on the block size
}
else if(cu_sbt_flag)
{
Do explicit partitioning based on the SBT mode
}
else if(IntraSubPartitionsSplitType==ISP_HOR_SPLIT)
{
Do explicit partitioning based on the ISP mode
}
else if(IntraSubPartitionsSplitType==ISP_VER_SPLIT)
{
Do explicit partitioning based on the ISP mode
}
}
```

In the transform_tree( ) syntax structure illustrated in FIG. 24, first, when IntraSubPartitionsSplitType is ISP_NO_SPLIT, and an SBT flag (Cu_sbt_flag) is 0, implicit partitioning based on size information of a node and a luma maximum transform block size (the number of samples) may be performed. Next, when IntraSubPartitionsSplitType is ISP_NO_SPLIT, and an SBT flag (cu_sbt_flag) is 1, a transform_tree may be partitioned based on an SBT-related syntax element signaled and parsed in a coding unit. Next, when IntraSubPartitionsSplitType is not ISP_NO_SPLIT, and an SBT flag (cu_sbt_flag) is 0, horizontal partitioning or vertical partitioning by ISP may be performed based on IntraSubPartitionsSplitType.

A transform_unit which is a leaf node of a transform_tree may include a syntax element related to a transform and a transform coefficient, and may be processed in a transform_unit( ) syntax structure. FIG. 25 illustrates a transform_unit( ) syntax structure according to an embodiment of the present disclosure. A transform_unit( ) syntax structure indicates a syntax structure related to a transform_unit, and may receive an input of tbWidth, tbHeight, treeType, subTuIndex, and chType variables. (x0, y0) may indicate the position of the top-left luma sample of a current transform block, and may be a relative position to the top-left luma sample position of a picture. The variables tbWidth and tbHeight may indicate the width of a current transform block and the height of a current transform block, respectively. An encoding tree structure for a luma component and an encoding tree structure for a chroma component may be identically or differently encoded, and thus a currently processed encoding tree type may be indicated by a treeType variable. When treeType is SINGLE_TREE, this implies that a luma component and a chroma component have been encoded in the same encoding tree structure, and in this case, a transform unit may include a chroma transform block according to a color format and a luma transform block. When treeType is DUAL_TREE_LUMA, this may imply that a currently processed encoding tree is an encoding tree for a luma component when a luma component and a chroma component are encoded in different encoding tree structures. In this case, a transform unit may include a luma transform block. When treeType is DUAL_TREE_CHROMA, this may imply that a currently processed encoding tree is an encoding tree for a chroma component when a luma component and a chroma component are encoded in different encoding tree structures. In this case, a transform unit may include a chroma transform block according to a color format. subTuIndex indicates an index of a currently processed transform unit. chType may be configured based on treeType, and when treeType is DUAL_TREE_CHROMA, chType may be configured to be 1, and otherwise, same may be configured to be 0.

In the transform_unit( ) syntax structure, first, (xC, yC) which is an index for a second channel component and a third channel component, and the widths and heights of a second channel transform block and a third channel transform block may be configured. (x0, y0), tbWidth, and tbHeight input to transform_unit( ) may be values configured with reference to a luma block. For example, tbWidth and tbHeight may be the width and height of a luma transform block, and the width (the variable wC) and height (the variable hC) of a chroma transform block may be different from the width and height of a luma transform block according to a color format (or a chroma format).

The chroma format may be divided into monochrome, 4:2:0, 4:2:2, and 4:4:4 types according to a ratio of subsampling of a chroma sample array. In monochrome sampling, only one sample array may exist, and may be a luma sample array. In 4:2:0 sampling, the widths and heights of two chroma (second channel and third channel) sample arrays may be the half of the width and the height of a luma (first channel) sample array, respectively. In 4:2:2 sampling, the widths of two chroma (second channel and third channel) sample arrays may be the half of the width of a luma (first channel) sample array, and the heights thereof may be the same as the height of a luma (first channel) sample array. In 4:4:4 sampling, the widths and heights of two chroma (second channel and third channel) sample arrays may be the same as the width and the height of a luma (first channel) sample array, respectively. In 4:4:4: sampling, a first channel component, a second channel component, and a third channel component may be separated and independently processed, and in this case, each channel component may be processed by a monochrome-sampled picture. According to a chroma format, a variable (SubWidthC) related to a horizontal sampling ratio, a variable (SubHeightC) related to a vertical sampling ratio, and an indicator (ChromaArrayType) indicating the type of a chroma array determined according to the chroma format may be configured as follows.

Monochrome
ChromaArrayType=0, SubWidthC=1, SubHeightC=1
4:2:0
ChromaArrayType=1, SubWidthC=2, SubHeightC=2
4:2:2
ChromaArrayType=2, SubWidthC=2, SubHeightC=1
4:4:4
ChromaArrayType=3, SubWidthC=1, SubHeightC=1

As a particular case of 4:4:4 sampling, when a first component, a second component, and a third component are separated and independently processed, ChromaArrayType may be configured to be 0 as in a case of monochrome. The variables SubWidthC and SubHeightC indicate sub-sampling ratios of the horizontal direction and the vertical direction, respectively, and the size of a chroma block may be derived based on the size of a luma block, SubWidthC, and SubHeightC. For example, the width and height of a chroma coding block is the same as a value obtained by dividing the width (CbWidth[chType][x0][y0]) of a luma coding block by SubWidthC, and a value obtained by dividing the height (CbHeight[chType][x0][y0]) of a luma coding block by SubHeightC, respectively. As another example, the width and height of a chroma transform block are the same as a value obtained by dividing the width (tbWidth) of a luma transform block by SubWidthC, and a value obtained by dividing the height (tbHeight) of a luma transform block by SubHeightC, respectively.

When the ISP mode is applied to a current coding unit, the coding unit may be partitioned into multiple transform units by a transform tree, and NumIntraSubPartitions which is a variable indicating the number of the partitioned transform units may be determined based on ISP mode information and the size of a coding block. Even when the ISP mode is applied to a current coding unit, a chroma block may not be partitioned. For example, when an ISP horizontal partitioning mode (ISP HOR SPLIT) is applied to a coding unit having a 64×64 size, the coding unit may be partitioned into four 64×16 transform units. Among the transform units, the first transform_unit (subTuIndex is 0), the second transform_unit (subTuIndex is 1), and the third transform_unit (subTuIndex is 2) may include only a luma transform block having a 64×16 size. The fourth transform_unit (subTuIndex is 3) may include a chroma transform block having a non-partitioned size (the same size as that of a chroma coding block) and a luma transform block having a 64×16 size.

In a tree structure which may include a chroma block (a first condition, when treeType is SINGLE_TREE), when the ISP mode is applied (a second condition, IntraSubPartitionsSplitType is not ISP_NO_SPLIT), for the last partitioned transform unit (a third condition, when subTuIndex is NumIntraSubPartitions−1), the variables xC and yC related to an index of a chroma array, and the width wC and height hC of the chroma array may be configured as follows.

xC=CbPosX[chType][x0][y0]
yC=CbPosY[chType][x0][y0]
wC=CbWidth[chType][x0][y0]/SubWidthC
hC=CbHeight[chType][x0][y0]/SubHeightC This may indicate that, when the ISP mode is applied, a chroma block is not partitioned, and a chroma transform block having the same size as that of a chroma coding block that has not been partitioned is included in the last partitioned transform unit (a transform unit, subTuIndex of which is NumIntraSubPairtitions−1).

When any one of the first condition, the second condition, and the third condition is false, xC, yC, wC, and hC may be configured as follows.

xC=x0
yC=y0
wC=tbWidth/SubWidthC
hC=tbHeight/SubHeightC chromaAvailable which is a variable indicating existence/absence of a chroma sample (a second component and a third component) array may be configured to be true when the following first condition to the third condition are all true.

[First condition] treeType !=DUAL_TREE_LUMA

When the structure of a currently processed encoding tree corresponds to a tree including only luma (first component), a chroma sample array may not be included.

[Second condition] ChromaArrayType !=0

When a color format of a processed image is monochrome, or the first component, the second component, and the third component are independently and separably processed in a 4:4:4 image, ChromaArrayType may be configured to be 0, and this may indicate that chroma (the second component and the third component) does not exist.

[Third condition] IntraSubPartitionsSplitType=ISP_NO_SPLIT (IntraSubPartitions SplitType !=ISP_NO_SPLIT && subTuIndex==NumIntraSubPartitions−1)

When the ISP mode is not applied to a current coding unit (IntraSubPairtitionsSplitType is ISP_NO_SPLIT), or when the ISP mode is applied (IntraSubPartitionsSplitType is not ISP_NO_SPLIT), in a case where a currently processed transform_unit is the last transform_unit among partitioned transform units (subTuIndex is NumIntraSubPartitions−1), a chroma sample array may be included.

In a transform_unit( ) syntax structure, first, a syntax element indicating whether a transform block includes one or more transform coefficients other than 0 may be processed. A tu_cbf_cb[xC][yC] syntax element is a syntax element indicating whether a second channel transform block includes one or more transform coefficients other than 0. When tu_cbf_cb[xC][yC] is 1, this may imply that a second channel transform block includes one or more transform coefficients other than 0. Meanwhile, when tu_cbf_cb[xC][yC] is 0, this may indicate that all transform coefficients of a second channel transform block are 0. The indexes xC and yC may indicate the top-left position (xC, yC) of a second channel transform block, and a second channel may be a Cb channel of YCbCr color space, a Cg channel of YCgCo color space, and a B channel of GBR color space (may also be called RGB color space).

A tu_cbf_cr[xC][yC] syntax element is a syntax element indicating whether a third channel transform block includes one or more transform coefficients other than 0. When tu_cbf_cr[xC][yC] is 1, this may imply that a third channel transform block includes one or more transform coefficients other than 0. Meanwhile, when tu_cbf_cr[xC][yC] is 0, this may indicate that all transform coefficients of a third channel transform block are 0. The indexes xC and yC may indicate the top-left position (xC, yC) of a third channel transform block, and a third channel may be a Cr channel of YCbCr color space, a Co channel of YCgCo color space, and an R channel of GBR color space.

A tu_cbf_luma[x0][y0] syntax element is a syntax element indicating whether a first channel transform block includes one or more transform coefficients other than 0. When tu_cbf_luma[x0][y0] is 1, this may imply that a first channel transform block includes one or more transform coefficients other than 0. Meanwhile, when tu_cbf_luma[x0][y0] is 0, this may indicate that all transform coefficients of a first channel transform block are 0. The indexes x0 and y0 may indicate the top-left first channel sample position (x0, y0) of a first channel transform block, and may be a relative position to the top-left first channel sample position of a picture. A first channel may be a luma Y channel of YCbCr color space, a luma Y channel of YCgCo color space, and a G channel of GBR color space.

According to the following first to third conditions, tu_cbf_cb[xC][yC] and tu_cbf_cr[xC][yC] syntax elements may be first signaled.

[First condition] (treeType=SINGLE_TREE treeType=DUAL_TREE_CHROMA) && ChromaArrayType!=0

When treeType is SINGLE_TREE or DUAL_TREE_CHROMA, a current unit may include a block for a second channel component and a third channel component, and when ChromaArrayType is 0, this may indicate that a second channel sample array and a third channel sample array do not exist. Therefore, in a case where the first condition is satisfied, when a second condition is true, or a third condition is true, tu_cbf_cb[xC][yC] and tu_cbf_cr[xC][yC] may be signaled. When the first condition is false, the encoder may not signal tu_cbf_cb[xC][yC] and tu_cbf_cr[xC][yC]. The decoder may configure both tu_cbf_cb[xC][yC] and tu_cbf_cr[xC][yC] to be 0 without parsing same from a bitstream.

[Second condition]
IntraSubPartitionsSplitType=ISP_NO_SPLIT &&
!(cu_sbt_flag && ((subTuIndex==0 && cu_sbt_pos_flag)||
(subTuIndex==1 && !cu_sbt_pos_flag)))

The second condition may indicate a condition that, when the ISP mode is not applied to a current block (IntraSubPartitionsSplitType is ISP_NO_SPLIT), tu_cbf_cb[xC][yC] and tu_cbf_cr[xC][yC] are signaled. When the ISP mode is not applied, an SBT may be applied, and when an SBT is applied, a coding unit may be partitioned into a pre-configured number of transform units by a transform_tree, and the pre-configured number of transform units may be 2. When an SBT is applied (cu_sbt_flag is 1), as described with reference to FIG. 23, an SBT position flag (cu_sbt_pos_flag) which is a syntax element indicating a transform_unit in which a residual signal exists, among partitioned transform units may be signaled. When an SBT position flag (cu_sbt_pos_flag) is 1, this indicates that tu_cbf_luma, tu_cbf_cb, and tu_cbf_cr syntax elements do not exist in a bitstream with respect to the first transform_unit (a transform unit, subTuIndex of which is 0) among two partitioned transform units, and this implies that a residual signal may exist in the second transform_unit (subTuIndex is 1). In this case, the encoder may not signal tu_cbf_luma[x0][y0], tu_cbf_cb[xC][yC], and tu_cbf_cr[xC][yC] with respect to the first transform_unit. The decoder may configure tu_cbf_luma[x0][y0], tu_cbf_cb[xC][yC] and tu_cbf_cr[xC][yC] to be all 0 without parsing same from a bitstream.

Meanwhile, when an SBT position flag (cu_sbt_pos_flag) is 0, this indicates that tu_cbf_luma, tu_cbf_cb, and tu_cbf_cr syntax elements do not exist in a bitstream with respect to the second transform_unit (subTuIndex is 1) among two transform units partitioned by an SBT, and this implies that a residual signal can exist in the first transform_unit (subTuIndex is 0). In this case, the encoder may not signal tu_cbf_luma[x0][y0], tu_cbf_cb[xC][yC], and tu_cbf_cr[xC][yC] with respect to the second transform_unit. The decoder may configure tu_cbf_luma[x0][y0], tu_cbf_cb[xC][yC] and tu_cbf_cr[xC][yC] to be all 0 without parsing same from a bitstream. Therefore, the second condition may imply that, in a case where the ISP mode and an SBT are not applied, or a residual signal can exist in a currently processed transform_unit when an SBT is applied, tu_cbf_cb[xC][yC] and tu_cbf_cr[xC][yC] may be signaled.

[Third condition]
IntraSubPartitionsSplitType!=ISP_NO_SPLIT &&
(subTuIndex—NumIntraSubParrtitions−1)

The third condition may indicate a condition that, when the ISP mode is applied to a current block (IntraSubPartitionsSplitType is not ISP_NO_SPLIT), tu_cbf_cb[xC][yC] and tu_cbf_cr[xC][yC] are signaled. When the ISP mode is applied to a current block, a coding unit may be partitioned into NumIntraSubPartitions number of transform units by a transform tree, and a chroma (a second channel and a third channel) block may be included only in the last transform_unit (subTuIndex is NumIntraSubPartitions−1) among the partitioned transform units. Chroma blocks may not be included in the other transform units (subTuIndex is equal to or greater than 0, and is smaller than NumIntraSubPartitions−1), and tu_cbf_cb[xC][yC] and tu_cbf_cr[xC][yC] may not be signaled. In this case, the encoder may not signal tu_cbf_cb[xC][yC] and tu_cbf_cr[xC][yC]. The decoder may configure both tu_cbf_cb[xC][yC] and tu_cbf_cr[xC][yC] to be 0 without parsing same from a bitstream.

When the first condition is true, and a second condition is true or a third condition is true, tu_cbf_cb[xC][yC] and tu_cbf_cr[xC][yC] may be signaled. When tu_cbf_cb[xC][yC] and tu_cbf_cr[xC][yC] do not exist, the decoder may configure same to be both 0.

In the transform_unit( ) syntax structure, next, tu_cbf_luma[x0][y0] may be signaled. According to the following first to third conditions, a tu_cbf_luma[x0][y0] syntax element may be signaled.

[First condition]
treeType=SINGLE_TREE||treeType=DUAL_TREE_LUMA

When treeType is SINGLE_TREE or DUAL_TREE_LUMA, a current unit may include a block for a first channel component, and in a case where the first condition is satisfied, when the second condition is true, or the third condition is true, tu_cbf_luma[x0][y0] may be signaled. When treeType is DUAL_TREE_CHROMA, a current unit may not include a block for a first channel component. In this case, the encoder may not signal tu_cbf_luma[x0][y0]. The decoder may configure tu_cbf_luma[x0][y0] to be 0 without parsing same from a bitstream.

[Second condition]
IntraSubPartitionsSplitType=ISP_NO_SPLIT &&
!(cu_sbt_flag && ((subTuIndex==0 && cu_sbt_pos_flag)||
(subTuIndex==1 && !cu_sbt_pos_flag))) &&
(CuPredMode[chType][x0][y0]==MODE_INTRA||
(chromaAvailable && (tu_cbf_cb[xC][yC]||tu_cbf_cr[xC][yC]))
CbWidth[chType][x0][y0]>MaxTbSizeY
CbHeight[chType][x0][y0]>MaxTbSizeY)

The second condition may be configured to be true when the (2-1)th condition is true, and at least one of the (2-2)th condition to the (2-5) condition is true.

[(2-1)th condition]
IntraSubPartitionsSplitType==ISP_NO_SPLIT &&
!(cu_sbt_flag && ((subTuIndex==0 && cu_sbt_pos_flag)||
(subTuIndex==1 && !cu_sbt_pos_flag)))

The (2-1)th condition may imply that, in a case where the ISP mode and an SBT are not applied, or a residual signal can exist in a currently processed transform_unit when an SBT is applied, tu_cbf_luma[x0][y0] may be signaled according to the (2-2)th condition to the (2-5)th condition.

[(2-2)th condition] CuPredMode[chType][x0][y0]==MODE_INTRA

A prediction method may be determined in a coding unit level, and a CuPredMode[chType][x0][y0] variable may be configured based on information received in a coding unit level. The prediction method may include intra prediction, inter prediction, intra block copy (IBC), a palette mode, etc. The IBC prediction may correspond to a method of generating a prediction block from a reconstructed area of a current picture which is currently being reconstructed. The palette mode may correspond to a method of mapping, with a particular index, a pixel value frequently generated in a block, signaling index information by the encoder, and reconstructing, by the decoder, a current block, based on the index information parsed from a bitstream. When CuPredMode[chType][x0][y0] is MODE_INTRA, this indicates that an intra prediction is applied to a current block, and when CuPredMode[chType][x0][y0] is MODE_INTER, this may indicate that an inter prediction is applied to a current block. In addition, when CuPredMode[chType][x0][y0] is MODE_IBC, this may indicate that an IBC prediction is applied to a current block, and when CuPredMode[chType][x0][y0] is MODE_PLT, this may indicate that the palette mode is applied to a current block. When the (2-1)th condition is true, and an intra prediction is applied to a current block (CuPredMode[chType][x0][y0] is MODE_INTRA), tu_cbf_luma[x0][y0] may be signaled. When an inter prediction or an IBC prediction is applied to a current block, tu_cbf_luma[x0][y0] may be signaled according to the (2-3)th condition to the (2-5)th condition.

[(2-3)th condition] chromaAvailable &&
(tu_cbf_cb[xC][yC]||tu_cbf_cr[xC][yC])

cu_cbf indicating whether a transform_tree( ) syntax structure exists may be signaled according to a prediction method.

For example, in a case of the palette mode, a block can be reconstructed without using a residual signal, and thus when the palette mode is applied to a current block, cu_cbf may not be signaled. That is, the encoder does not explicitly signal cu_cbf, and the decoder may configure cu_cbf to be 0 without parsing same from a bitstream.

In a case of intra prediction, a prediction sample is generated according to a pre-configured prediction mode, based on a reconstructed sample around a current block, and thus prediction accuracy may decrease compared to inter prediction. This may imply that the energy of a residual signal existing in a block is relatively large, and the possibility that quantized transform coefficients existing in a block become all 0 is also low. In addition, when intra prediction is applied, a prediction and a reconstruction may be performed in a transform unit level, and even when all transform coefficients existing in a block are 0, a partitioning structure of a transform tree may be required to be determined. Therefore, based on this characteristic, when an intra prediction is applied to a current block, cu_cbf may not be signaled. The encoder does not explicitly signal cu_cbf, and the decoder may configure cu_cbf to be 1 without parsing same from a bitstream.

In a case of inter prediction and IBC prediction, cu_cbf may be signaled according to a merge mode and a skip mode. The merge mode may generate a merge candidate list including multiple motion information sets according to a pre-configured method, and signal a motion information set index used in the merge candidate list, and the motion information set may include a motion vector, a reference picture index, etc. The decoder may parse a merge flag from a bitstream, and determine whether the merge mode is applied to a current block. When the merge mode is applied to the current block, the decoder may additionally parse a merge index, and select a particular motion information set indicated by the merge index in a merge candidate list including multiple motion information sets. The decoder may generate a prediction block, based on the selected motion information set. The skip mode is a particular mode of the merge mode, and may be a merge mode in which a residual signal does not exist, and this may indicate that a transform_tree( ) syntax structure does not exist. Whether the skip mode is applied to a current block may be indicated by a skip flag. The skip mode (a case where a skip flag is 1 and a merge flag is 1) indicates that a residual signal does not exist, and the merge mode (a case where a skip flag is 0, and a merge flag is 1) rather than the skip mode indicates that a residual signal exists, and this may indicate that a transform_tree( ) syntax structure exists. Therefore, the encoder may not signal cu_cbf when a merge flag is 1. The decoder may not parse cu_cbf from a bitstream, and determine cu_cbf, based on a skip flag. When a skip flag is 1, cu_cbf may be configured to be 0, and when a skip flag is 0, cu_cbf may be configured to be 1. When the merge mode is not applied to a current block (a merge flag is 0), the encoder may explicitly signal cu_cbf. The decoder may parse cu_cbf from a bitstream, and determine whether a transform_tree( ) syntax structure exists.

When cu_cbf is 1 with respect to an inter-predicted and IBC-predicted block, this may imply that one or more transform coefficients other than 0 exists in a current coding unit, and may indicate that at least one of tu_cbf_luma, tu_cbf_cb, and tu_cbf_cr existing in a transform_unit( ) syntax structure is not 0. tu_cbf_cb, and tu_cbf_cr syntax elements are signaled before tu_cbf_luma, and thus when a chroma (second channel and third channel) component sample array does not exist (chromaAvailable is 0), or tu_cbf_cb and tu_cbf_cr are both 0, tu_cbf_luma may be signaled according to the (2-4)th condition and the (2-5)th condition. The (2-4)th condition and the (2-5)th condition indicate a condition that a coding unit is partitioned into multiple transform units, based on the maximum size of a luma transform block, and when the width or height of a coding unit is greater than the maximum size (the number of samples) of a luma transform block, a current coding unit may be partitioned into multiple transform units. When the (2-4)th condition and the (2-5)th condition are false, this may indicate that a current coding unit includes one transform_unit, and when chromaAvailable is 0, or tu_cbf_cb, and tu_cbf_cr are both 0, tu_cbf_luma[x0][y0] may not be parsed from a bitstream, and may be configured to be 1. Meanwhile, when the (2-3)th condition is true, (a chroma sample array exists, and at least one of tu_cbf_cb[xC][yC] and tu_cbf_cr[xC][yC] is 1), it is impossible to limit a value of tu_cbf_luma[x0][y0], and thus tu_cbf_luma[x0][y0] may be signaled. The decoder may parse tu_cbf_luma[x0][y0] from a bitstream, and determine whether one or more transform coefficients other than 0 exist in a first channel transform block.

[(2-4)th condition] CbWidth[chType][x0][y0]>MaxTbSizeY

As described with reference to FIG. 24, when the width of a luma coding block is greater than a luma maximum transform block size (the number of samples), a coding unit may be partitioned into multiple transform units by a transform_tree. When a coding unit may be partitioned into multiple transform units, based on a luma maximum transform block size (the number of samples), tu_cbf_luma[x0][y0] may be signaled. The decoder may parse tu_cbf_luma[x0][y0] from a bitstream, and determine whether one or more transform coefficients other than 0 exist in a first channel transform block.

[(2-5)th condition] CbHeight[chType][x0][y0]>MaxTbSizeY

As described with reference to FIG. 24, when the height of a luma coding block is greater than a luma maximum transform block size (the number of samples), a coding unit may be partitioned into multiple transform units by a transform_tree. When a coding unit may be partitioned into multiple transform units, based on a luma maximum transform block size (the number of samples), tu_cbf_luma[x0][y0] may be signaled. The decoder may parse tu_cbf_luma[x0][y0] from a bitstream, and determine whether one or more transform coefficients other than 0 exist in a first channel transform block.

[Third condition]
IntraSubPartitionsSplitType!=ISP_NO_SPLIT && (subTuIndex<NumIntraSubPartitions−1||!InferTuCbfLuma)

When the ISP mode is applied to a current block (IntraSubPartitionsSplitType is not ISP_NO_SPLIT), a tu_cbf_luma[x0][y0] syntax element may be required to be 1 with respect to at least one transform_unit among transform units partitioned by the ISP mode. To this end, in a case where, when the ISP mode is applied to a current coding unit, tu_cbf_luma values of all partitioned transform units are 0, the encoder may not select the ISP mode. When a currently processed transform_unit is not the last transform_unit among transform units partitioned by the ISP mode (subTuIndex is smaller than NumIntraSubPartitions−1), the encoder may explicitly signal tu_cbf_luma[x0][y0]. The decoder may parse tu_cbf_luma[x0][y0] from a bitstream, and determine whether one or more transform coefficients other than 0 exist in a first channel transform block. When a currently processed transform_unit is the last transform_unit among transform units partitioned by the ISP mode (subTuIndex is NumIntraSubPartitions−1), tu_cbf_luma[x0][y0] may be signaled according to an InferTuCbfLuma variable. When InferTuCbfLuma is 1, this may indicate that, with respect to transform units partitioned by the ISP mode, values of tu_cbf_luma[x0][y0] of all transform units processed before a currently processed transform_unit are 0. Therefore, when InferTuCbfLuma is 1 for the last transform_unit, the encoder may not signal tu_cbf_luma[x0][y0]. The decoder may configure tu_cbf_luma[x0][y0] to be 1 without parsing same from a bitstream. Meanwhile, when InferTuCbfLuma is 0, this may indicate that, with respect to transform units partitioned by the ISP mode, a value of tu_cbf_luma[x0][y0] of at least one transform_unit among transform units processed before a currently processed transform_unit is 1. Therefore, it is impossible to limit a value of tu_cbf_luma[x0][y0] of the last transform_unit, and thus when InferTuCbfLuma is 0 for the last transform_unit, the encoder may signal tu_cbf_luma[x0][y0]. The decoder may parse tu_cbf_luma[x0][y0] from a bitstream, and determine whether one or more transform coefficients other than 0 exist in a first channel transform block.

According to a method of signaling tu_cbf_cb, tu_cbf_cr, and tu_cbf_luma described above, the decoder may determine whether one or more transform coefficients other than 0 exist in a corresponding transform block. When one or more transform coefficients other than 0 exist in a corresponding transform block, based on tu_cbf_luma, tu_cbf_cb, and tu_cbf_cr syntax elements, the decoder may parse transform coefficient-related syntax elements from a bitstream, and obtain a transform coefficient array.

FIG. 26 illustrates a transform_unit( ) syntax structure according to another embodiment of the present disclosure. A part omitted from the description related to FIG. 26 may follow the description given above with reference to FIG. 25, and FIG. 26 illustrates another method of signaling a tu_cbf_luma[x0][y0] syntax element.

ACT described with reference to FIG. 14 to FIG. 19 may transform a residual signal in a first color space to be in a second color space, and when a second transform coefficient flag (tu_cbf_cb), a third transform coefficient flag (tu_cbf_cr), and a first transform coefficient flag (tu_cbf_luma) of each of all transform units included in a coding unit are all 0, there may be no effect caused by color space transformation. When tu_cbf_cb, tu_cbf_cr, and tu_cbf_luma are all 0, this indicates that all transform coefficients existing in a second channel transform block, a third channel transform block, and a first channel transform block are 0, and this may indicate that all residual signals are 0. Therefore, when an ACT is applied to a current coding unit, it may be satisfied that cu_cbf is 1, and it may be satisfied that at least one of tu_cbf_luma, tu_cbf_cb, and tu_cbf_cr syntax elements is not 0. Based on the above case, according to the following first to third conditions, a tu_cbf_luma[x0][y0] syntax element may be signaled.

[First condition]
treeType=SINGLE_TREE∥treeType=DUAL_TREE_LUMA

When treeType is SINGLE_TREE or DUAL_TREE_LUMA, a current unit may include a block having a first channel component, and in a case where the first condition is satisfied, when the second condition is true, or the third condition is true, tu_cbf_luma[x0][y0] may be signaled.

When information (treeType) indicating the type of a currently processed tree does not indicate a single tree (SINGLE_TREE), and the information (treeType) indicating the type of the currently processed tree does not indicate dual tree luma (DUAL_TREE_LUMA), the video signal processing device may perform an operation of not obtaining, from a bitstream, a first transform coefficient flag (tu_cbf_luma[x0][y0]) indicating whether a transform coefficient other than 0 exists in a transform block included in a current block. The video signal processing device may configure tu_cbf_luma[x0][y0] to be a predetermined value. For example, when treeType is DUAL_TREE_CHROMA, a current unit may not include a block having a first channel component. In this case, the encoder may not signal tu_cbf_luma[x0][y0]. The decoder may configure tu_cbf_luma[x0][y0] to be 0 without parsing same from a bitstream.

[Second condition]
IntraSubPartitionsSplitType==ISP_NO_SPLIT &&
!(cu_sbt_flag && ((subTuIndex==0 && cu_sbt_pos_flag)∥
(subTuIndex==1 && !cu_sbt_pos_flag))) &&
((CuPredMode[chType][x0][y0]==MODE_INTRA &&
!cu_act_enabled_flag[x0][y0])
(chromaAvailable && (tu_cbf_cb[xC][yC]∥tu_cbf_cr[xC][yC]))∥
CbWidth[chType][x0][y0]>MaxTbSizeY
CbHeight[chType][x0][y0]>MaxTbSizeY)

The second condition may be configured to be true when the (2-1)th condition is true, and at least one of the (2-2)th condition to the (2-5) condition is true.

[(2-1)th condition]
IntraSubPartitionsSplitType==ISP_NO_SPLIT &&
!(cu_sbt_flag && ((subTuIndex==0 && cu_sbt_pos_flag)∥
(subTuIndex==1 && !cu_sbt_pos_flag)))

The (2-1)th condition may imply that, in a case where the ISP mode and a sub-block transform (SBT) are not applied, or a residual signal can exist in a currently processed transform_unit when an SBT is applied, tu_cbf_luma[x0][y0] may be signaled according to the (2-2)th condition to the (2-5)th condition.

[(2-2)th condition] CuPredMode[chType][x0][y0]==MODE_INTRA &&
!cu_act_enabled_flag[x0][y0]

A prediction method may be determined in a coding unit level, and a CuPredMode[chType][x0][y0] variable may be configured based on information received in a coding unit level. The prediction method may include intra prediction, inter prediction, intra block copy (IBC), a palette mode, etc. The IBC prediction may correspond to a method of generating a prediction block from a reconstructed area of a current picture which is currently being reconstructed. The palette mode may correspond to a method of mapping, with a particular index, a pixel value frequently generated in a block, signaling index information by the encoder, and reconstructing, by the decoder, a current block based on the index information parsed from a bitstream. When CuPredMode[chType][x0][y0] is MODE_INTRA, this indicates that an intra prediction is applied to a current block, and when CuPredMode[chType][x0][y0] is MODE_INTER, this may indicate that an inter prediction is applied to a current block. In addition, when CuPredMode[chType][x0][y0] is MODE_IBC, this may indicate that an IBC prediction is applied to a current block, and when CuPredMode[chType][x0][y0] is MODE_PLT, this may indicate that the palette mode is applied to a current block. Even when an intra prediction is applied to a current block, a value of tu_cbf_luma[x0][y0] may be limited according to whether an ACT is applied to a current block. Therefore, tu_cbf_luma[x0][y0] may be signaled based on a prediction mode (CuPredMode[chType][x0][y0]) applied to a current block and a flag (cu_act_enabled_flag[x0][y0]) indicating whether an ACT is applied to the current block. When the (2-1)th condition is true, an intra prediction is applied to a current block (CuPredMode[chType][x0][y0] is MODE_INTRA), and an ACT is not applied to the current block (cu_act_enabled_flag[x0][y0] is 0), the encoder may signal tu_cbf_luma[x0][y0]. The decoder may parse tu_cbf_luma[x0][y0] from a bitstream, and determine whether one or more transform coefficients other than 0 exist in a first channel transform block.

When an intra prediction and an ACT are applied to a current block, or an inter prediction or an IBC prediction is applied thereto, tu_cbf_luma[x0][y0] may be signaled according to the (2-3)th condition to the (2-5)th condition.

[(2-3)th condition] chromaAvailable &&
(tu_cbf_cb[xC][yC]∥tu_cbf_cr[xC][yC])

cu_cbf indicating whether a transform_tree( ) syntax structure exists may be signaled according to a prediction method.

For example, in a case of the palette mode, a block can be reconstructed without using a residual signal, and thus when the palette mode is applied to a current block, cu_cbf may not be signaled. That is, the encoder does not explicitly signal cu_cbf, and the decoder may configure cu_cbf to be 0 without parsing same from a bitstream.

In a case of intra prediction, a prediction sample is generated according to a pre-configured prediction mode, based on a reconstructed sample around a current block, and thus prediction accuracy may decrease compared to inter prediction. This may imply that the energy of a residual signal existing in a block is relatively large, and the possibility that quantized transform coefficients existing in a block become all 0 is also low. In addition, when intra prediction is applied, a prediction and a reconstruction may be performed in a transform unit level, and even when all transform coefficients existing in a block are 0, a partitioning structure of a transform tree may be required to be determined. Therefore, based on this characteristic, when an intra prediction is applied to a current block, cu_cbf may not be signaled. The encoder does not explicitly signal cu_cbf, and the decoder may configure cu_cbf to be 1 without parsing same from a bitstream.

In a case of inter prediction and IBC prediction, cu_cbf may be signaled according to a merge mode and a skip mode. The merge mode may generate a merge candidate list including multiple motion information sets according to a pre-configured method, and signal a motion information set index used in the merge candidate list, and the motion information set may include a motion vector, a reference picture index, etc. The decoder may parse a merge flag from a bitstream, and determine whether the merge mode is applied to a current block. When the merge mode is applied to the current block, the decoder may additionally parse a merge index, and select a particular motion information set indicated by the merge index in a merge candidate list including multiple motion information sets. The decoder may generate a prediction block, based on the selected motion information set. The skip mode is a particular mode of the merge mode, and may be a merge mode in which a residual signal does not exist, and this may indicate that a transform_tree( ) syntax structure does not exist. Whether the skip mode is applied to a current block may be indicated by a skip flag. The skip mode (a case where a skip flag is 1 and a merge flag is 1) indicates that a residual signal does not exist, and the merge mode (a case where a skip flag is 0, and a merge flag is 1) rather than the skip mode indicates that a residual signal exists, and this may indicate that a transform_tree( ) syntax structure exists. Therefore, the encoder may not signal cu_cbf when a merge flag is 1. The decoder may not parse cu_cbf from a bitstream, and determine cu_cbf, based on a skip flag. When a skip flag is 1, cu_cbf may be configured to be 0, and when a skip flag is 0, cu_cbf may be configured to be 1. When the merge mode is not applied to a current block (a merge flag is 0), the encoder may explicitly signal cu_cbf. The decoder may parse cu_cbf from a bitstream, and determine whether a transform_tree( ) syntax structure exists.

When cu_cbf is 1 with respect to an inter-predicted and IBC-predicted block, this may imply that one or more transform coefficients other than 0 exists in a current coding unit, and may indicate that at least one of tu_cbf_luma, tu_cbf_cb, and tu_cbf_cr existing in a transform_unit( ) syntax structure is not 0. tu_cbf_cb, and tu_cbf_cr syntax elements are signaled before tu_cbf_luma, and thus when a chroma (second channel and third channel) component sample array does not exist (chromaAvailable is 0), or tu_cbf_cb and tu_cbf_cr are both 0, tu_cbf_luma may be signaled according to the (2-4)th condition and the (2-5)th condition. The (2-4)th condition and the (2-5)th condition indicate a condition that a coding unit is partitioned into multiple transform units, based on the maximum size of a luma transform block, and when the width or height of a coding unit is greater than the maximum size of a luma transform block, a current coding unit may be partitioned into multiple transform units. When the (2-4)th condition and the (2-5)th condition are false, this may indicate that a current coding unit includes one transform_unit, and when chromaAvailable is 0, or tu_cbf_cb, and tu_cbf_cr are both 0, tu_cbf_luma[x0][y0] may not be parsed from a bitstream, and may be configured to be 1. Meanwhile, when the (2-3)th condition is true, (a chroma sample array exists, and at least one of tu_cbf_cb[xC][yC] and tu_cbf_cr[xC][yC] is 1), it is impossible to limit a value of tu_cbf_luma[x0][y0], and thus tu_cbf_luma[x0][y0] may be signaled. The decoder may parse tu_cbf_luma[x0][y0] from a bitstream, and determine whether one or more transform coefficients other than 0 exist in a first channel transform block.

When an ACT is applied to an intra-predicted block (CuPredMode[chType][x0][y0] is MODE_INTRA, and cu_act_enabled_flag[x0][y0] is 1), the (2-2)th condition is false, and thus tu_cbf_luma[x0][y0] may be signaled according to the (2-3)th condition to the (2-5)th condition. When an ACT is applied to an intra-predicted block, and the (2-3)th condition is true, it is impossible to limit a value of tu_cbf_luma[x0][y0], and thus the encoder may signal tu_cbf_luma[x0][y0], and the decoder may parse tu_cbf_luma[x0][y0] from a bitstream. Meanwhile, when an ACT is applied to an intra-predicted block, and the (2-3)th condition is false, tu_cbf_luma[x0][y0] may be signaled according to the (2-4)th condition and the (2-5)th condition.

When an ACT is applied to an intra-predicted block, and all the (2-3)th condition to the (2-5)th condition are false, a value of tu_cbf_luma[x0][y0] may be limited to 1, and thus the encoder may not signal tu_cbf_luma[x0][y0]. The decoder may configure tu_cbf_luma[x0][y0] to be 1 without parsing same from a bitstream. In this case, bits required for signaling tu_cbf_luma[x0][y0] can be saved, and coding efficiency due to ACT can be further improved.

[(2-4)th condition] CbWidth[chType][x0][y0]>MaxTbSizeY

As described with reference to FIG. 24, when the width of a luma coding block is greater than a luma maximum transform block size (the number of samples), a coding unit may be partitioned into multiple transform units by a transform tree. When a coding unit may be partitioned into multiple transform units, based on a luma maximum transform block size (the number of samples), tu_cbf_luma[x0][y0] may be signaled. The decoder may parse tu_cbf_luma[x0][y0] from a bitstream, and determine whether one or more transform coefficients other than 0 exist in a first channel transform block.

[(2-5)th condition] CbHeight[chType][x0][y0]>MaxTbSizeY

As described with reference to FIG. 24, when the height of a luma coding block is greater than a luma maximum transform block size (the number of samples), a coding unit may be partitioned into multiple transform units by a transform tree. When a coding unit may be partitioned into multiple transform units, based on a luma maximum transform block size (the number of samples), tu_cbf_luma[x0][y0] may be signaled. The decoder may parse tu_cbf_luma[x0][y0] from a bitstream, and determine whether one or more transform coefficients other than 0 exist in a first channel transform block.

The first condition, and the (2-1)th condition to the (2-5)th condition have been described in detail. As described above, when the first condition is true, the (2-1)th condition is true, and at least one of the (2-2)th condition to the (2-5)th condition is true, a first transform coefficient flag (tu_cbf_luma[x0][y0]) may be obtained from a bitstream.

A combination of conditions enabling a first transform coefficient flag (tu_cbf_luma[x0][y0]) to be obtained from a bitstream may vary. For example, when the first condition is true, the (2-1)th condition is true, and the (2-2)th condition is true, the video signal processing device may obtain a first transform coefficient flag (tu_cbf_luma[x0][y0]) from a bitstream.

More specifically, according to the first condition, the video signal processing device may determine whether information (treeType) indicating the type of a currently processed tree indicates a single tree (SINGLE_TREE), or the information (treeType) indicating the type of the currently processed tree indicates dual tree luma (DUAL_TREE_LUMA).

When information (treeType) indicating the type of a currently processed tree indicates a single tree (SINGLE_TREE), or the information (treeType) indicating the type of the currently processed tree indicates dual tree luma (DUAL_TREE_LUMA), the video signal processing device may perform an operation of determining whether the ISP mode is applied to a current block, according to the (2-1)th condition.

In addition, when the ISP mode is not applied to a current block, the video signal processing device may perform an operation of determining whether an SBT flag (cu_sbt_flag) indicating whether a sub-block transform (SBT) is applied to the current block indicates non-application of SBT. In FIG.

26, IntraSubPartitionsSplitType being identical to ISP_NO_SPLIT may indicate that the ISP mode is not applied to a current block.

In addition, when an SBT flag (cu_sbt_flag) indicates non-application of SBT, the video signal processing device may perform an operation of determining whether a prediction method of a current block is an intra prediction, according to the (2-2)th condition. An SBT flag (cu_sbt_flag) indicating non-application of SBT may imply that the SBT flag (cu_sbt_flag) is 0. In the (2-1)th condition, in a case where an SBT flag (cu_sbt_flag) indicates non-application of SBT, even when ((subTuIndex==0 && cu_sbt_pos_flag)||(subTuIndex==1 && !cu_sbt_pos_flag)) is not checked, !(cu_sbt_flag && ((subTuIndex==0 && cu_sbt_pos_flag)||(subTuIndex==1 && !cu_sbt_pos_flag)) may become 1.

In addition, when a prediction method of a current block is an intra prediction, the video signal processing device may perform an operation of determining whether a color space transform activation flag (cu_act_enabled_flag) indicates that a color space transform is not applied to the current block, according to the (2-2)th condition. In FIG. 26, CuPredMode[chType][x0][y0] being identical to MODE_INTRA may indicate that a prediction method of a current block is an intra prediction.

When a color space transform activation flag (cu_act_enabled_flag) indicates that a color space transform is not applied to a current block, the video signal processing device may perform an operation of obtaining, from a bitstream, a first transform coefficient flag (tu_cbf_luma[x0][y0]) indicating whether one or more transform coefficients other than 0 exist in a luma transform block included in a current block.

According to various embodiments of the present disclosure, when the first condition is true, the (2-1)th condition is true, and the (2-2)th condition is true, the video signal processing device may obtain a first transform coefficient flag (tu_cbf_luma[x0][y0]) from a bitstream.

For example, when information (treeType) indicating the type of a currently processed tree is DUAL_TREE_LUMA or SINGLE_TREE, a prediction method of the current block is an intra prediction (CuPredMode[chType][x0][y0]==MODE_INTRA), and an intra sub-partition mode is not applied to the current block (IntraSubPartitionsSplitType is ISP_NO_SPLIT), the video signal processing device may obtain a first transform coefficient flag (tu_cbf_luma) from the bitstream, based on whether a color space transform activation flag (cu_act_enabled_flag) indicates that a color space transform is not applied to the current block. According to an embodiment of the present disclosure, whether to apply an SBT may be limited according to a prediction method of the current block. For example, when a prediction method of the current block is an intra prediction (CuPredMode[chType][x0][y0] is MODE_INTRA), an SBT may not be applied to the current block. That is, when information (treeType) indicating the type of a currently processed tree is DUAL_TREE_LUMA or SINGLE_TREE, a prediction method of the current block is an intra prediction (CuPredMode[chType][x0][y0] is MODE_INTRA), and an intra sub-partition mode is not applied to the current block (IntraSubPartitionsSplitType is ISP_NO_SPLIT), this may indicate that an SBT is not applied to the current block.

Referring to the (2-2)th condition, when the color space transform activation flag (cu_act_enabled_flag) indicates that a color space transform is not applied to the current block, the video signal processing device may perform an operation of obtaining the first transform coefficient flag (tu_cbf_luma) from the bitstream.

Referring to the (2-2)th condition, when one of multiple conditions is satisfied and the color space transform activation flag (cu_act_enabled_flag) indicates that a color space transform is applied to the current block, the video signal processing device may perform an operation of obtaining the first transform coefficient flag (tu_cbf_luma) from the bitstream. The multiple conditions may include at least one of the (2-3)th condition to the (2-5)th condition. That is, the multiple conditions may include a condition that a second channel block and a third channel block corresponding to the current block exist, and the second transform coefficient flag indicates that one or more transform coefficients other than 0 exist in the second channel transform block ((2-3)th condition), a condition that a second channel block and a third channel block corresponding to the current block exist, and the third transform coefficient flag indicates that one or more transform coefficients other than 0 exist in the third channel transform block ((2-3)th condition), a condition that the width of the current block is greater than the maximum number of luma transform samples ((2-4)th condition), and a condition that the height of the current block is greater than the maximum number of luma transform samples ((2-5)th condition).

If a first transform coefficient flag is not obtained from the bitstream, the video signal processing device may perform an operation of configuring a first transform coefficient flag (tu_cbf_luma) to indicate that one or more transform coefficients other than 0 exist in a first channel transform block.

Hereinafter, when the first condition is true, the (2-1)th condition is true, and the (2-2)th condition is true, a process in which a first transform coefficient flag (tu_cbf_luma[x0][y0]) is obtained will be described in more detail.

According to various embodiments of the present disclosure, when the first condition is true, the (2-1)th condition is true, and the (2-2)th condition is true, the video signal processing device may obtain a first transform coefficient flag (tu_cbf_luma[x0][y0]) from a bitstream. More specifically, according to the first condition, the video signal processing device may determine whether information (treeType) indicating the type of a currently processed tree indicates a single tree (SINGLE_TREE), or the information (treeType) indicating the type of the currently processed tree indicates dual tree luma (DUAL_TREE_LUMA).

When information (treeType) indicating the type of a currently processed tree indicates a single tree (SINGLE_TREE), or the information (treeType) indicating the type of the currently processed tree indicates dual tree luma (DUAL_TREE_LUMA), the video signal processing device may perform an operation of determining whether the ISP mode is applied to a current block, according to the (2-1)th condition.

In addition, when the ISP mode is not applied to a current block, the video signal processing device may perform, according to the (2-1)th condition, an operation of determining whether an index (subTuIndex) indicating a currently processed transform block in a current block indicates a first transform_unit, and an SBT position flag (cu_sbt_pos_flag) indicating a transform block having a transform coefficient flag among transform blocks included in a current block indicates absence of a transform coefficient flag for a first transform_unit among transform blocks. In FIG. 26, IntraSubPartitionsSplitType being identical to ISP_NO_SPLIT may indicate that the ISP mode is not applied to a current block. In addition, a transform coefficient flag may include tu_cbf_luma, tu_cbf_cb, and tu_cbf_cr.

In addition, when a case is not a case where an index (subTuIndex) indicating a currently processed transform_u- nit indicates a first transform_unit, and an SBT position flag (cu_sbt_pos_flag) indicates absence of a transform coefficient flag for a first transform_unit among transform blocks, and the case is not a case where an index (subTuIndex) indicating a currently processed transform_unit indicates a second transform_unit, and an SBT position flag (cu_sbt_pos_flag) indicates absence of a transform coefficient flag for a second transform_unit among transform blocks, the video signal processing device may perform, according to the (2-2)th condition, an operation of determining whether a prediction method of a current block is an intra prediction.

In addition, when a prediction method of a current block is an intra prediction, the video signal processing device may perform, according to the (2-2)th condition, an operation of determining whether a color space transform activation flag (cu_act_enabled_flag) indicates that a color space transform is not applied to the current block. In FIG. 26, CuPredMode[chType][x0][y0] being identical to MODE_INTRA may indicate that a prediction method of a current block is an intra prediction.

When a color space transform activation flag (cu_act_enabled_flag) indicates that a color space transform is not applied to a current block, the video signal processing device may perform an operation of obtaining, from a bitstream, a first transform coefficient flag (tu_cbf_luma[x0][y0]) indicating whether one or more transform coefficients other than 0 exist in a luma transform block included in a current block.

[Third condition]
    IntraSubPartitionsSplitType!=ISP_NO_SPLIT &&
    (subTuIndex<NumIntraSubPartitions−1||!InferTuCbfLuma)

When information (treeType) indicating the type of a currently processed tree according to the first condition indicates a single tree (SINGLE_TREE), or the information (treeType) indicating the type of the currently processed tree indicates dual tree luma (DUAL_TREE_LUMA), the video signal processing device may perform an operation of determining whether the ISP mode is applied to a current block, according to the third condition.

When the ISP mode is applied to a current block, the video signal processing device may perform an operation of determining whether a currently processed transform block included in the current block is not the last transform block among transform blocks partitioned by the ISP mode, or a transform coefficient of at least one transform block among transform blocks processed before the currently processed transform block is not 0. IntraSubPartitionsSplitType being different from ISP_NO_SPLIT may indicate that the ISP mode is applied to a current block.

When a currently processed transform block included in a current block is not the last transform block among transform blocks partitioned by the ISP mode, or a transform coefficient of at least one transform block among transform blocks processed before the currently processed transform block is not 0, the video signal processing device may perform an operation of obtaining, from a bitstream, a first transform coefficient flag indicating whether one or more transform coefficients other than 0 exist in a luma transform block included in a current block. SubTuIndex being smaller than NumIntraSubPartitions−1 may imply that a currently processed transform block is not the last transform block among transform blocks partitioned by the ISP mode. In addition, InferTuCbfLuma being 0 may indicate that a transform coefficient of at least one transform block among transform blocks processed before the currently processed transform block is not 0. In relation to this case, a description will be given in more detail below.

When the ISP mode is applied to a current block (IntraSubPartitionsSplitType is not ISP_NO_SPLIT), a tu_cbf_luma[x0][y0] syntax element may be required to be 1 with respect to at least one transform unit among transform units partitioned by the ISP mode. To this end, in a case where, when the ISP mode is applied to a current coding unit, tu_cbf_luma values of all partitioned transform units are 0, the encoder may not select the ISP mode. When a currently processed transform unit is not the last transform unit among transform units partitioned by the ISP mode (subTuIndex is smaller than NumIntraSubPartitions−1), the encoder may explicitly signal tu_cbf_luma[x0][y0]. The decoder may parse tu_cbf_luma[x0][y0] from a bitstream, and determine whether one or more transform coefficients other than 0 exist in a first channel transform block. When a currently processed transform unit is the last transform unit among transform units partitioned by the ISP mode (sub-TuIndex is NumIntraSubPartitions−1), tu_cbf_luma[x0][y0] may be signaled according to an InferTuCbfLuma variable. When InferTuCbfLuma is 1, this may indicate that, with respect to transform units partitioned by the ISP mode, values of tu_cbf_luma[x0][y0] of all transform units processed before a currently processed transform unit are 0. Therefore, when InferTuCbfLuma is 1 for the last transform unit, the encoder may not signal tu_cbf_luma[x0][y0]. The decoder may configure tu_cbf_luma[x0][y0] to be 1 without parsing same from a bitstream. Meanwhile, when InferTuCbfLuma is 0, this may indicate that, with respect to transform units partitioned by the ISP mode, a value of tu_cbf_luma[x0][y0] of at least one transform unit among transform units processed before a currently processed transform_unit is 1. Therefore, it is impossible to limit a value of tu_cbf_luma[x0][y0] of the last transform unit, and thus when InferTuCbfLuma is 0 for the last transform unit, the encoder may signal tu_cbf_luma[x0][y0]. The decoder may parse tu_cbf_luma[x0][y0] from a bitstream, and determine whether one or more transform coefficients other than 0 exist in a first channel transform block.

According to a method of signaling tu_cbf_cb, tu_cbf_cr, and tu_cbf_luma described above, the decoder may determine whether one or more transform coefficients other than 0 exist in a corresponding transform block. When one or more transform coefficients other than 0 exist in a corresponding transform block, based on tu_cbf_luma, tu_cbf_cb, and tu_cbf_cr syntax elements, the decoder may parse transform coefficient-related syntax elements from a bitstream, and obtain a transform coefficient array.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including instructions executable by a computer, such as a program module executed by a computer. A computer-readable medium may be any available medium that is accessible by a computer, and includes both volatile and nonvolatile media, removable and non-removable media. Further, the computer-readable medium may include both computer storage media and communication media. The computer storage medium includes both volatile and nonvolatile, removable and non-removable media implemented in any method or technology for storage of information such as computer readable instructions, data structures, program modules or other data. The communication media typically include computer readable instructions, data structures, other data in a modulated data signal such as program modules, or other transmission mechanisms, and include any information delivery media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A non-transitory computer-readable medium storing a bitstream, the bitstream being decoded by a decoding method, the decoding method comprising:
    obtaining a transform skip enabled flag indicating whether a transform skip flag indicating whether a transform skip is applied to a transform block included in a current block is present in a transform unit syntax;
    obtaining a palette enabled flag indicating whether a palette mode is enabled;
    when the transform skip enabled flag indicates that the transform skip flag is present in the transform unit syntax, or when the palette enabled flag indicates that the palette mode is enabled, obtaining information related to a minimum allowed quantization parameter for a transform skip mode;
    obtaining the minimum allowed quantization parameter, based on the information related to the minimum allowed quantization parameter;
    obtaining a first modified quantization parameter by adding a quantization parameter and a quantization parameter offset;
    obtaining a second modified quantization parameter by clipping the first modified quantization parameter,
    wherein when a value of the transform skip flag indicates that the transform skip is not applied to the transform block and the first modified quantization parameter is less than 0, the second modified quantization parameter is obtained by clipping the first modified quantization parameter to 0,
    wherein when the value of the transform skip flag indicates that the transform skip is applied to the transform block and the first modified quantization parameter is less than the minimum allowed quantization parameter, the second modified quantization parameter is obtained by clipping the first modified quantization parameter to the minimum allowed quantization parameter; and
    reconstructing the current block based on the second modified quantization parameter.

2. The non-transitory computer-readable medium of claim 1, the decoding method further comprising:
    obtaining a color space conversion enabled flag indicating whether a color space conversion is applied to the current block, and
    wherein when the color space conversion enabled flag indicates that the color space conversion is not applied to the current block, the quantization parameter offset is determined to be 0,
    wherein when the color space conversion enabled flag indicates that the color space conversion is applied to the current block, the quantization parameter offset is determined to be a predetermined offset for each color component of the transform block.

3. The non-transitory computer-readable medium of claim 1,
    wherein the transform skip enabled flag, the palette enabled flag, and the information related to the minimum allowed quantization parameter are obtained from at least one of a sequence parameter set (SPS), a picture parameter set (PPS), a picture header, and/or a slice header.

4. The non-transitory computer-readable medium of claim 1, the decoding method further comprising:
    when a prediction mode of the current block is an intra prediction mode other than an intra sub-partition mode, obtaining a first transform coefficient flag indicating whether one or more non-zero transform coefficients are present in a luma transform block of the current block based on the color space conversion enabled flag.

5. The non-transitory computer-readable medium of claim 4,
    wherein when the color space conversion enabled flag indicates that the color space conversion is not applied to the current block, the first transform coefficient flag is obtained.

6. The non-transitory computer-readable medium of claim 4,
    wherein when the color space conversion enabled flag indicates that the color space conversion is not applied to the current block or one or more non-zero transform coefficients are present in a chroma transform block of Cb color component of the current block or one or more non-zero transform coefficients are present in a chroma transform block of Cr color component of the current block or a width of the current block is greater than a luma maximum transform size or a height of the current block is greater than the luma maximum transform size, the first transform coefficient flag is obtained.

7. The non-transitory computer-readable medium of claim 4,
    wherein when the first transform coefficient flag is not obtained, the first transform coefficient flag is inferred to indicate that one or more non-zero transform coefficients are present in the luma transform block of the current block.

8. A device for decoding a video signal, the device comprising a processor, wherein the processor is configured to:
obtain a transform skip enabled flag indicating whether a transform skip flag indicating whether a transform skip is applied to a transform block included in a current block is present in a transform unit syntax,
obtain a palette enabled flag indicating whether a palette mode is enabled,
when the transform skip enabled flag indicates that the transform skip flag is present in the transform unit syntax, or when the palette enabled flag indicates that the palette mode is enabled, obtain information related to a minimum allowed quantization parameter for a transform skip mode,
obtain the minimum allowed quantization parameter, based on the information related to the minimum allowed quantization parameter,
obtain a first modified quantization parameter by adding a quantization parameter and a quantization parameter offset,
obtain a second modified quantization parameter by clipping the first modified quantization parameter,
wherein when a value of the transform skip flag indicates that the transform skip is not applied to the transform block and the first modified quantization parameter is less than 0, the second modified quantization parameter is obtained by clipping the first modified quantization parameter to 0,
wherein when the value of the transform skip flag indicates that the transform skip is applied to the transform block and the first modified quantization parameter is less than the minimum allowed quantization parameter, the second modified quantization parameter is obtained by clipping the first modified quantization parameter to the minimum allowed quantization parameter, and
reconstruct the current block based on the second modified quantization parameter.

9. The device of claim 8, the processor is configured to:
obtain a color space conversion enabled flag indicating whether a color space conversion is applied to the current block,
wherein when the color space conversion enabled flag indicates that the color space conversion is not applied to the current block, the quantization parameter offset is determined to be 0,
wherein when the color space conversion enabled flag indicates that the color space conversion is applied to the current block, the quantization parameter offset is determined to be a predetermined offset for each color component of the transform block.

10. The device of claim 9, wherein the processor is configured to:
when a prediction mode of the current block is an intra prediction mode other than an intra sub-partition mode, obtain a first transform coefficient flag indicating whether one or more non-zero transform coefficients are present in a luma transform block of the current block based on the color space conversion enabled flag.

11. The device of claim 10, wherein when the color space conversion enabled flag indicates that the color space conversion is not applied to the current block, the first transform coefficient flag is obtained.

12. The device of claim 10, wherein when the color space conversion enabled flag indicates that the color space conversion is not applied to the current block or one or more non-zero transform coefficients are present in a chroma transform block of Cb color component of the current block or one or more non-zero transform coefficients are present in a chroma transform block of Cr color component of the current block or a width of the current block is greater than a luma maximum transform size or a height of the current block is greater than the luma maximum transform size, the first transform coefficient flag is obtained.

13. The device of claim 10, wherein when the first transform coefficient flag is not obtained, the first transform coefficient flag is inferred to indicate that one or more non-zero transform coefficients are present in the luma transform block of the current block.

14. The device of claim 8, wherein the transform skip enabled flag, the palette enabled flag, and the information related to the minimum allowed quantization parameter are obtained from at least one of a sequence parameter set (SPS), a picture parameter set (PPS), a picture header, and/or a slice header.

15. A device for encoding a video signal, the device comprising a processor,
wherein the processor is configured to:
obtain a bitstream to be decoded by a decoder using a decoding method,
the decoding method comprising:
obtaining a transform skip enabled flag indicating whether a transform skip flag indicating whether a transform skip is applied to a transform block included in a current block is present in a transform unit syntax;
obtaining a palette enabled flag indicating whether a palette mode is enabled;
when the transform skip enabled flag indicates that the transform skip flag is present in the transform unit syntax, or when the palette enabled flag indicates that the palette mode is enabled, obtaining information related to a minimum allowed quantization parameter for a transform skip mode;
obtaining the minimum allowed quantization parameter, based on the information related to the minimum allowed quantization parameter;
obtaining a first modified quantization parameter by adding a quantization parameter and a quantization parameter offset;
obtaining a second modified quantization parameter by clipping the first modified quantization parameter,
wherein when a value of the transform skip flag indicates that the transform skip is not applied to the transform block and the first modified quantization parameter is less than 0, the second modified quantization parameter is obtained by clipping the first modified quantization parameter to 0,
wherein when the value of the transform skip flag indicates that the transform skip is applied to the transform block and the first modified quantization parameter is less than the minimum allowed quantization parameter, the second modified quantization parameter is obtained by clipping the first modified quantization parameter to the minimum allowed quantization parameter; and
reconstructing the current block, based on the second modified quantization parameter.

16. A method for decoding a video signal, the method comprising:
obtaining a transform skip enabled flag indicating whether a transform skip flag indicating whether a transform skip is applied to a transform block included in a current block is present in a transform unit syntax;
obtaining a palette enabled flag indicating whether a palette mode is enabled;

when the transform skip enabled flag indicates that the transform skip flag is present in the transform unit syntax, or when the palette enabled flag indicates that the palette mode is enabled, obtaining information related to a minimum allowed quantization parameter for a transform skip mode;

obtaining the minimum allowed quantization parameter, based on the information related to the minimum allowed quantization parameter;

obtaining a first modified quantization parameter by adding a quantization parameter and a quantization parameter offset;

obtaining a second modified quantization parameter by clipping the first modified quantization parameter, wherein when a value of the transform skip flag indicates that the transform skip is not applied to the transform block and the first modified quantization parameter is less than 0, the second modified quantization parameter is obtained by clipping the first modified quantization parameter to 0, wherein when the value of the transform skip flag indicates that the transform skip is applied to the transform block and the first modified quantization parameter is less than the minimum allowed quantization parameter, the second modified quantization parameter is obtained by clipping the first modified quantization parameter to the minimum allowed quantization parameter; and reconstructing the current block based on the second modified quantization parameter.

* * * * *